United States Patent
Bernkrant et al.

(10) Patent No.: US 10,989,496 B2
(45) Date of Patent: Apr. 27, 2021

(54) SECURABLE CONTAINER WITH LOCKABLE MOUNT SYSTEM

(71) Applicant: EUROPEAN AMERICAN ARMORY CORP., Cocoa, FL (US)

(72) Inventors: Keith Bernkrant, Cape Canaveral, FL (US); Paul Richter, Titusville, FL (US)

( * ) Notice: Subject to any disclaimer, the term of this patent is extended or adjusted under 35 U.S.C. 154(b) by 0 days.

(21) Appl. No.: 16/749,972

(22) Filed: Jan. 22, 2020

(65) Prior Publication Data

US 2020/0225000 A1     Jul. 16, 2020

Related U.S. Application Data

(63) Continuation-in-part of application No. 15/681,385, filed on Aug. 19, 2017, which is a continuation of
(Continued)

(51) Int. Cl.
*F41C 33/06* (2006.01)
*H04W 4/029* (2018.01)
(Continued)

(52) U.S. Cl.
CPC .......... *F41C 33/06* (2013.01); *E05B 65/0075* (2013.01); *E05G 1/005* (2013.01); *H04W 4/029* (2018.02)

(58) Field of Classification Search
CPC ...... E05B 65/0075; E05G 1/005; F41C 33/06; H04W 4/029; B65D 43/00; B65D 43/24;
(Continued)

(56) References Cited

U.S. PATENT DOCUMENTS 4,266,703 A * 5/1981 Litz ............................. B62J 7/04
                                                                  224/443
4,483,501 A * 11/1984 Eddy ................... F41C 33/0209
                                                                  224/198
(Continued)

FOREIGN PATENT DOCUMENTS

WO     WO-2016118195 A1 * 7/2016 ............... E05G 1/04

OTHER PUBLICATIONS

PCT International Search Report dated Jun. 9, 2016.
(Continued)

*Primary Examiner* — Suzanne L Barrett
(74) *Attorney, Agent, or Firm* — Lowndes; Stephen C. Thomas

(57) ABSTRACT

A securable container for a firearm or other valuable item and a securable mounting system that secures the attachment of the securable container to an external structure, which may be for example an interior surface of a vehicle. The invention may comprise an enclosure, a retractable cover, a firearm retaining mechanism and a firearm extending mechanism. The container may be manually or remotely locked or unlocked. When locked, the interior volume may not be accessed and the securable container may not be detached from the external structure. Geolocation, batter, open/close state and other status information may be communicated to a remote user through a wireless data link. A camera may be activated by opening the container, whereupon video data may be transmitted to a remote monitor. When opened, a firearm is automatically extended out of the container, presenting it for use. A key fob may allow user access.

23 Claims, 29 Drawing Sheets

Related U.S. Application Data application No. PCT/US2016/018813, filed on Feb. 19, 2016, which is a continuation-in-part of application No. PCT/US2015/051285, filed on Sep. 21, 2015, application No. 16/749,972, which is a continuation-in-part of application No. 15/774,297, filed as application No. PCT/US2017/018554 on Sep. 19, 2017, which is a continuation-in-part of application No. PCT/US2016/018813, filed on Feb. 19, 2016, said application No. 15/681,385 is a continuation-in-part of application No. 15/544,738, filed as application No. PCT/US2015/051285 on Sep. 21, 2015, now Pat. No. 10,494,856.

(60) Provisional application No. 62/274,367, filed on Jan. 3, 2016, provisional application No. 62/105,201, filed on Jan. 19, 2015, provisional application No. 62/119,099, filed on Feb. 20, 2015.

(51) Int. Cl.
*E05G 1/00* (2006.01)
*E05B 65/00* (2006.01)

(58) Field of Classification Search
CPC ........ B65D 43/14; B65D 43/20; B65D 43/22; B65D 55/02; B65D 55/04; B65D 55/14
USPC .... 220/200, 202, 260, 281, 348; 70/63, 426; 211/8, 64; 340/5.33; 42/70.06
See application file for complete search history.

(56) References Cited

U.S. PATENT DOCUMENTS

| | | | | |
|---|---|---|---|---|
| 4,739,637 A * | 4/1988 | Finkel | ................. | E05B 73/0082 248/553 |
| 4,747,280 A * | 5/1988 | Shaw | ................. | E05B 47/0002 211/64 |
| 4,800,822 A * | 1/1989 | Adkins | ................. | A47B 55/00 109/19 |
| 4,890,466 A * | 1/1990 | Cislo | ................. | F41C 33/06 109/51 |
| 4,987,836 A * | 1/1991 | Owen | ................. | E05B 67/36 109/52 |
| 5,416,472 A | 5/1995 | Torii, Jr. | | |
| 5,416,826 A | 5/1995 | Butler | | |
| 5,778,804 A * | 7/1998 | Read | ................. | A47B 13/021 248/221.12 |
| 5,828,301 A | 10/1998 | Sanchez | | |
| 5,884,799 A | 3/1999 | Korber et al. | | |
| 5,901,589 A * | 5/1999 | Cordero | ................. | E05G 1/00 109/59 R |
| 5,916,087 A * | 6/1999 | Owens | ................. | F41A 23/18 5/503.1 |
| 6,276,735 B1 | 8/2001 | Champion | | |
| 6,330,815 B1 * | 12/2001 | Duncan | ................. | B60R 7/14 211/4 |
| 6,523,374 B1 | 2/2003 | Owens | | |
| 6,570,501 B2 | 5/2003 | Bushnell et al. | | |
| 6,588,635 B2 | 7/2003 | Vor Keller et al. | | |
| 6,843,081 B1 * | 1/2005 | Painter | ................. | F41C 33/06 109/45 |
| 6,918,519 B2 | 7/2005 | Vor Keller et al. | | |
| 7,159,711 B1 * | 1/2007 | Gardner | ................. | F41C 33/06 206/315.11 |
| 7,200,965 B2 | 4/2007 | Vor Keller et al. | | |
| 7,299,667 B1 * | 11/2007 | Miresmaili | ................. | E05B 73/00 109/51 |
| 7,610,782 B2 * | 11/2009 | Lax | ................. | E05B 73/0058 206/1.5 |
| 8,186,188 B1 | 5/2012 | Brown | | |
| 8,931,422 B2 * | 1/2015 | Heim | ................. | F41C 33/06 109/45 |
| 9,459,074 B2 | 10/2016 | Heim et al. | | |
| 9,500,441 B2 * | 11/2016 | Kirby, Jr. | ................. | F41C 33/06 |
| 9,666,056 B2 | 5/2017 | Herrera et al. | | |
| 9,743,277 B2 | 8/2017 | Lin et al. | | |
| 9,841,255 B2 | 12/2017 | Koskan et al. | | |
| 9,910,515 B2 | 3/2018 | Richards et al. | | |
| 9,938,061 B2 * | 4/2018 | Garthe | ................. | E05G 1/005 |
| 9,939,545 B2 | 4/2018 | Herrera et al. | | |
| 2001/0033228 A1 | 10/2001 | Kisreman et al. | | |
| 2003/0057122 A1 | 3/2003 | Bushnell | | |
| 2004/0066275 A1 | 4/2004 | Mickler | | |
| 2005/0138975 A1 * | 6/2005 | Cline | ................. | E05B 63/0043 70/63 |
| 2014/0162584 A1 | 6/2014 | Cope | | |
| 2014/0245934 A1 | 9/2014 | Delattre et al. | | |
| 2014/0366419 A1 | 12/2014 | Allan | | |
| 2016/0054080 A1 | 2/2016 | Haimi | | |
| 2016/0116253 A1 | 4/2016 | Moon | | |
| 2016/0173832 A1 | 6/2016 | Stewart et al. | | |
| 2017/0334638 A1 * | 11/2017 | Jiang | ................. | B65D 90/08 |

OTHER PUBLICATIONS

PCT International Preliminary Report on Patentability dated Aug. 22, 2017.
PCT Search History dated Apr. 12, 2016.
China National Intellectual Property Administration First Office Action in CN application No. 201680022846.2, including English translation; dated Dec. 4, 2018.
U.S. Appl. No. 15/681,385 Non Final Office Action dated Nov. 22, 2019.

* cited by examiner

SECURABLE CONTAINER WITH LOCKABLE MOUNT SYSTEM

CROSS REFERENCE TO RELATED APPLICATIONS AND INCORPORATION BY REFERENCE

This non-provisional application, filed in the United States Patent and Trademark Office (USPTO) under 35 USC 111(a), is a continuation-in-part of U.S. patent application Ser. No. 15/681,385 titled SECURABLE CONTAINER, filed in the USPTO on Aug. 19, 2017, which was published by the USPTO as US 2018-0010884 A1 on Jan. 11, 2018 and which is hereby incorporated by reference in its entirety; which was a continuation of PCT/US16/18813 titled SECURABLE CONTAINER which was filed in the USPTO on Feb. 19, 2016 and which was published by WIPO as WO/2016/134336 on Aug. 8, 2016, which is hereby incorporated by reference in its entirety; which was a non-provisional of and claimed benefit of priority to U.S. provisional application Ser. No. 62/274,367 titled SECURABLE CONTAINER filed in the USPTO on Jan. 3, 2016 which is herein incorporated by reference in its entirety; PCT/US16/18813 also was a continuation in part (CIP) of PCT/US15/051285 titled PORTABLE SAFE, filed in the USRO on Sep. 21, 2015 which published as WO/2016/118195 by WIPO on Jul. 28, 2016 and which is herein incorporated by reference in its entirety; PCT/US15/051285 was also a non-provisional of and claimed benefit of priority to U.S. provisional patent application Ser. No. 62/105,201, titled PORTABLE SAFE filed in the USPTO on Jan. 19, 2015 which is herein incorporated by reference in its entirety; PCT/US15/051285 was also a non-provisional of and claimed benefit of priority to U.S. provisional patent application Ser. No. 62/119,099, titled PORTABLE SAFE filed in the USPTO on Feb. 20, 2015 which is herein incorporated by reference in its entirety; this application is also a CIP of U.S. patent application Ser. No. 15/774,297, titled SMART WEAPON HOLSTER, which was filed in the USPTO on May 8, 2018 and which is herein incorporated by reference in its entirety; Ser. No. 15/774,297 was a 371 national stage filing of PCT/US17/18554, titled SMART WEAPON HOLSTER, which was filed in the USPTO on Feb. 2, 2019, which is hereby incorporated by reference in its entirety; PCT/US17/18554 was a CIP of PCT/US16/18813 titled SECURABLE CONTAINER which was filed in the USPTO on Feb. 19, 2016 and which was published by WIPO as WO/2016/134336 on Aug. 8, 2016, which is hereby incorporated by reference in its entirety.

Any and all patents, patent applications, publications of patent applications and documents referenced in this application are hereby incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

TECHNICAL FIELD

The invention relates generally to the field of containers in which valuables such as for example firearms, jewelry, money, medicine, personal identification information or other valuable items may be stored and hidden from view. The field of the invention also includes containers that may be remotely accessible for the purpose of remotely unlocking or locking the container, reporting the condition or status of the container, and reporting container geolocation information. More specifically, a preferred embodiment invention is directed to a container for a handgun, conducted electrical weapon or other firearm or weapon. In an embodiment the invention conceals a firearm in a securable portable container, where it may be safely carried and contained in a container that is manually and/or remotely lockable, but which in which the firearm is readily accessible to aid in personal defense or in any tactical situation. The container of the invention may be used to carry any object desired by the user.

The invention also relates generally to the field of mounting systems that allow a container or other item to be removeably attached to a structure in a lockable system such that the container may only be detached from the structure by a user who is in possession of a predetermined physical key or PIN code. Once the container is mounted to a structure and placed in a locked state, the container may not be detached from the structure unless the container is unlocked placed into an open state, allowing access into an enclosed interior volume from outside the container. If the container is in a closed and locked state, a user is able to detach the container from the structure by operating the container into an unlocked state, and then placing the container into an open state, thereby allowing access to the hardware allowing detachment of the container from the structure. Exemplary, non-limiting structures to which the container may be removeably attached are vehicle surfaces such as car or truck surfaces; military and law enforcement vehicle surfaces; boat surfaces; desk or bed surfaces, etc. The securable container mount of the invention may be attached to any structure, in any environment.

While the embodiment of the container of the invention is depicted as a container for a firearm, the container of the invention may take any physical form or shape and is not to be construed as being limited to only containers for firearms. The container of the invention may be utilized for carrying valuables or a firearm in any environment in which a user may wish to carry such items in a secure and controlled manner.

BACKGROUND ART

It is often desirable that firearms be securely locked in a container that restricts unauthorized access to the firearm while still allowing quick and easy access to an authorized user of the firearm in situations in which the firearm must be used for personal defense or the defense of others. In some situations, firearms must be also concealed from view in public due to laws or ordinances that require concealment. Furthermore, it is often desirable that the condition, status, or location of a firearm be ascertainable by a remote monitor, or that the container in which it is carried the remotely lockable or unlockable. It is desirable that such a container be adapted to be mounted to an interior surface of a vehicle or other structure such as a bedside or furniture. These are but non-limiting examples of situations in which a securable container such as the securable container of the invention may be employed.

Various containers have been developed that may hold a firearm securely, and may conceal a firearm from view, but the containers of the prior art are not adapted to allow quick and easy access to a firearm stored in them, and they are not readily adaptable for use in a vehicle, attached to furniture, or attached to other structures.

What is needed in the art, therefore, is an apparatus and/or method such as a container or holster that conceals valuables such as firearms such that they may be securely carried by a user, while allowing for quick and easy removal of the items or firearm when desired by a user. It would further be desirable that such a container be lockable by a user, either locally or remotely, that the container be capable of reporting its geolocation and status to a remote user, and that the container, which may be a firearm holster, trigger the operation of certain safety or information-gathering devices such as cameras or microphones when the firearm is removed from the holster.

SUMMARY OF THE INVENTION

The present invention comprises an apparatus and method that have one or more of the following features and/or steps, which alone or in any combination may comprise patentable subject matter. While exemplary embodiments of the invention are described and shown in the figures of the drawings, these embodiments are exemplary in nature and are not be interpreted as, in an of themselves, limitations of the claims. The invention may comprise any of the features described herein, in any combination, The present invention overcomes the shortcomings of the prior art in that it provides an apparatus and method for a container concealing a firearm while allowing for quick and easy removal of the firearm contained therein when desired by a user. The container may be lockable, unlockable or both by physical key or by inputting a code into a keypad; and, in embodiments may be remotely lockable, unlockable, or both by a remote user using a remote computing device or mobile device via a wireless connection; and may provide geolocation information to a remote monitor. Removal of a firearm from the container may trigger the operation of certain safety or information-gathering devices such as cameras or microphones when the firearm is removed from the container. Such microphones or cameras which may be in electrical or wireless communication with the container or may independently be in wireless communication with a remote monitor. In this manner, a user may withdraw a firearm from the container, triggering operation of a camera or microphone for the transmittal of video, still images, audio data or other information, in any combination, to a remote monitoring site. In an embodiment, both video and audio data may be transmitted to a remote monitoring site. Thus, video and/or audio data may be transmitted, for example, to a law enforcement monitoring site such as a headquarters or station house, where a police officer's tactical situation may be observed by others such as superior officers or tactical specialists. Also, the remote monitor at the station house may remotely lock the container of the invention, preventing unauthorized access to a law enforcement officer's firearm. This feature may be helpful for example when a law enforcement officer has been incapacitated. This feature may thus prevent unauthorized access and/or use of the officer's firearm when the officer is unable to prevent such unauthorized access themselves. The example given here is but one of many scenarios of use of the invention.

In accordance with an embodiment of the invention, the invention comprises a container that may, but does not necessarily, comprise any of the following: an optional geolocation receiver such as a GPS receiver for geolocation of the securable container and its contents; an optional processor for executing non transitory computer executable instructions stored in a computer readable medium such as an electronic memory; one or more means for communication with a remote user or system, such as a remote user data interface that may include radiofrequency (RF) wireless or optical communications transceivers, wired data communications ports or the like, of any type, in any combination, and in any number. A remote user may be able to track the geographic location of a container of the invention and its contents by utilizing received geo-positioning information, such as through a GPS receiver, or cell-based geolocation information, that is reported from the container of the invention to a remote user; or geolocation information regarding the geographic location of the securable container may be independently reported from cell towers and data network systems to which the container is wirelessly connected through radiofrequency or other wireless communications means such as, for instance and not by way of limitation, cellular communication systems such as Global System for Mobile Communications, or GSM; analog data networks; wireless Local Area Networks (LANs) such as Wi-Fi; point to point communication systems such as Bluetooth®; or any other radiofrequency or optical communication systems known in the art. The securable container of the invention may also report its condition and/or status, such as "open", "closed", "locked", "unlocked" or "firearm present" to a remote user communicating with the securable container of the invention via a wireless network in communication with the world wide web.

The container may comprise a spring-loaded retractable cover mechanism that is lockable and/or unlockable by either a manual key; by entry, or inputting, of a Personal Identification Number (PIN) code into at least one electrical switch, or switches, or keypad wherein the electrical switch, or switches, or keypad is in communication with a controller in the container, and wherein the electrical switch, or switches, or keypad may comprise a PIN data input, or data entry, function; or remotely by transmission of a lock or unlock command from a remote user to the controller of the invention. A firearm may be retained in the container by any means or receiving structure. Such structure may, in embodiments, take the form of a barrel pin allowing a firearm to be inserted onto the barrel pin by sliding the barrel of the firearm onto the barrel pin, forming a sliding engagement between barrel pin and firearm barrel. In embodiments the barrel pin may be long enough to prevent a full sliding engagement with a firearm that has an ammunition round chambered. In any of the embodiments using this long barrel pin feature, the "long barrel pin embodiment", the barrel pin length is defined to be longer that the length of the open space in the firearm barrel when an ammunition round is chambered in the firearm. "Preventing a full sliding engagement", as used herein, means that when a firearm is slidingly engaged with the barrel pin of the invention such that the barrel pin is inserted as far as is possible into the firearm barrel, the barrel pin is in physical contact with the chambered ammunition round preventing the firearm from sliding further onto the barrel pin, such that the firearm is not fully seated on the barrel pin, and the retractable cover 108 of the invention is not able to be disposed into a closed position because it cannot be closed around the firearm due to a portion of the firearm, such as, for example, the handle, protruding through opening 006 and physically preventing closure of the retractable cover. This safety feature ensures that, for the long barrel pin embodiment of the invention, only firearms that do not have an ammunition round chambered may be carried in this embodiment of the invention, preventing accidental discharge when placing the firearm onto the barrel pin or removing it from the securable container. For purpose of this description, "ammunition round" means a cartridge having a bullet as may be inserted into the chamber of a firearm, and fired, projecting the bullet through and out of the firearm barrel. In other embodiments of the invention, the container comprises a short barrel pin which allows full sliding engagement between the barrel pin and a firearm containing an ammunition round that has been chambered in the firearm, which means that when a firearm is slidingly engaged with the barrel pin of the invention such that the barrel pin is inserted as far as is possible into the firearm barrel, the barrel pin is not in physical contact with the chambered ammunition round, and the retractable cover of the invention is able to be disposed into a closed position. The short barrel pin embodiment of the invention is useful for situations in which a user desires to carry a firearm with a round chambered in the container of the invention so that the firearm is available for instant firing once withdrawn from the container. Short barrel pin embodiments may thus be desirable for personal defense or law enforcement use. The long barrel pin embodiments may be desirable for shipping or transport of firearms.

In accordance with an embodiment of the container of the invention, the lock of the invention may be a manual key lock or an electromechanical lock in electrical communication with a controller so that it may be controlled into a locked or an unlocked state. When either the key lock or the electromechanical lock are in a locked state the retractable cover is prevented from retracting into the retracted position and placing the container in an open state. When either the key lock or the electromechanical lock are in a locked state, the retractable cover cannot be manually operated into an open, or retracted, position by the user. The electromechanical lock may be commanded by the controller into a "locked" state or an "unlocked" state by the controller. The controller may be instructed to command the electromechanical lock into a locked state or an unlocked state by a remote user using a wireless interface to communicate with the controller, which interface may be an optical or a radiofrequency wireless interface. For example, the lock or unlock instruction may be generated by a user using a mobile computing device such as a tablet or cell phone, or the command may be generated by a user using a personal computer or any other electronic device that is in communication with the controller through any communication channel such as RF or optical data links, and using any communication protocols such as those protocols utilized by the Internet or World Wide Web. Thus the operation of the container by the controller may be described as "web-enabled". The container of the invention, as described further below, may, in embodiments, comprise a controller in communication with radiofrequency and optical transceivers such that it is also connected to the Internet and is addressable using, for example, an Internet protocol address. Thus, a user may enter a command from a remote electronic device, which command is transmitted through the Internet and World Wide Web, and received by the securable container of the invention. The command may then processed by the controller of the invention executing non-transitory computer readable and executable instructions, which may be stored in a physical computer readable medium, or memory, that is in communication with the controller. The controller may thus execute non-transitory computer readable and executable non-transitory instructions to process a command received from a remote user to command the electromechanical lock into a locked or unlocked state. In embodiments, the container may further be commanded into a locked state when a device such as a key fob is no longer within operable distance as described further below, or when a user enters a predetermined code into the PIN keypad of the invention.

Embodiments of the invention may further comprise optional geo-positioning electronic components such as a geolocation receiver, which may be a Global Position System (GPS) receiver, capable of receiving geo-locating signals from, for example, remote transmitters such as, but not limited to, GPS or other geo-positioning satellites, processing said geo-locating signals, and transmitting a signal comprising geolocation information through a remote user data interface to a remote user who, for example, may communicate with a container of the invention through a world wide web interface on the internet that is in data communication with the container through the user data interface. The container may further comprise a controller capable of executing non-transitory computer executable instructions stored in a non-transitory physical computer readable medium that is in communication with the controller; a battery or other power source in electrical communication with the controller and non-transitory computer readable medium; and a wired electrical interface, which may be, for example an electrical communications port such as a Universal Serial Bus (USB) port or parallel data port in communication with the non-transitory computer readable medium and controller for programming the non-transitory computer readable medium by communicating computer executable instructions to the non-transitory computer readable medium for storage and later retrieval and execution by the controller. The controller and battery or other power source may be in electrical communication with the GPS receiver. Likewise, in an embodiment, the controller and battery or other power source may be in electrical communication with the electromechanical lock so that the controller may command the electromechanical lock into locked or unlocked states.

In an embodiment, the geolocation receiver may comprise a wireless transceiver such as an RF transceiver capable of communicating with a remote wireless receiver for the purpose of transmitting a signal comprising geolocation information to a remote receiver without the need to transmit the signal comprising geolocation information through a controller to a remote receiver. In this embodiment, the container of the invention may thus comprise the ability to transmit a signal comprising geolocation information to a remote receiver without the need for a controller or separate wireless transceiver.

In an embodiment, the securable container may also comprise a mount into which a portion of the securable container engages in a sliding engagement. At least one retaining pin may protrude through an opening in the mount, into and through an opening in the enclosure of the securable container, and through an opening in the opposing surface of the mount. The retaining pin may comprise at least one void that is adapted to interlock with at least one surface of a spring loaded locking pin that runs along an axis that may be, but is not necessarily, perpendicular to the retaining pin. The locking pin is biased into a locking position by a biasing force that may be provided, for example, by a compression spring. The locking pin may be depressed by a user applying a force against the biasing force, causing the locking pin to translate towards the biasing spring, and causing the voids in the retaining pin to align with lesser diameters in the locking pin, allowing the retaining pin to be pulled out of the mount, and thus allowing the enclosure to be removed from the mount along its sliding engagement with the mount. When the securable container of the invention is in a locked state, the retaining pin is not accessible to a user because the retaining pin is located within the enclosed interior volume of the securable container. Thus, when the container of the invention is inserted into a mount and secured there by at least one retaining pin that is engaged with the locking pin in the mount, the enclosure of the invention is securely locked into the mount. It cannot be removed from the mount until the securable container is unlocked and the securable container is placed in an open state, allowing access to the enclosed interior volume of the securable container.

The present method and device of the invention overcome the shortcomings of the prior art by providing a container that conceals firearms such that they may be securely carried by a user, while allowing for quick and easy removal of the firearm when desired by a user. The securable container be lockable by a user, either locally or remotely, such that the securable container be capable of reporting its geolocation and status to a remote user, and that the container trigger the operation of certain safety or information-gathering devices when the firearm is removed from the container.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

DETAILED DESCRIPTION OF THE INVENTION

Figure 1:
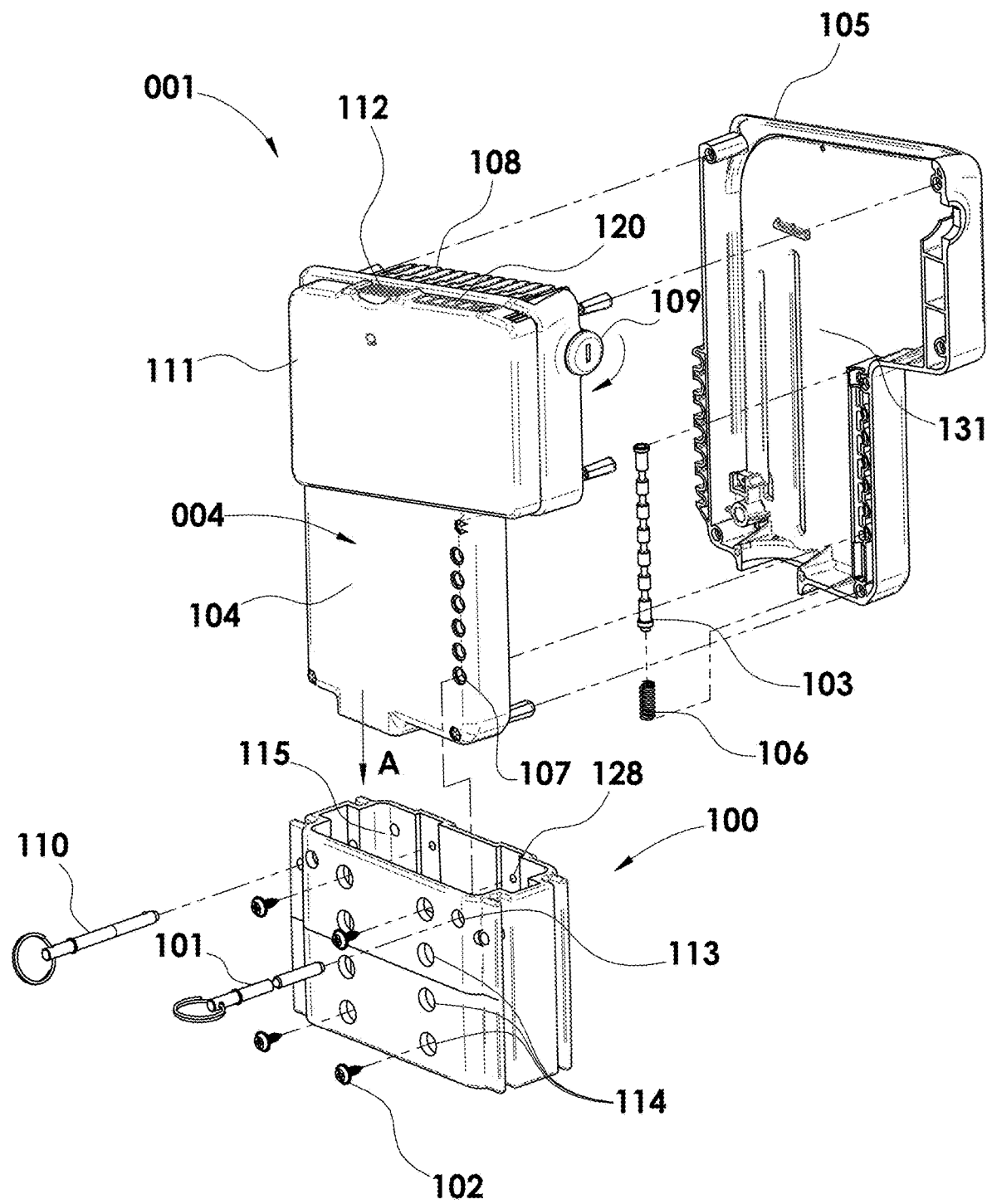
FIG. 1 depicts perspective exploded view of an embodiment of the container and mount of the invention.

The following documentation provides a detailed description of the invention. Although a detailed description as provided in the written description and drawings may contain many specific details for the purposes of illustration, a person of ordinary skill in the art will appreciate that many alternate embodiments, variations and equivalents to the following details are within the scope of the invention. Accordingly, the following described embodiments of the invention are set forth without any loss of generality to, and without imposing limitations upon, the claimed invention. Thus the scope of the invention should be determined by the appended claims, including any amendments thereto, and their legal equivalents, and not merely by the preferred examples or embodiments given.

As used herein, "memory", "medium", "media", "computer readable memory", "computer readable medium", "storage media", "computer readable storage media" and "computer readable storage medium" shall include within their meanings only physical non-transitory computer readable hardware, and such terms shall specifically exclude signals per se, carrier waves, propagating signals and other transitory signals. Such physical non transitory computer readable media may comprise hardware memory that comprises a physical structure for storing data which may include computer executable instructions or data.

As used herein, the terms "portable safe" and "safe" have the same meaning as "container" and "securable container".

As used herein, "remote user data interface" includes within its meaning one or any combination of wired or wireless communications interfaces known in the art including wired serial buses such as USB, RS-232 or other serial data interfaces; wired parallel data buses; radiofrequency or other wireless communications means such as, for instance and not by way of limitation, cellular communication systems such as CDMA or Global System for Mobile Communications, or GSM; analog data networks including cellular data networks; wireless Local Area Networks (LANs) such as the Institute of electrical and Electronic Engineers (IEEE) 802.11 standard known as Wi-Fi®; point to point communication systems such as Bluetooth®; infrared optical communications systems; RFID systems; Near Field Communication (NFC) systems or any other radiofrequency or optical communication systems known in the art in which a remote user can communicate with a local device either directly or through data interfaces with the world wide web.

As used herein, "closed state" means that retractable cover 108 at least partially occludes opening 006. In a closed state, a firearm 005 contained with the enclosed interior volume 131 of container 001 may not be removed from the container. It is preferred that firearm 005 is not visible from outside the container when the container is in a closed state.

Figure 10:
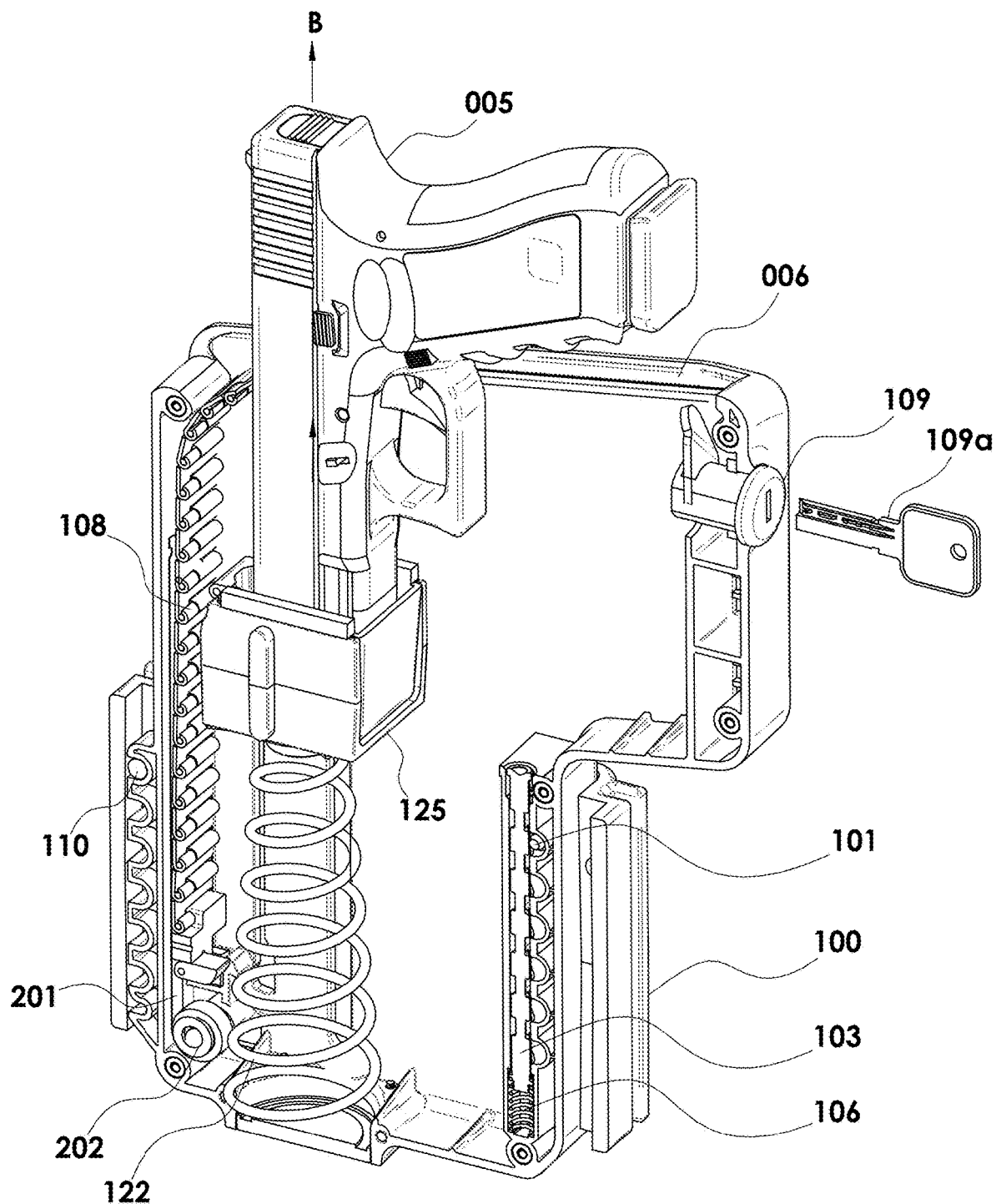
FIG. 10 depicts a perspective cross section view of an embodiment of the invention showing the enclosed interior volume 131 of container 001, with a firearm 005 contained with enclosed interior volume 131, in which container 001 is in an open state and firearm 005 has been motivated towards and through opening 006 formed by the retraction of retractable cover 108.

As used herein, "open state" means that retractable cover 108 does not occlude opening 006, or that cover 108 occludes only a small portion of opening 006, allowing a firearm to be extracted from the enclosed interior volume of the container as depicted in FIG. 10. In a closed state, a firearm 005 contained with the enclosed interior volume of the container cannot be removed from the container through opening 006.

As used herein, "locked state" means either that 1) retractable cover 108 is not able to retract along track 129 when button 112 is depressed (as when using key lock 109), or that button 112 is prevented from being depressed (as when using the electromechanical actuator 621 as a locking device) preventing retractable cover 108 from being able to retract along track 129, and preventing container 001 from being placed in an open.

As used herein, "unlocked state" means that retractable cover 108 is able to retract along track 129 when button 112 is depressed, allowing container 001 to be placed into an open state when button 112 is depressed.

As used herein, "mobile device" includes within its meaning any portable electronic device that is capable of receiving command input from a user through any user interface known in the art such as, for example, a keyboard, touchscreen, voice command received by a microphone, or data interface, and is capable of communicating the received command to a remote receiving device (which may be a securable container of the invention) by wireless such as an RF or optical communication link, or wired means such a wired communication link such as Ethernet, Universal Serial Bus, or any other wired means of communication as is known in the art. Thus, mobile devices may comprise a user interface in communication with a controller and at least one communication port, wireless or wired, in communication with a controller. In embodiments, the securable container of the invention may be in communication with one or mobile devices via the remote user data interface of the invention.

Referring now to FIG. 1, a perspective view of an embodiment of a container of the invention 001 in a closed state is depicted. The container may form an enclosed interior volume 131 comprising interior surfaces and also having an opening 006 (see FIGS. 10 and 12) that may be covered by retractable cover 108. The container may be used to contain valuables such as firearms. It is understood that the container may be utilized to carry any object as may be desired by user although in the figures of the drawings a firearm 005 is depicted as being carried within the container 001. It is thus within the scope of the claims that the container may be utilized to carry not only firearms but other objects as well, and in fact may carry any object desired by a user. Depicted in FIG. 1 are pushbuttons 116-119 forming keypad 120, which may be in electrical communication with a controller 800 (see FIG. 17) by electrical wiring or other connection means as may be known in the electrical arts. Retractable cover 108 is depicted in FIG. 1 as at least partially occluding opening 006. Generally, retractable cover 108 may entirely occlude opening 006 as when the container is in a closed state, or retractable cover may be retracted along its track 129 (shown in FIGS. 8B and 9) creating an opening 006 in container 001 that is not occluded by retractable cover 108, which allows a firearm 005 (as shown in FIG. 10) to be motivated partially through opening 006 by firearm eject spring 122 when retractable cover 108 is retracted, releasing the latching mechanism that prevents firearm eject spring 122 from expanding towards opening 006 in the direction of arrow B as is discussed below in relation to FIG. 13B.

Still referring to FIG. 1, button 112 may be utilized by a user to cause retractable cover 108 to retract into retracted position, placing the container into an open state, as follows. Retractable cover 108 is subjected to a biasing force provided by tension spring 201 that tends to pull retractable cover 108 along its track in the direction of arrows C such that container 001 is placed into an open state. In operation, when a user desires to access a firearm disposed within the interior volume of the container 001 of the invention, the user depresses button 112 which releases a retractable cover latching mechanism (see FIG. 13A and the discussion of FIG. 13A below), allowing spring 201 (not shown in FIG. 1 but shown in FIGS. 13A, 13B and 14) disposed within the interior volume of the container, to pull the retractable cover 108 to retract along its track 129 into the enclosed interior volume of the container, thus retracting retractable cover 108 and placing container 001 into an open state. Spring 201 may be a constant force spring. When retractable cover 108 retracts into a retracted, or open, position as further depicted in FIGS. 10 and 13B, the container opening 006 is created in an upper surface of container 001, and a firearm 005 contained within the interior volume of the container may be motivated into an extended position where it may be disposed partially through opening 006, making the firearm handle readily accessible by a user, as depicted in FIG. 10, by expansion of firearm eject spring 122. This is explained in further detail in the discussion regarding FIG. 10 below.

Still referring to FIG. 1, a container 001 of the invention may be utilized by a user for carrying in a vehicle or in any other circumstance or situation which a user may desire to carry a firearm or other valuables in a lockable container while still having the ability to quickly access the contents of the container. The container may be removeably attached to a surface of a vehicle or other desired structure by mount 100. In such uses, the mount may be attached to an interior surface of a vehicle, such as the side of a console, using attaching hardware such as threaded fasteners 102. The container 001 may attach to mount 100 by retaining pins 110 and 101 as further described below. Retaining pins 101 and 110 may protrude through openings 113 and 113a, respectively, in mount 100, and may also protrude through opening in enclosure 001, securing container 001 to mount 100. In an embodiment, retaining pin 101 may have a void that interlocks with a corresponding void in a locking pin 103 that is captured with enclosed interior volume 131, preventing removal of retaining pin 101, and securing container 001 to mount 100 as depicted in FIGS. 4A-4D and further described below.

A container of the invention 001 may be comprised of one or more exterior components together forming an outer surface, forming enclosed interior volume. The exterior surface of container 001 may take any desired shape; does not necessarily need to conform to the shape depicted in the drawings. Furthermore, the components forming the exterior shape and enclosed interior volume may be fabricated in any number of pieces that are attached together to form the exterior shape. In the figures, an exemplary embodiment comprising two pieces 104 and 105, which each may be molded, cast, forged, manufactured by additive manufacturing, machined or fabricated by any means, is depicted. In an embodiment, the two pieces 104 and 105 come together as depicted in FIG. 1, forming the exterior shape and enclosed interior volume. However, any number of pieces may comprise exterior surfaces of the invention.

Figure 6:
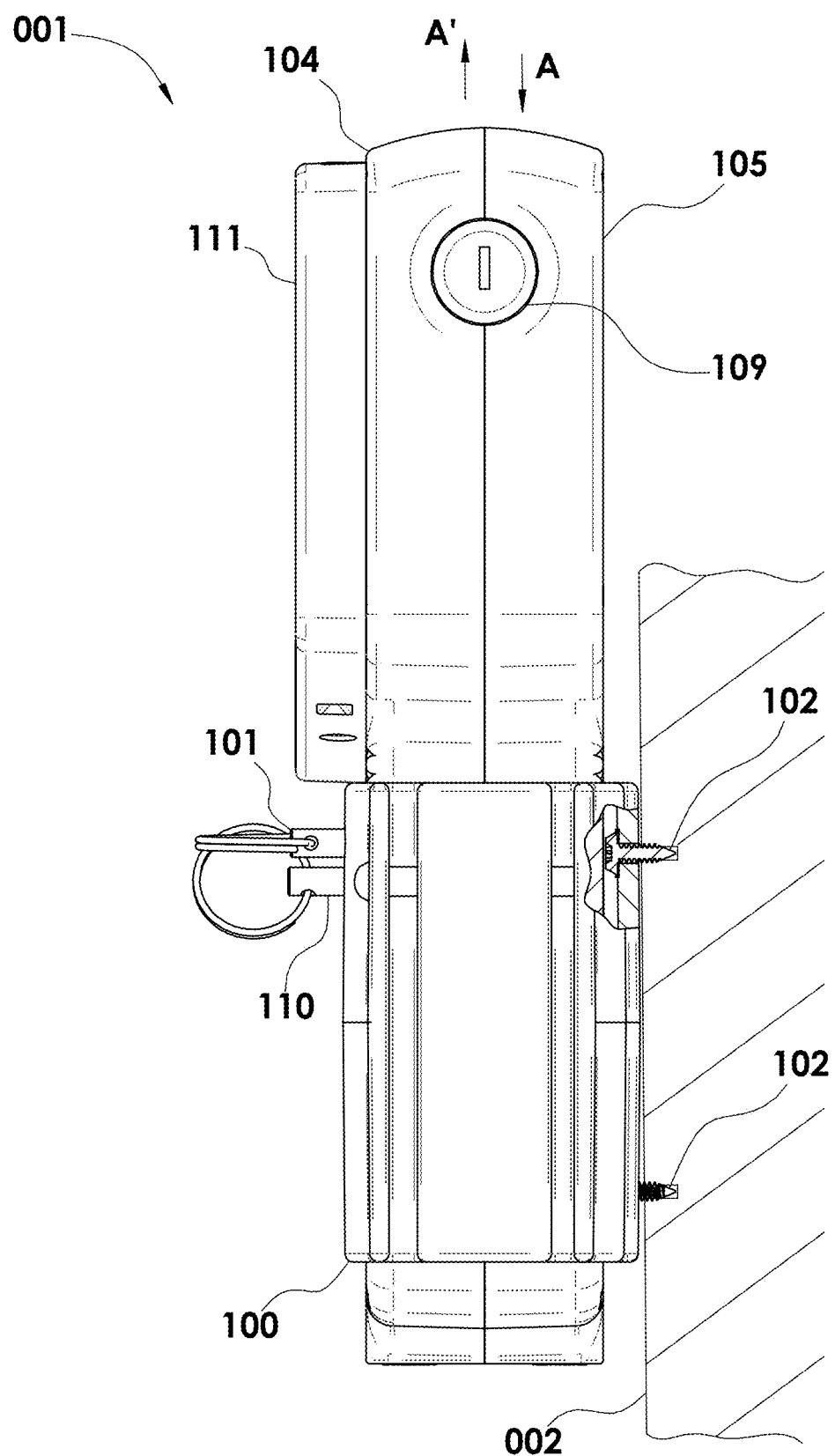
FIG. 6 depicts an orthogonal side view of an embodiment of mount 100 and enclosure 001, shown from the keylock side.
Figure 7:
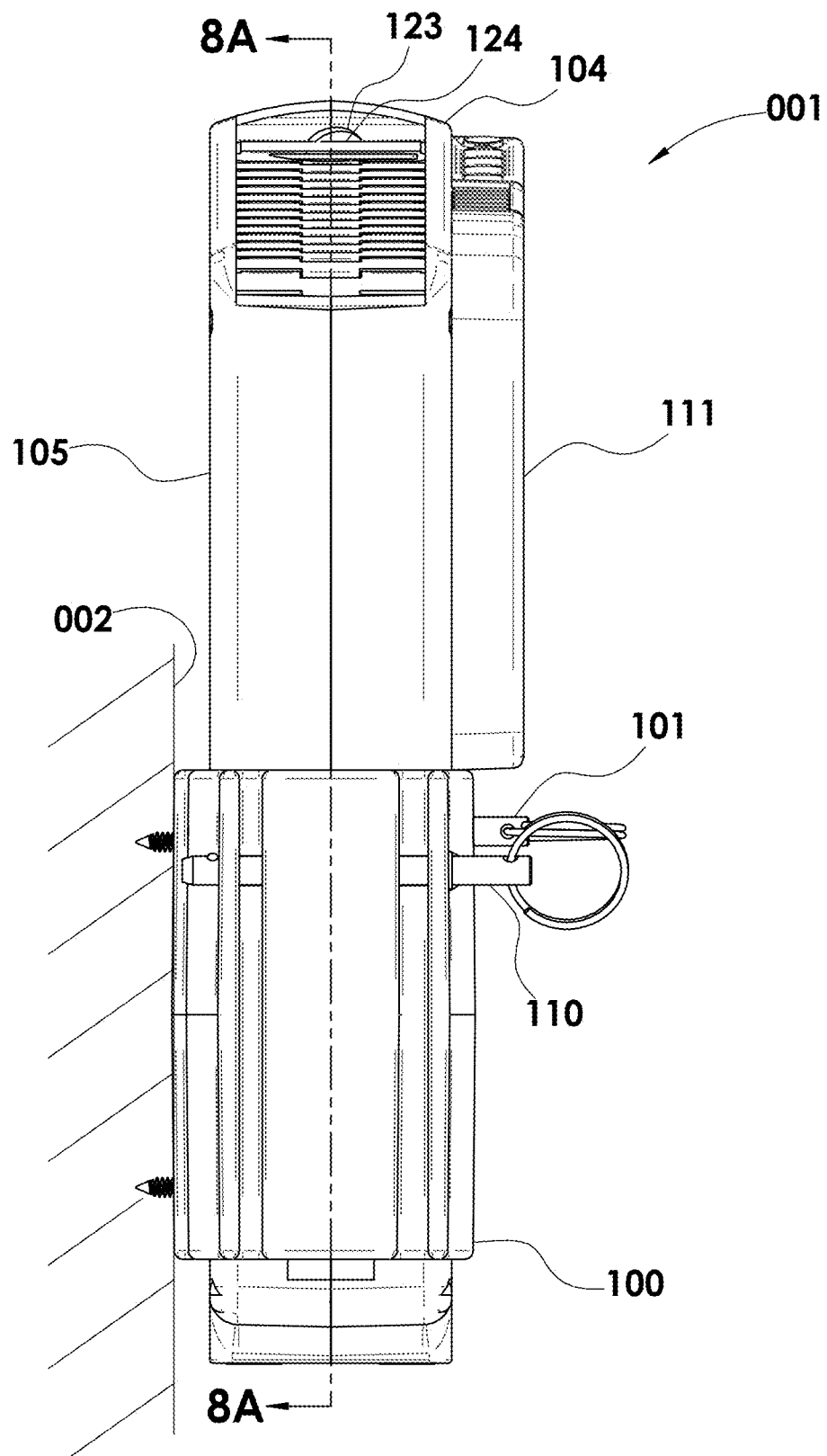
FIG. 7 depicts an orthogonal side view of an embodiment of mount 100 and enclosure 001.
Figure 11:
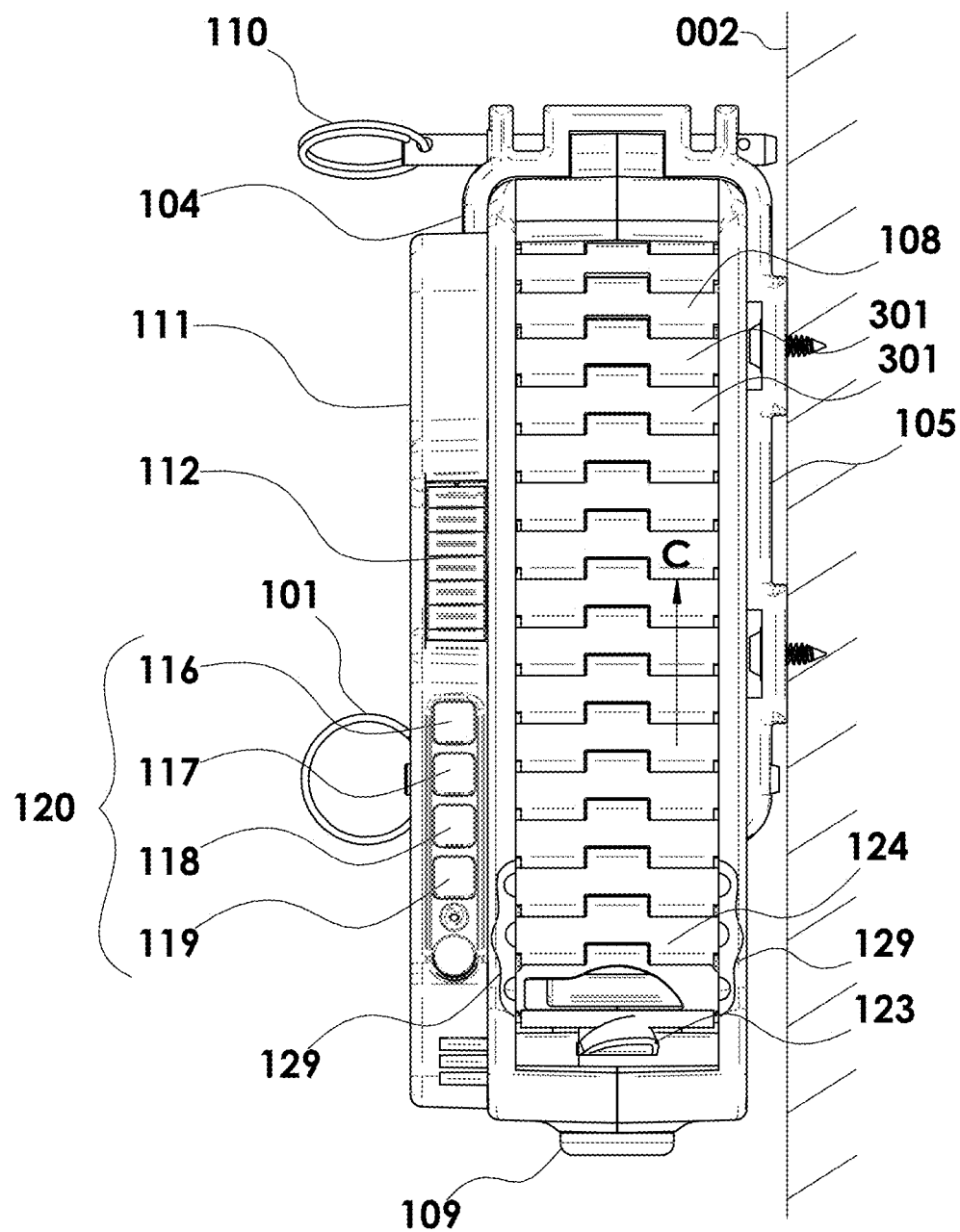
FIG. 11 depicts an orthogonal top view of an embodiment of the invention attached to a structure 002, showing container 001 transitioning from a closed to an open state.

Still referring to FIG. 1, container 001 may have a container insertion portion 004 that, when motivated along direction A, may be inserted into and received by mount receiving opening 115 in mount 100. In embodiments, the engagement between container insertion portion 004 and mount receiving opening 115 may be a sliding engagement. As described above and further in relation to FIGS. 4A-4D, retaining pin 101 and locking pin 103 may operate together by interlocking to prevent removal of retaining pin 101 unless container 001 is placed into an open state, allowing access to locking pin 103 so that it may be depressed against locking pin spring 106, allowing alignment of a void in locking pin 103 to align with an outer diameter of retaining pin 101, allowing retaining pin 101 to be removed such that the container insertion portion 004 may be removed from mount receiving opening 115. Attachment means such as threaded fasteners 102 or any mechanical attachment means may be utilized to attach mount 100 to any desired surface 002 through, for example, mount attaching holes 128, as depicted in FIGS. 6, 7 and 11. Openings 114 may operate as mount fastener tool holes, allowing screwdrivers, nut drivers, ratchet extension or other torque-applying tools to be inserted there through for tightening or loosening mount attaching fasteners 102 against an attaching surface 002.

Figure 8A:
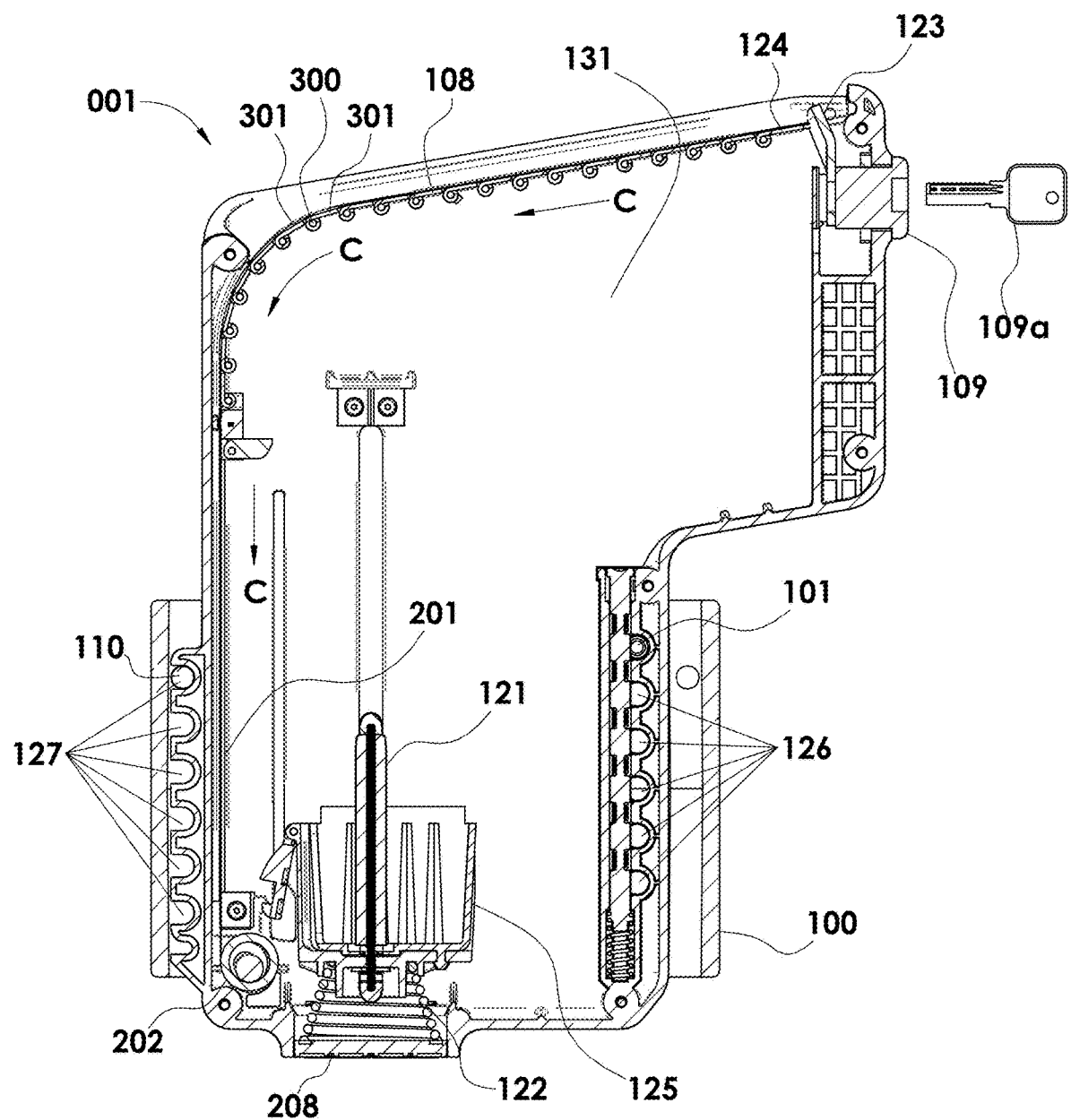
FIG. 8A depicts a cross-section view of an embodiment of the invention showing the details of retractable cover 108, openings 126 and 127 for adjusting the depth to which container 001 is inserted into mount 100, and showing details of firearm eject spring 122 and firearm receiving structure 125.
Figure 8B:
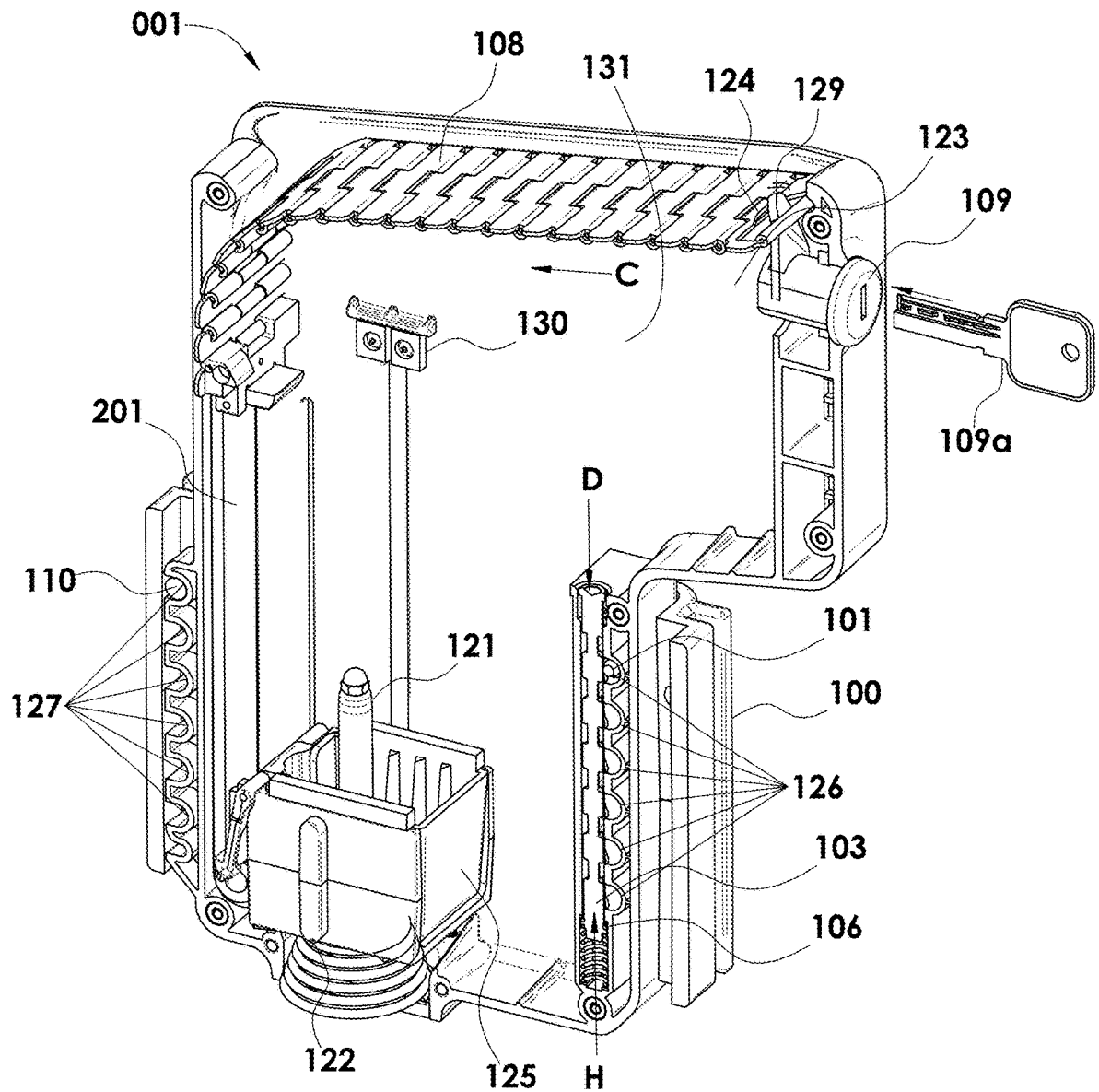
FIG. 8B depicts a perspective cross section view of an embodiment of the invention showing the enclosed interior volume 131 of container 001, with no firearm 005 contained with enclosed interior volume 131.

Still referring to FIG. 1, in an embodiment, a key lock 109 may be utilized to lock the retractable cover with the cover is occluding opening 006, i.e. when the container is in a closed state. When a key 109a, as shown in FIGS. 8A and 8B, is inserted into key lock 109 and the key is rotated, key lock tang 123 is rotated out of retractable cover key lock tang receiving opening 124, allowing retractable cover 108 to be retracted along arrow C by the force provided by spring 201 when button 112 is depressed as further discussed below.

Figure 2:
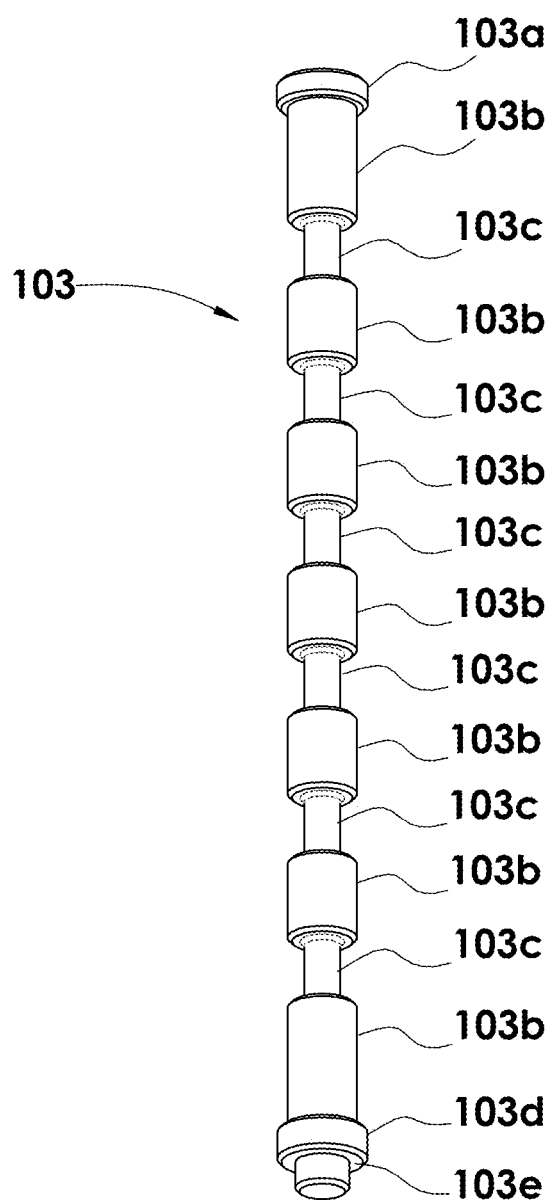
FIG. 2 depicts a perspective view of an embodiment of a locking pin of the invention having portions greater diameter 103b and lesser diameter 103c.
Figure 3:
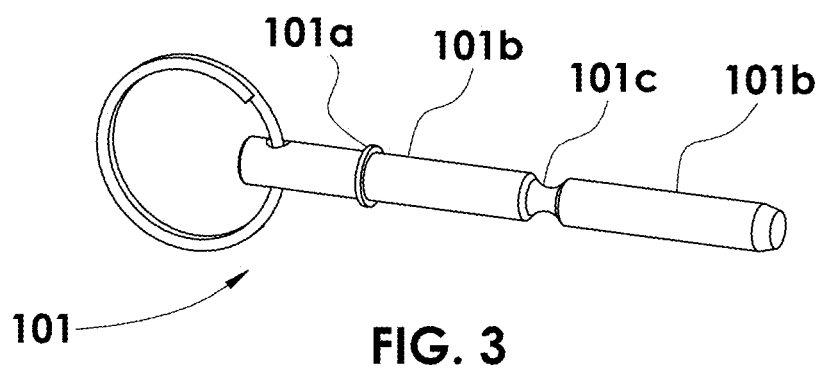
FIG. 3 depicts a perspective view of an embodiment of a retaining pin of the invention.

Referring now to FIGS. 2 and 3, an embodiment of a locking pin 103 and retaining pin 101 of the invention is depicted. Locking pin 103 may comprise a flange 103a, sections of greater outer diameter 103b, sections of lesser outer diameter 103c where outer diameter 103b is greater than outer diameter 103c, a flange 103d and a diameter 103e. As further shown in FIGS. 4A-4D and 5A, the sections of smaller outer diameter may interlock with a void 101c in retaining pin 101, effectively locking container 001 into mount 100. Flange 103d provides a surface 103e against which locking pin spring 106 may exert a biasing force. Locking spring 106 may be a compression spring with an outer diameter equal to or slightly lesser than the diameter of flange 103d, thus preventing locking pin spring 106 from sliding away from flange 103d in operation. Retaining pin 101 may comprise an optional flange 101a for preventing over-insertion of retaining pin 101 into mount 100 and container 001. Retaining pin 101 may have an outer diameter 101b.

Figure 4A:
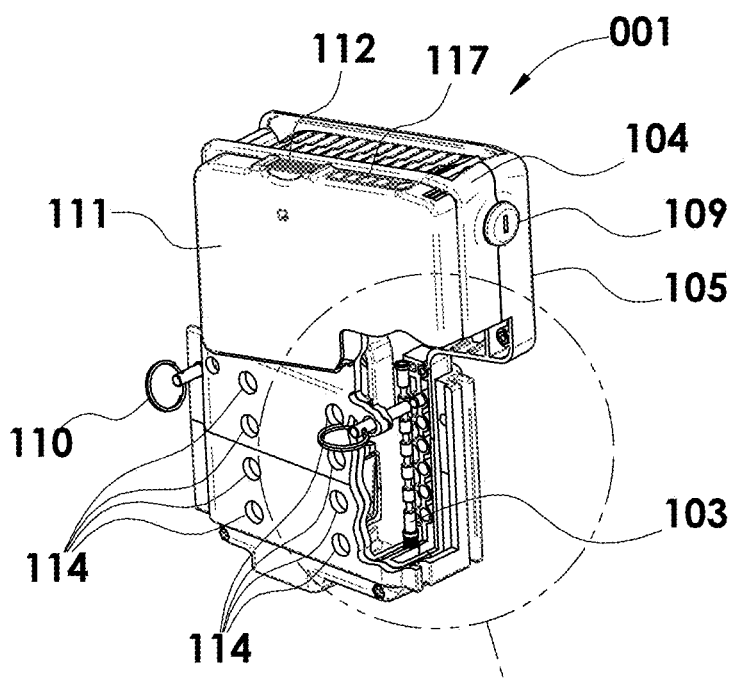
FIG. 4A depicts a perspective view of an embodiment of the container and mount of the invention in a closed state.
Figure 4B:
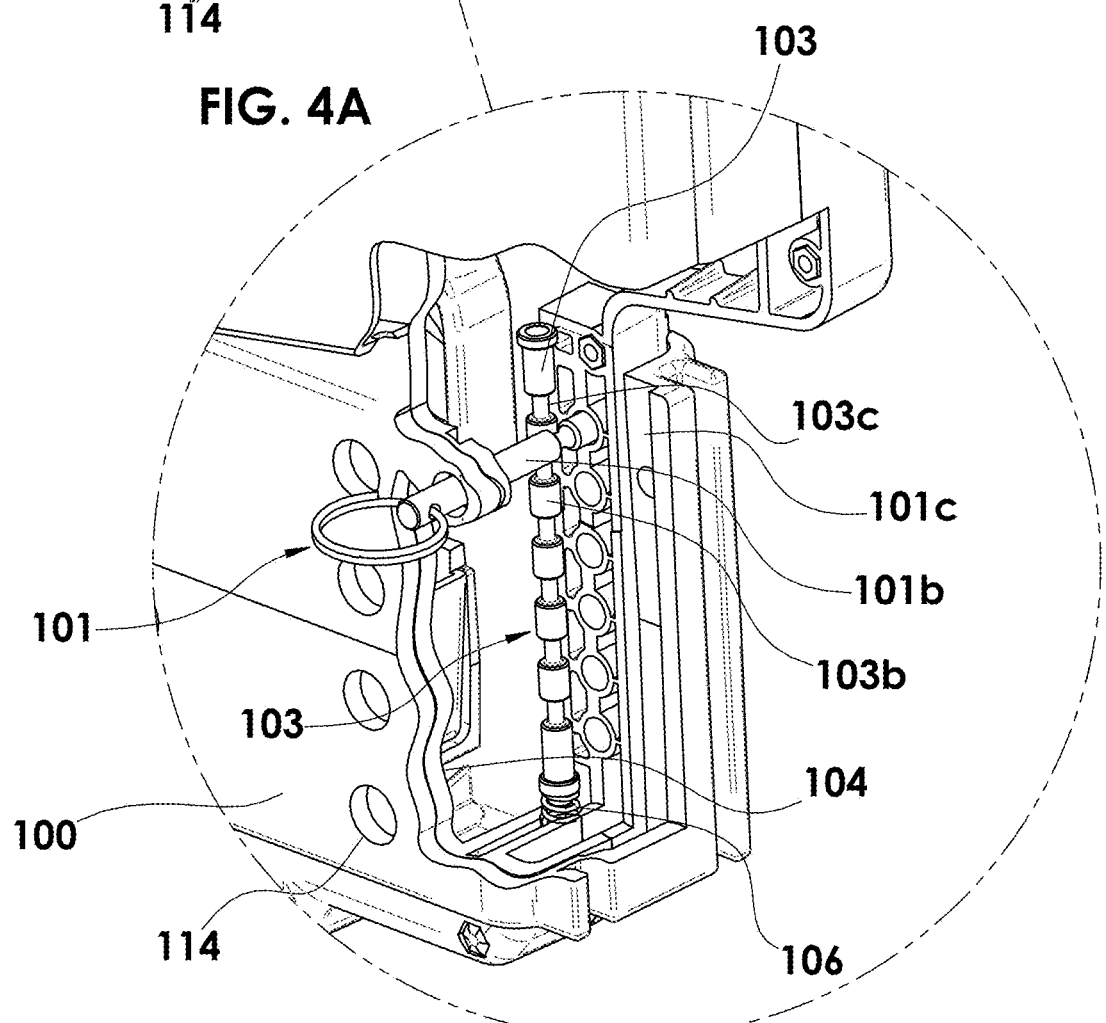
FIG. 4B depicts a perspective view of a cross-section of an embodiment of the invention depicting details of the locking pin 103 and retaining pin 101 in a state in which retaining pin 101 cannot be removed from mount 100 and enclosure 001, securing mount 102 enclosure 001.
Figure 4C:
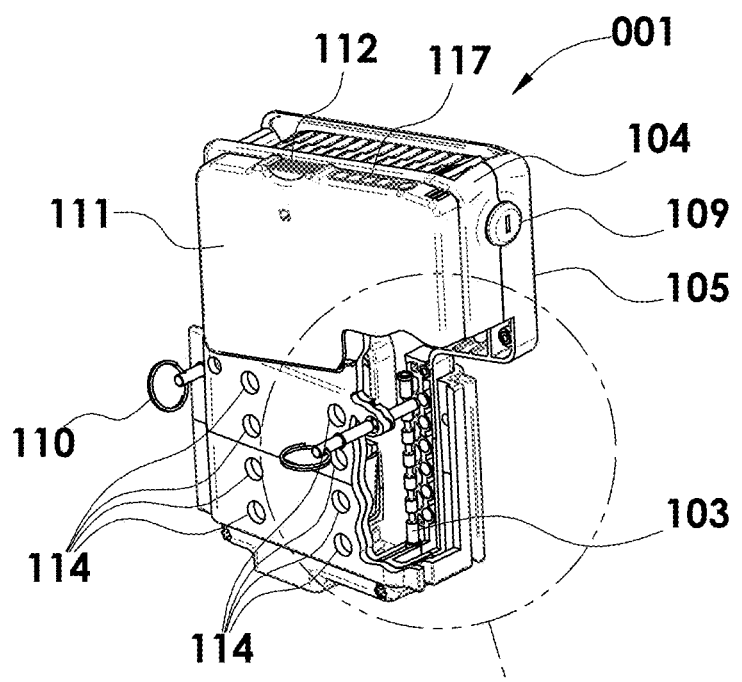
FIG. 4C depicts a perspective view of an embodiment of the container and mount of the invention in a closed state, with retaining pin 101 partially removed from the container and mount.
Figure 4D:
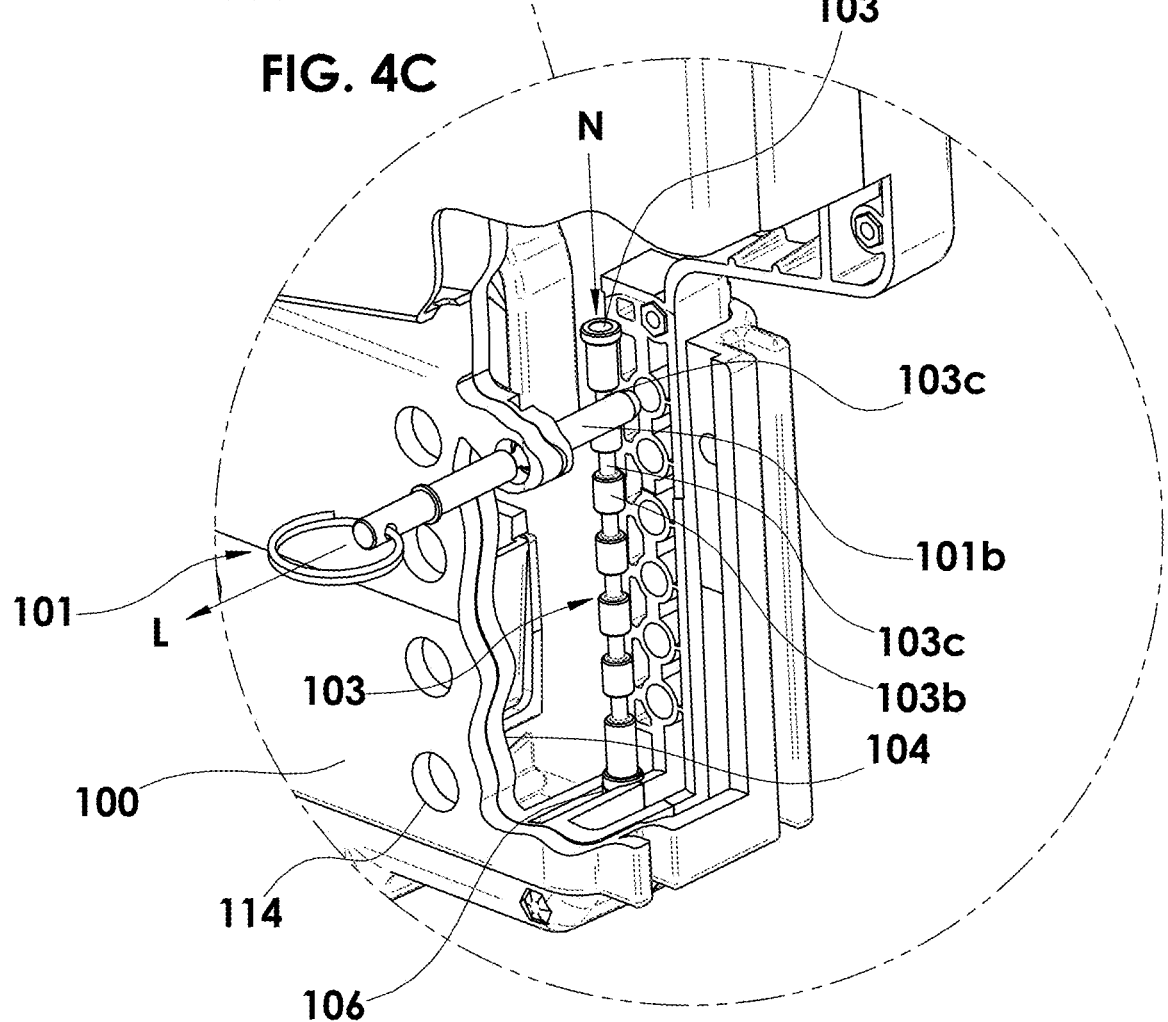
FIG. 4D depicts a perspective view of a cross-section of an embodiment of the invention depicting details of what the locking pin 103 and retaining pin 101 in a state in which retaining pin 101 may be removed from mount 100 and enclosure 001, allowing enclosure 001 to be removed from mount 100.
Figure 5A:
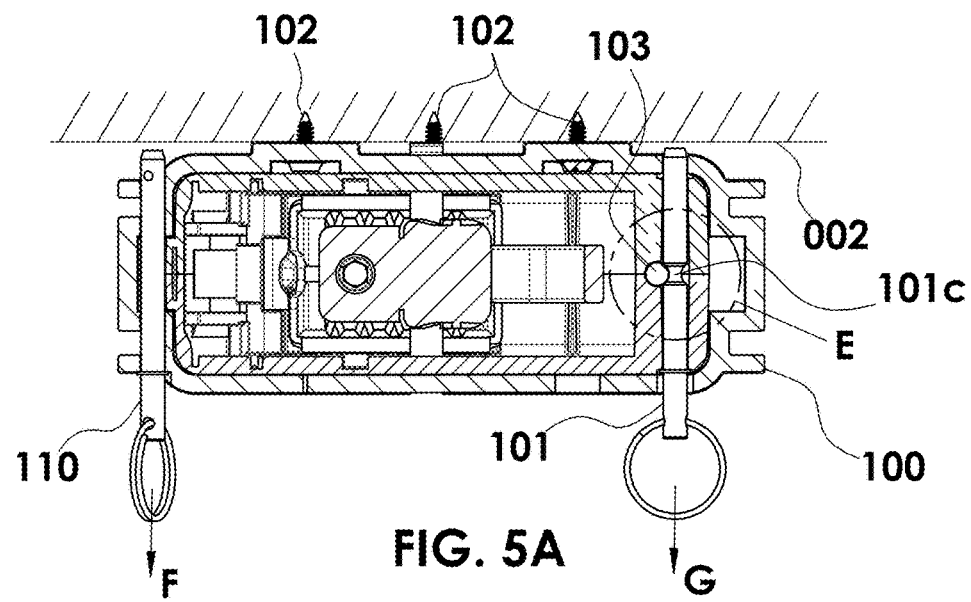
FIG. 5A depicts a cross sectional view of an embodiment of the invention, shown from the top, in which retaining pin 101 is interlocked with locking pin 103 such that retaining pin 101 cannot be removed from mount 100 and enclosure 001.
Figure 5B:
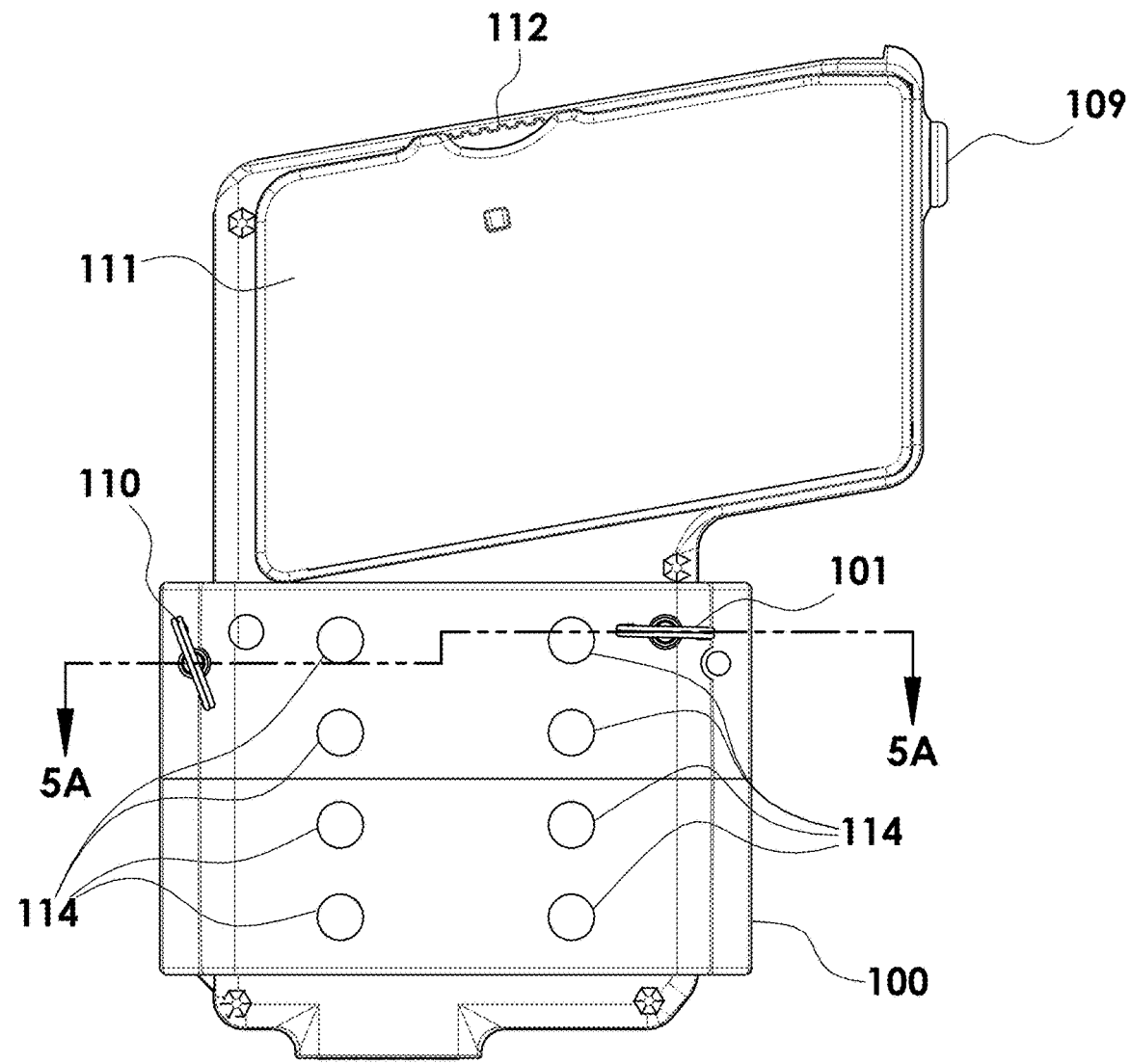
FIG. 5B depicts an orthogonal front view of an embodiment of mount 100 and enclosure 001.

Referring now to FIGS. 4A-4D FIGS. 5A-5B, perspective views of the container 001 and mount 100 of the invention are depicted in FIGS. 4A and 4C. Enlarged views of the container retaining mechanism using a retaining pin 101 and locking pin 103 to secure container 001 into mount 100 are depicted in FIGS. 4B and 4D. An orthogonal side view of the invention is depicted in FIG. 5B, and a cross sectional view from the top is shown in FIG. 5A. In FIGS. 4A and 4B, container 001 is secured to mount 100 and cannot be removed from mount 100 unless container 001 is placed into an open state, allowing access to locking pin 103 so that locking pin 103 may be manually depressed against force H provided by locking pin spring 106 (see FIG. 8B). Retaining pin 101 is held in place and cannot be removed because its void 101c, as shown in FIG. 2, is engaged with, and "locked" to, a greater diameter 103b of locking pin 103. In this state, container 001 cannot be removed from mount 100 as long as container 001 remains in a closed state—thus, if container 001 is in a locked state, it cannot be removed from mount 100 because it cannot be opened while locked. If container 100 is unlocked and placed into an open state, retaining pin 103 is accessible by a user. In this state a force N may be asserted on locking pin 103 as shown in FIG. 4D. Force N is applied in opposition to the force H applied by spring 106 (see FIG. 8B). When locking pin 103 is motivated in the direction of N against force H, locking pin 103 is translated relative to void 101c in the direction of arrow N such that void 101c in retaining pin 101 may line up with an lesser outer diameter 103c in locking pin 103, removing the interference between the outer diameter 101b of retaining pin 101 and the outer diameter 103b of locking pin 103, and thereby allowing retaining pin 103 to be extracted from mount 100 and container 101 in the direction of arrow G as shown in FIG. 5A. In order to remove container 001 from mount 100, retaining pin 110 must also be extracted from mount 100 and container 101 in the direction of arrow F. Mount fastener tool holes 114, cover 111, retractable cover release button 112, and key lock 109 are depicted for reference. Referring to FIG. 5A, the mount may be attached to any structure 002 by any means for attaching structures together, which include, as an example, threaded fasteners 102.

Referring now to FIGS. 6 and 7, orthogonal side views of an embodiment of the securable container and mount system are depicted. FIG. 6 depicts an orthogonal side view from the keylock side of the container. Mount 100 may be attached to any attaching surface 002 using fasteners 102. Attaching surface 002 may be any desired surface of a vehicle, piece of furniture, boat, watercraft, snowmobile, all-terrain vehicle, or any other surface to which it is desired to attach the securable container 001 of the invention. Retaining pins 101 and 110 are depicted for reference. Electronics cover 111, which may house the electronic components and associated printed circuit boards and wiring disclosed herein, is shown for reference. Container pieces 104 and 105 are depicted for reference, and are shown as but one of many embodiments of the container comprising one or more pieces to aid in manufacturability and assembly. Arrow A depicts the direction in which container 001 is inserted into mount 100 such that container insertion portion 004 is inserted into mount receiving opening 115 as shown in FIG. 1. Arrow A' depicts the direction in which container 001 is removed from mount 100 when retaining pins 101 and 110 have been extracted from mount 100 and container 001.

Manual keylock 109 is adapted to receive a key 109a for manually locking and unlocking container 001. When key 109a is inserted into keylock 109 and manually rotated, keylock tang 123 may be rotated such that it protrudes through keylock tank receiving opening 124 in retractable cover 108, as depicted in FIG. 7. When keylock tang 123 has been rotated by the rotation of a key 109a in keylock 109 such that it protrudes through keylock tang receiving opening 124 in retractable cover 108 (see FIG. 8B), container 001 has been manually placed into a locked state in which retractable cover 108 will not retract when button 112 is depressed.

Referring now to FIGS. 8A and 8B, cross-sectional views of container 001 and mount 100 are depicted. It is an object of mount system of the invention that the distance to which container 001 is inserted into and secured into mount 100 is adjustable to accommodate various attaching surfaces 002 and surrounding structures and environment in order to make the invention adaptable to various physical configurations of vehicle interiors, furniture, or the like. Thus, the structure of container 001 contains a plurality of openings 127 arranged so as to receive retaining pin 110 in any of them, and likewise the structure of container 001 also contains a plurality of openings 126 so as to receive retaining pin 101 and any of them. In this manner, a user may select any one of openings 126 and 127 in order to adjust the distance to which container 001 is inserted into mount 100 to accommodate the available area surrounding attaching surface 002. Thus, the invention may be adaptable into various physical environments as accommodated by the adjustability of the distance to which a user selects to insert insecure container 001 into mount 100 by the selection of an opening 127 and 126 for insertion of retaining pins 110 and 101 respectively. In FIG. 7 retractable cover 108 is shown in an un-retracted position in which the container 001 is in a closed state. Keylock tang 123 has been rotated by the rotation of key 109a in keylock 109 such that it protrudes through key lock tang receiving opening 124 in retractable cover 108, placing container 001 in a locked state. A biasing force provided by cover retracting spring 201 and its winding 202 tends to pull retractable cover 108 along cover track 129 in the direction of arrows C. In the locked state shown in FIGS. 8A and 8B, retractable cover 108 is prevented from retracting by the interference of a surface of keylock tang receiving opening 124 with a surface of key lock tang 123. When the container is placed into an open state allowing access to enclosed interior volume 131, a user may depress locking pin 106 by manually pressing down on locking pin 106 as shown by arrow D, applying a force counteracting the force H supplied by locking pin 106. A user may wish to depress locking pin 106 when it is desired to remove securable container 001 from mount 100. When locking pin 106 is depressed and translated against the force H supplied by spring 106 by the application of force D, locking pin 103 may be translated in the direction of arrow H such that void 101c in retaining pin 101 can be lined up with a lesser outer diameter 103c of locking pin 103, allowing retaining pin 101 to be extracted from mount 100 and enclosure 001 in the direction of L as depicted in FIG. 4D. When container 001 is in a closed state, container 001 is securely fastened to mount 100 and may not be removed because retaining pin void 101c (see FIG. 2) engages with a greater outer diameter 103b of locking pin 103 (see FIG. 3), locking retaining pin 101 to locking pin 103 as depicted in FIG. 5A. When container 001 is in an open state, a user may reach into enclosed interior volume 131 through opening 006 created by the retraction of cover 108 and then depress locking pin 103 in the direction of arrow D, allowing retaining pin 101 to be extracted from enclosure 001 and mount 100. Firearm eject spring 122, firearm barrel receiving structure 125 and optional barrel pin 121 are depicted for reference.

Figure 9:
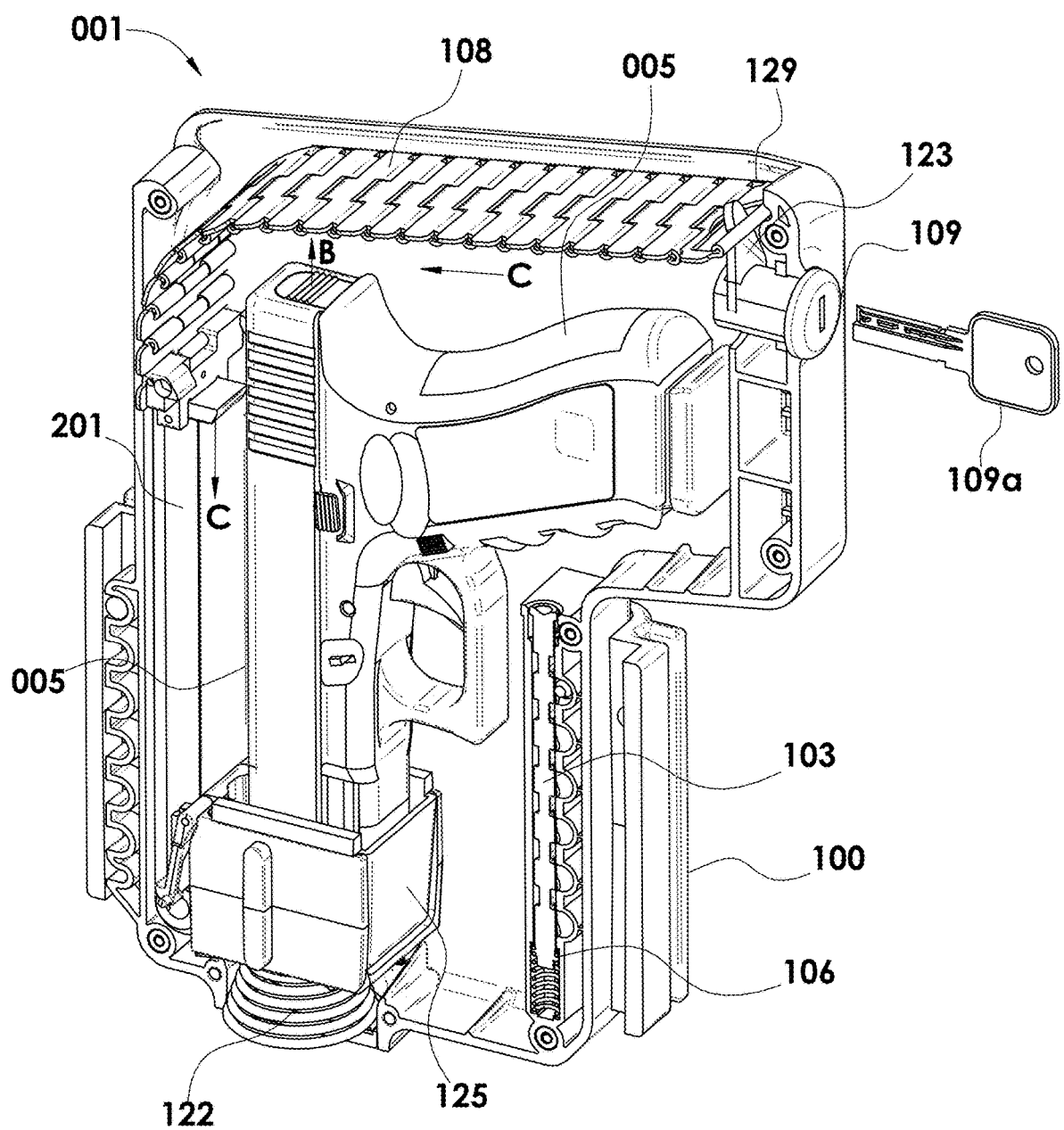
FIG. 9 depicts a perspective cross section view of an embodiment of the invention showing the enclosed interior volume 131 of container 001, with a firearm 005 contained with enclosed interior volume 131, in which container 001 is in a closed state.

Referring now to FIG. 9, a cross-sectional view of enclosed interior volume 131, into which a firearm has been inserted, is depicted. Firearm 005 has been inserted to and received by firearm barrel receiving structure 125, which is subjected to a biasing force B from spring 122, tending to motivate firearm barrel receiving structure and firearm 005 the direction of arrow B. However, firearm barrel retrieving structure 125 is latched, preventing it from translating in the direction of arrow B. Container 001 is in a closed state in which cover 108 is unretracted and locked by keylock tang 123. Retractable cover 108 is subjected to a biasing force from spring 201 acting in the direction of arrows C, tending to pull retractable cover 108 along track 129 into a retracted state. However, retractable cover 108 is also latched, preventing it from retracting and placing the container into an open state. Locking pin 103, locking spring pin 106, keylock 109 and key 109a are depicted for reference.

Referring now to FIG. 10, a cross-sectional view of enclosed interior volume 131, into which a firearm has been inserted, is depicted. Firearm 005 has been inserted to and received by firearm barrel receiving structure 125. In this figure, retractable cover 108 has been unlatched, allowing it to translate along track 129 into a retracted position as it is pulled along arrows see as shown in FIG. 9 by cover retracting spring 201 and its wound portion 202. The retraction of retractable cover 108 creates opening 006 and places container 001 into an open state. When retractable cover 108 retracts into a retracted position, it operates to release the latch mechanism preventing firearm eject spring 122 from expanding as shown in FIG. 13B and described in the description relative to FIG. 13B. Firearm eject spring 122 is thus allowed to expand, motivating firearm barrel receiving structure 125 and firearm 005 in the direction of arrow B, towards and through opening 006 which has been created by the retraction of retractable cover 108. Firearm 005 is thus accessible by a user. Locking pin 103, locking spring pin 106, keylock 109 and key 109a are depicted for reference.

Referring now to FIG. 11, an orthogonal top view of container 001 and mount 100 is depicted showing mount 100 attached to an attaching surface 002. Retractable cover 108 is shown as just having been unlatched by the depression of button 112, allowing retractable cover 108 to translate in the direction of arrow C. Thus, in FIG. 11, container 001 is shown transitioning from a closed state to an open state. Container pieces 104 and 105, which are but one embodiment of container 001 depending on manufacturing and assembly preferences, are shown for reference. Retaining pins 110 and 101, and pushbuttons 116-119 forming keypad 120 are also shown for reference. Keylock 109 is shown for reference. Retractable cover 108 may comprise a plurality adjoining links 301, which are rotably joined by a pin inserted through each link at each link joint, forming flexible cover assembly comprising a plurality of rotably joined links.

Figure 12:
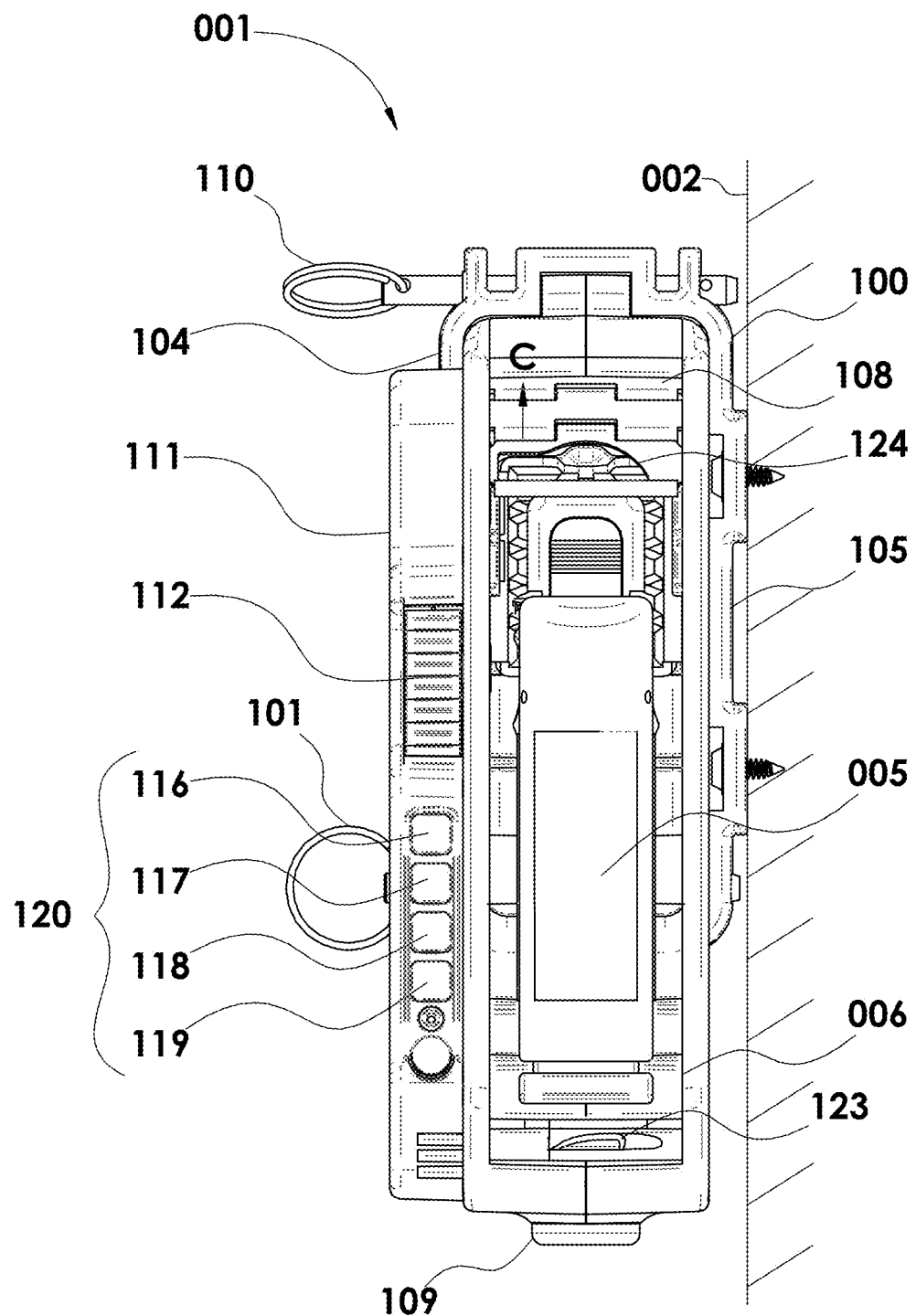
FIG. 12 depicts an orthogonal top view of an embodiment of the invention attached to a structure 002, showing container 001 in an open state in which enclosed interior volume 131 is accessible through opening 006 formed by the retraction of retractable cover 108.

Referring now to FIG. 12, an orthogonal top view of container 001 and mount 100 is depicted showing mount 100 attached to an attaching surface 002. Retractable cover 108 is shown retracted. Thus, in FIG. 11, container 001 is shown transitioning in an open state. Opening 006, which allows the protrusion of firearm 005 through the top of container 001 when firearm retaining spring 122 and firearm barrel receiving structure 125 are unlatched, has been created by the retraction of retractable cover 108. Container pieces 104 and 105, which are but one embodiment of container 001 depending on manufacturing and assembly preferences, are shown for reference. Retaining pins 110 and 101, and pushbuttons 116-119 which may be in communication with controller 800 (see FIG. 17) forming keypad 120 are also shown for reference. Keylock 109 is shown for reference.

Figure 13A:
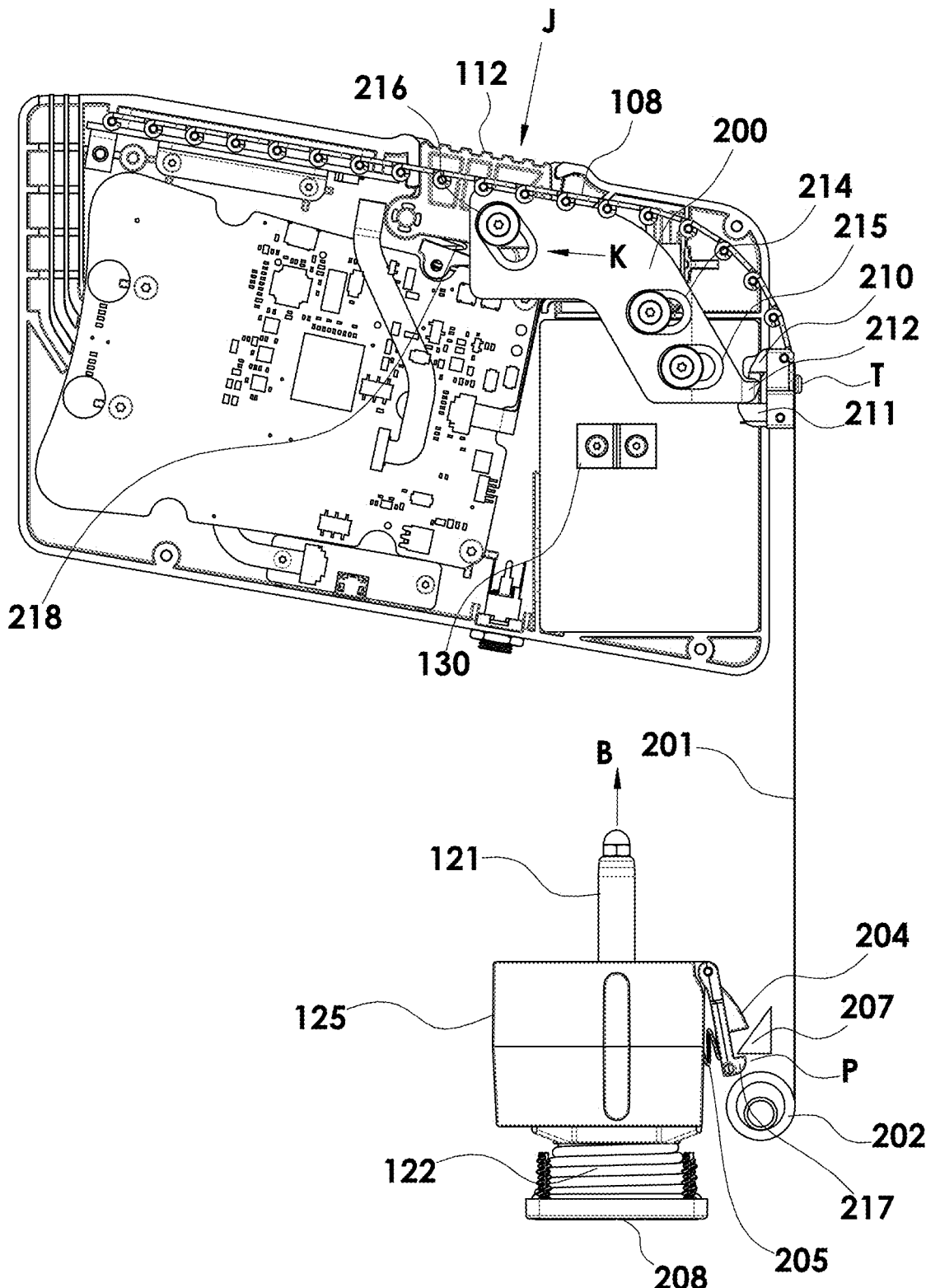
FIG. 13A depicts a partial view of the retractable cover latching mechanism and the firearm barrel receiving structure latching mechanism, and depicting how the depression of button 112 operates to release cover 108 such that it retracts, placing container 001 in an open state. In this figure retractable cover 108 is depicted in a closed state.
Figures 13B, 13C:
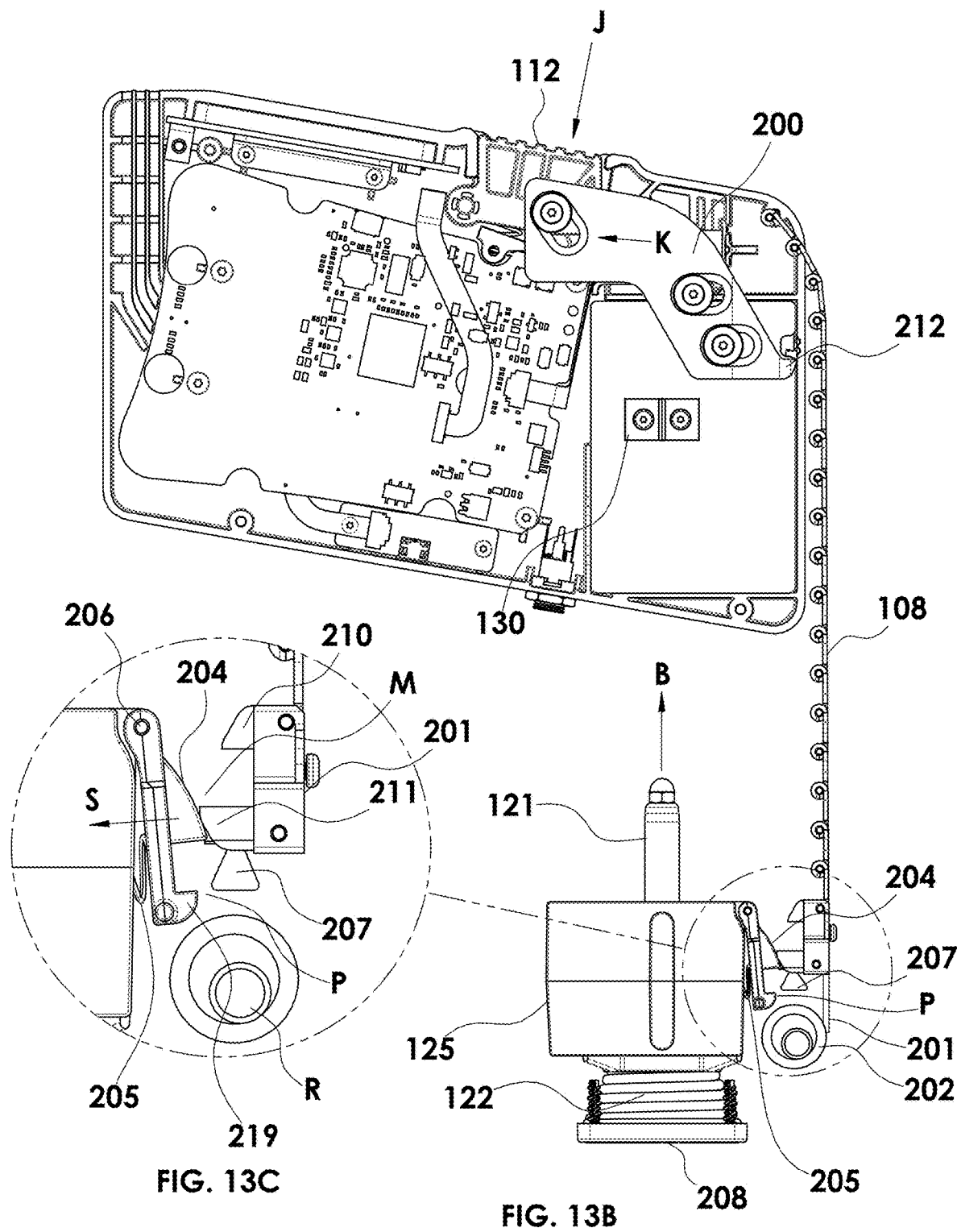
FIGS. 13B and 13C depicts a partial view of and in body meant of the invention, showing the retractable cover latching mechanism in the firearm barrel receiving structure latching mechanism, and retractable cover 108, in an open state in which retractable cover 108 has been retracted and has engaged firearm release pawl 204, just prior to the expansion of firearm eject spring 122.

Referring now to FIGS. 13A-16, the operation of retractable cover 108, and the operation of firearm eject spring 122 to motivate a firearm mounted into firearm barrel receiving structure 125 towards opening 006 when retractable cover 108 is retracted, placing the container in an open state, and returning the container to a closed state, is now described. Generally, the operation of the container is that the depression of retractable cover release button 112 causes retractable cover 108 to be unlatched so that it may be translated along track 129 towards a retracted position, being pulled in that direction by the biasing force provided by cover retracting spring 201 in the direction of arrows C. When retractable cover 108 reaches the fully retracted position (as shown in FIG. 13B, firearm eject spring 122 and firearm barrel receiving structure 125 are unlatched, allowing firearm eject spring 122 to motivate firearm barrel receiving structure 125 and any firearm 005 disposed thereon, towards opening 006 created by the retraction of cover 108. Retractable cover 108 is subject to a biasing force tending to pull cover 108 into a retracted position as shown in FIG. 13A. This retractable cover biasing force may be applied by spring 201, which may be any spring but, in embodiments, may be a constant force spring comprising a sheet metal strip that has been wound about an axis forming a wound portion 202 (see FIG. 13A), having the exterior end pulled tangentially away from the wound sheet metal, resulting in a force tending to pull the sheet metal strip back to the wound portion 202. Such springs are known in the art sometimes as "constant force springs". The exterior end of spring 201 may be attached to an end of retractable cover 108 at point T. In this manner, retractable cover 108 is subjected to a biasing force tending to translate retractable cover 108 along track 129 along arrows C into a retracted position in which container 001 is in an open state.

Referring now to FIG. 13A, a partial internal view of the invention is depicted. Retractable cover 108 is depicted in a non-retracted position in which it occludes, or partially occludes, opening 006 such that a firearm disposed in enclosed interior volume 131 may not be accessed from outside container 001. Thus container 001 is depicted in a closed state in FIG. 13A, and a firearm (not shown for clarity in FIG. 13A but shown in FIG. 9) that is received by firearm barrel receiving structure 125 is in a non-eject state, meaning that a firearm 005 disposed on firearm barrel receiving structure 125 has not been motivated towards opening 006 by firearm eject spring 122. Firearm barrel receiving structure 125 is latched in this state until unlatched when retractable cover 108 retracts as described below in relation to FIGS. 13B and 13C. Thus, in this closed state, the enclosed interior volume 131, and any firearm 005 disposed therein, are not accessible from outside container 001. When a user wishes to access the enclosed interior volume 131, or access firearm 005 or remove it from container 001, the user may depress retractable cover release button 112 by applying a force J on retractable cover release button 112 that is great enough to overcome a cover release button compression spring biasing force tending to resist applied force J. The cover release button compression spring biasing force may be provided by a compression spring disposed between a surface of button 112 and an interior surface of container 001. I.e., retractable cover release button 112 is spring-loaded by spring 218 (see FIG. 13D) to resist applied force J. When force J is applied, retractable cover release button 112 is depressed, latch plate 200 is translated in the direction of arrow K along slots 213, 214, and 215 because fastener 216 passes through slot 213 into retractable cover release button 112. Thus, when button 212 is depressed by applied force J, fastener 216 translates downward, causing latch plate 200 to be translated in the direction of arrow K along slots 213, 214, and 215. When latch plate 200 is thus translated in the direction of arrow K by the depression of button 112, cover retention pawl 210 becomes disengaged from latch plate pawl 212, unlatching and releasing retractable cover 108 to translate along cover track 129, pulled by spring 201, into the fully retracted position shown in FIG. 13B and placing container 001 in an open state. Thus, cover latch plate 200 and latch plate pawl 212 may comprise a cover latch. Optional barrel pin 121 for receiving the barrel of firearm 005 is depicted for reference. When it is desired to return the securable container to a closed state, retractable cover 108 is manually (generally, by the hand of the user against the force provided by spring 201) motivated back into a non-retracted positions as depicted in FIG. 13A by translating it back along track 129 opposite the direction of arrows C, in which latch plate pawl 212 re-engages with cover retention pawl 210, latching retractable cover 108 in the non-retracted position as depicted in FIG. 13B, and placing container 001 in a closed state.

Still referring to FIG. 13A, firearm barrel receiving structure 125, and the compression spring 122 that provides a biasing force in the direction of B, are latched into a non-eject state by the engagement of pawl 207, which may be attached to, or a part of, an interior surface of container 001, with firearm eject spring latching pawl 217, latching firearm eject spring 122 into a non-eject position until retractable cover 108 is retracted as described in reference to FIG. 13B below, and as shown in FIG. 13B.

Referring now to FIGS. 13B and 13C, a partial internal view of the invention is depicted. Retractable cover 108 is depicted in a fully retracted position, creating opening 006 and placing container 001 into an open state. Retractable cover 108 has been translated into the retracted position by the force applied by cover retracting spring 201 and its wound portion 202. Cover latch plate 200, button 112, and latch plate pawl 212 are depicted for reference. Cover latch plate 200 has been returned to a state in which it is ready to re-latch cover 108 by the operation of spring 218 on button 112. After button 112 has been depressed and then released by a user, spring 218 forces button 112 back into a non-depressed state, causing cover latch plate 200 to translate opposite the direction of arrow K as button 112 translates back to an un-depressed state in a direction opposite arrow J. Thus, when depressing force J is applied button 112 against the force provided by spring 218, button 112 is depressed and cover latch plate 200 is translated in the direction of arrow K. When depressing force J is removed from button 112, the force applied by spring 218 returns button 112 to its non-depressed position opposite the direction of arrow J, causing cover latch plate 200 to translate opposite the direction of arrow K into a position in which it is ready to re-latch cover 108 when cover 108 is manually translated along track 129 into an unretracted position, placing container 001 in a closed state.

Referring now to FIGS. 13A, 13B and 13C, the latching and unlatching of firearm barrel receiving structure 125 and firearm eject spring 122 are now discussed.

Referring specifically to FIG. 13A, firearm barrel receiving structure 125 and firearm eject spring are depicted in a latched state by the operation of shelf 207 contacting and interfering with firearm eject spring latching pawl 217 at point P. The interference between shelf 207 and firearm eject spring latching pawl 217 at point P latch firearm barrel receiving structure 125 and firearm eject spring 122 into an un-extended position in which these elements are prevented from translating along the direction of arrow B, as they have a tendency to do due to the force supplied by spring 122. Shelf 207 may be formed as a part of an interior surface of container 001 or may be attached to an interior surface of container 001. Firearm eject spring latching pawl 217 (which is also labeled as pawl 219 in FIG. 13C) is biased away from firearm barrel receiving structure 125 by a force supplied by consent pression spring 205. Firearm spring retention plate 208, which is just one of many possible embodiments of a plate for retaining firearm barrel receiving structure 125 and firearm eject spring 122, is shown for reference.

Referring specifically to FIG. 13B and FIG. 13C, retractable cover 108 is shown in a fully retracted position, creating opening 006. When retractable cover 108 has been fully retracted by the force applied by cover retracting spring 201 and it's wound portion 202, container 001 is placed in an open state and cover pawl 211 engages firearm release pawl 204 as a striking surface at point M, pushing firearm release pawl in the direction of arrow S, compressing spring 205. When firearm release pawl 204 is translated in the direction of arrow S, pawl 219 is also translated towards firearm barrel receiving structure 125, causing it to disengage from shelf 207 at point P. When pawl 219 disengages from shelf 207, firearm barrel receiving structure 125 and firearm eject spring 122 become unlatched. This allows firearm eject spring 122 to expand in the direction of arrow B, motivating firearm barrel receiving structure 125 and any firearm 005 received by firearm barrel receiving structure 125 in the direction of arrow B, towards opening 006, such that a handle of firearm 005 protrudes through opening 006 where it may be grasped by a user. In this manner, the retraction of retractable cover 108 into a retracted position releases the latching mechanism on firearm barrel receiving structure 125 and firearm eject spring 122. Elements 219 and 207 may comprise a firearm barrel receiving structure latch mechanism.

Figure 14:
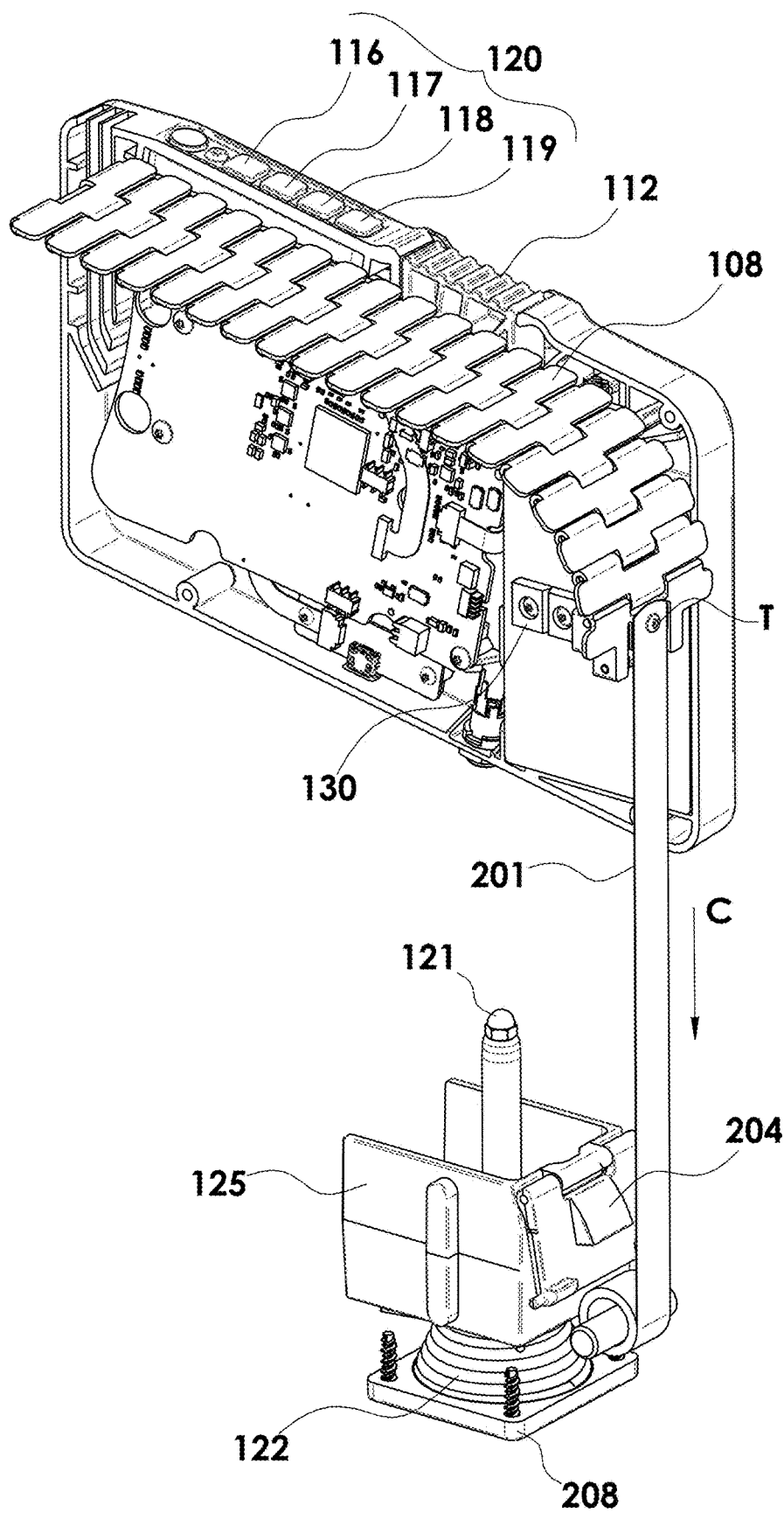
FIG. 14 is a partial perspective view of an embodiment of the invention showing retractable cover 108 in a closed and latched state, and showing firearm barrel receiving structure 125 in a latched state.
Figure 15:
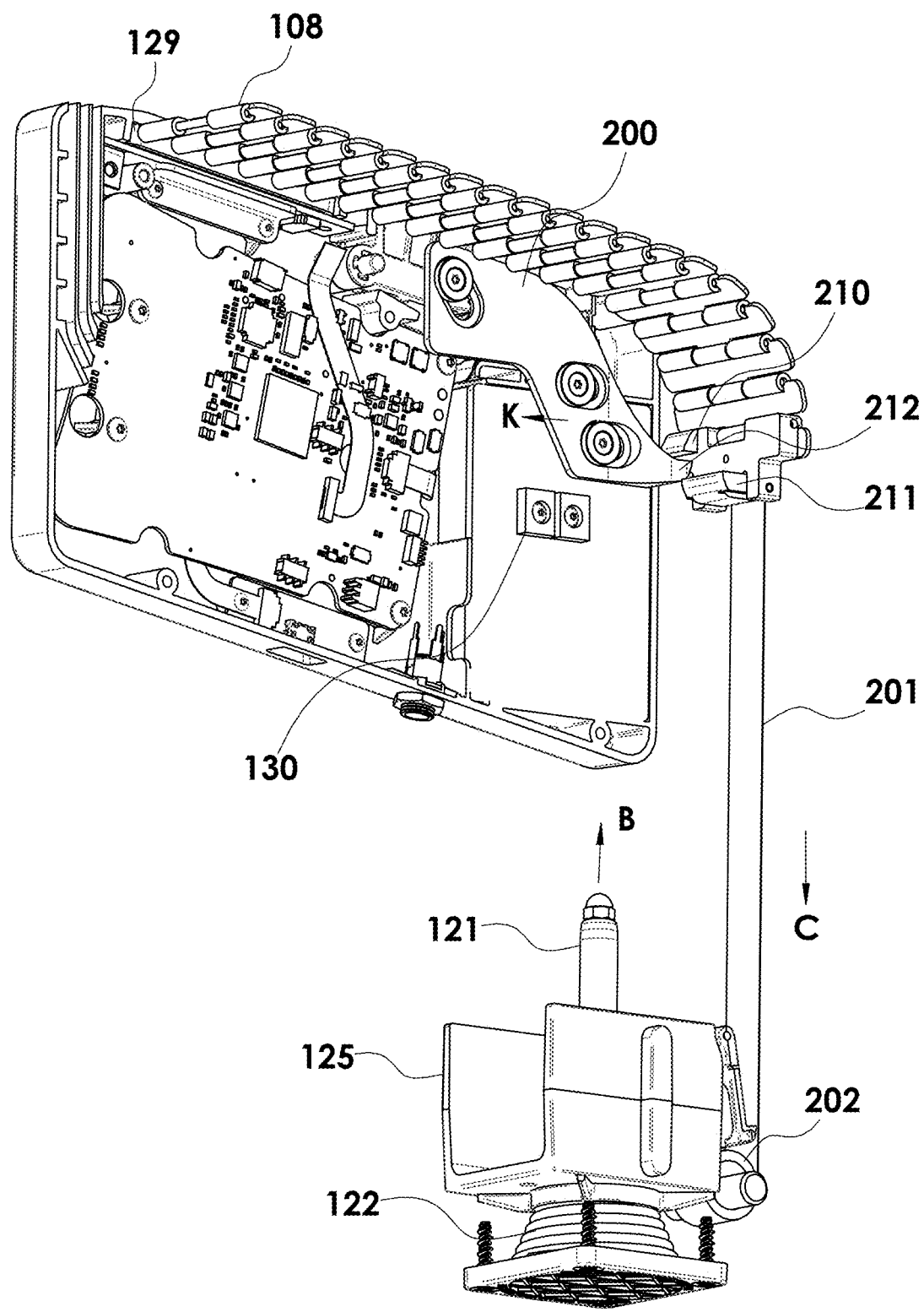
FIG. 15 is a partial perspective view of an embodiment of the invention taken from underneath retractable cover 108 for the purposes of showing aspects of the retractable cover latch mechanism.
Figure 16:
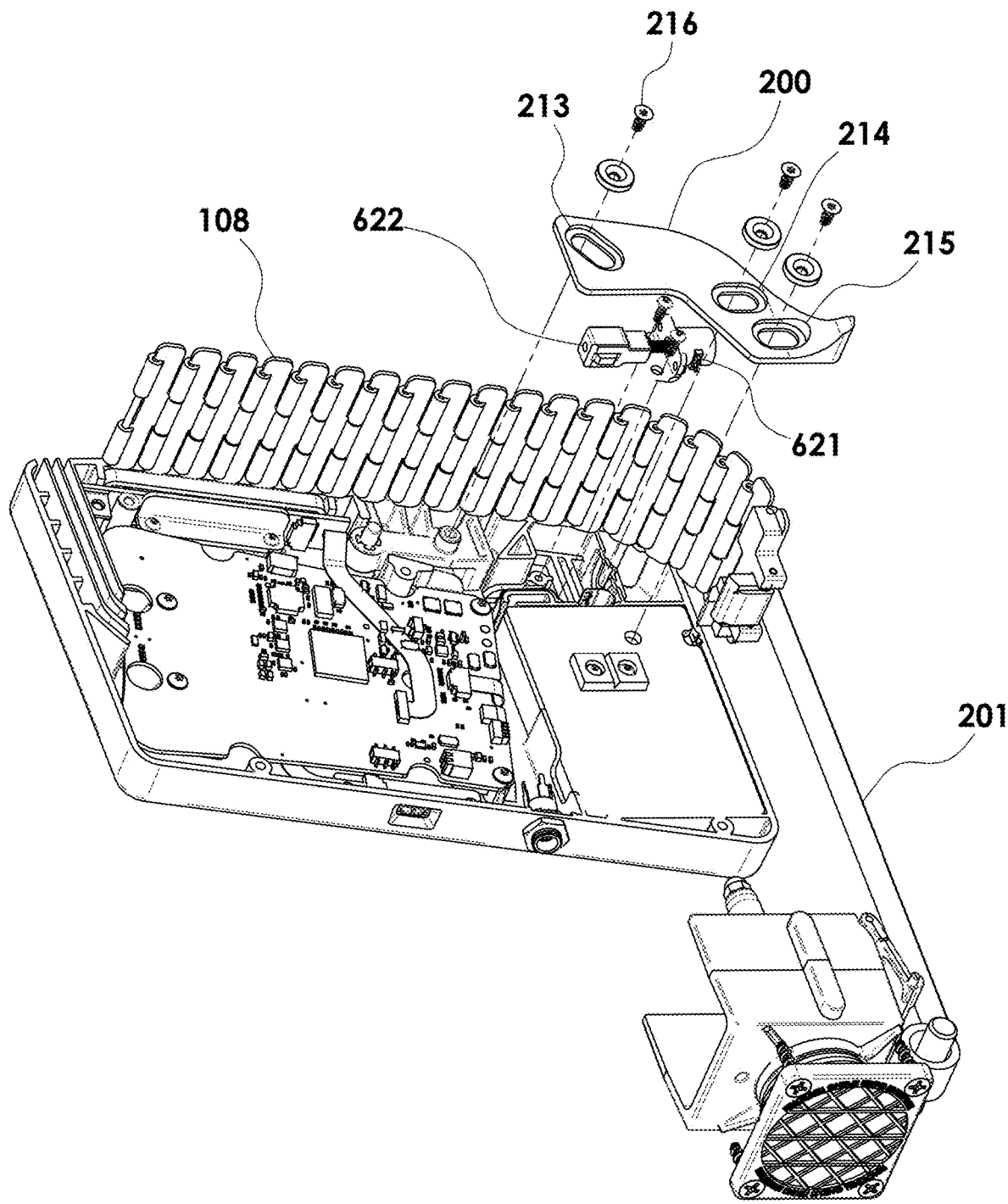
FIG. 16 is a partial perspective view of an embodiment of the invention taken from underneath retractable cover 108 for the purposes of showing aspects of the electromechanical actuator and lock mechanism.

Referring no to FIGS. 14-16, partial internal views of the invention are depicted. In these views, certain elements such as container pieces 104 and 105, and a firearm 005 disposed in firearm barrel receiving structure 125 are not depicted so that other elements of the invention may be more clearly shown and the latching and unlatching operation of retractable cover 108 and firearm eject spring may be more clearly described. Keypad 120, which may comprise one or more pushbuttons shown in exemplary fashion as 116, 117, 118 and 119 in the figures, may be, but are not necessarily, located on an upper surface of container 001 for ease of access. Keypad 120 is depicted as comprising four pushbutton switches in the figures, but keypad 120 may comprise any number of pushbuttons as may be desired. Retractable cover 108 may be attached to cover retracting spring 201 at point T, with the wound portion of the spring 202 captured at 202, causing the biasing force on retractable cover 108 tending to pull cover 108 along track 129 into a retracted position, creating opening 106, and placing container 001 in an open state. In FIGS. 14-16, container 001 is depicted in a closed state. Optional barrel pin 121 and firearm spring retention plate 208 are depicted for reference. In FIG. 15, cover latch plate 200, cover retention pawl 210, cover pawl 211, and latch plate pawl 212 are shown for reference. In FIG. 16, an exploded view of the assembly of cover latch plate 200 and fastener 216 on which slot 213 slides, motivating latch plate 200 in the direction of arrow K when button 112 is depressed with a force J, is depicted. Slots 213, 214 and 215 are depicted as well. Electromechanical actuator 621, which may be, for example, a stepper motor, and actuator block 622 are also depicted. In an embodiment, when commanded by controller 800 to a locked state (as described below), electromechanical actuator 621 extends actuator block 622 beneath retractable cover release button 112 such that it prevents button 112 from being depressed, thus placing container 001 in a locked state. Electromechanical actuator 621 may be attached to an interior surface of container 001. Barrel pin 121 is depicted for reference. Electromechanical actuator 621 and actuator block 622 may together comprise an electromechanical lock.

Figure 13D:
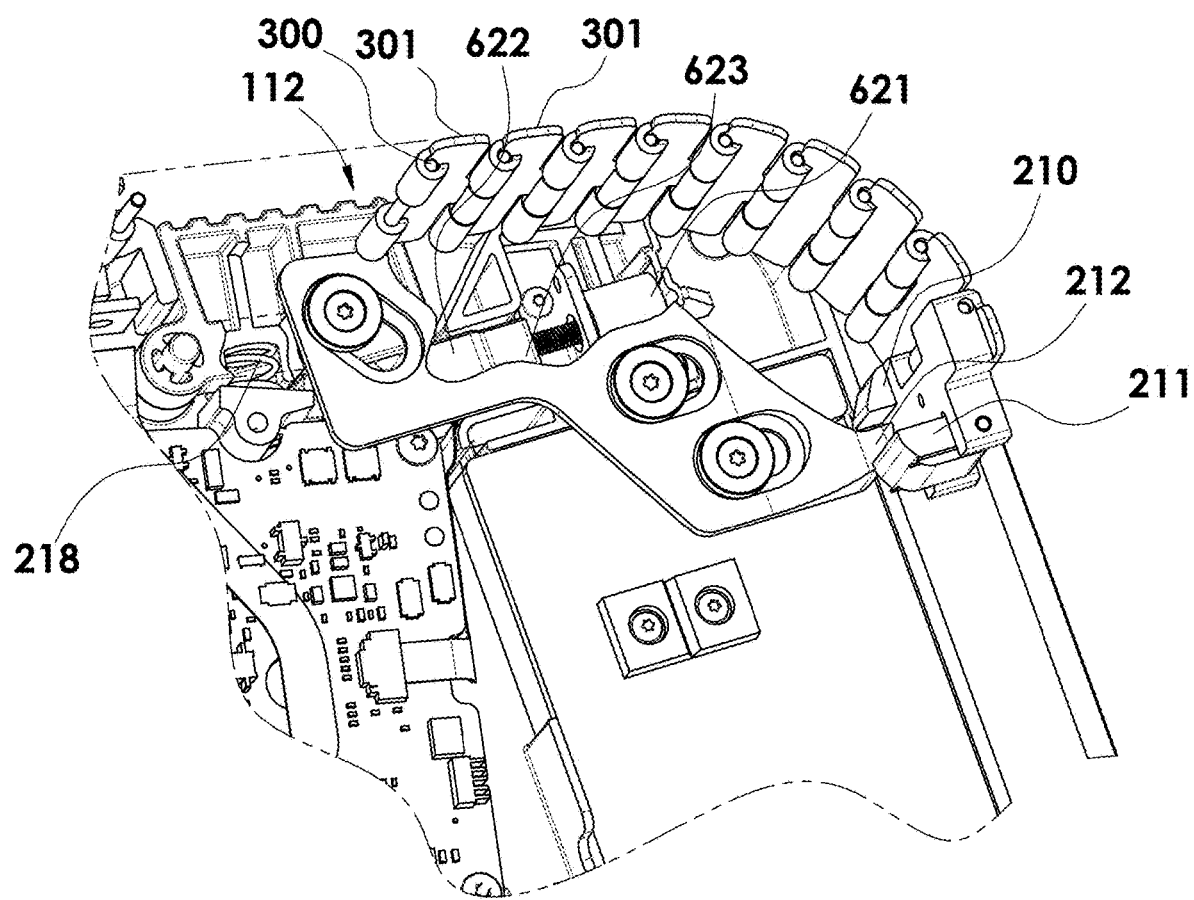
FIG. 13D depicts a partial perspective view of an embodiment of the electromechanical actuator, which may be operable as an electromechanical lock, preventing button 112 from being depressed and releasing retractable cover 108.

Referring now to FIG. 13D, a partial view of an embodiment of the invention showing the operation of optional electromechanical actuator 621 and actuator block 622 to operate as an optional electromechanical lock is depicted. Electromechanical actuator 621 may be, for example, a stepper motor that operates to rotate electromechanical actuator shaft 623. Shaft 623 may be a threaded shaft that is threateningly engaged with a receiving female threaded hole disposed in actuator block 622. Thus, in the embodiment depicted, operation of actuator 621 causes shaft 623 to turn, where it rotates within the female threaded hole in actuator block 622, causing actuator block 622 to translate along the axis of threaded shaft 623 because actuator block 622 is prevented from rotating by a lower surface of button 112 or an interior surface of enclosure 001. When it is desired to place container 001 into a locked condition in which button 112 may not be depressed, controller 800 commands actuator 621 to extend actuator block 622 underneath button 112. Actuator block 622 and button 112 may be disposed in a sliding engagement. Thus, it is not possible to depress button 112 when actuator block 622 has been extended underneath button 112. When it is desired to place container 001 into an unlocked state, controller 800 commands actuator 621 to retract actuator block 622 so that it is no longer underneath button 112, and therefore button 112 may be depressed by a force J as depicted in FIGS. 13A and 13B, allowing retractable cover 108 to be unlatched and retracted, placing container 001 in an open state, as described herein and as depicted in FIG. 13B.

In an embodiment, an exemplary cross-sectional shape of the sliding engagement of the track 129 for receiving and guiding retractable cover 108 is a tongue and groove shape, with the groove formed in at least one interior surface of container 001, and the tongue formed by an edge of retractable cover 108. Another cross-sectional shape for the sliding engagement is for an edge of retractable cover 108 and track 129 cross section to form complimentary dovetail shapes in a sliding engagement. Track 129 may be formed as a groove in one or more interior surfaces of container 001 and may operate to receive an edge of cover 108, and guide retractable cover 108 in the direction of arrow C as described herein and depicted in the figures. Retractable cover 108 may comprise any bendable material or combination of materials or parts. For example, retractable cover 108 may be fabricated from spring sheet steel, or may be fabricated from any bendable plastic material. Retractable cover 108 may also be fabricated from a plurality of stiff members attached to a bendable substrate such as spring sheet steel, plastic, or cloth material. In an embodiment, retractable cover 108 may comprise a plurality of links, each link having a through hole located in either end for accepting a pin. Consecutive links may be rotably attached to one another when pins 300 are inserted through the through holes of adjoining links 301 as shown in FIG. 8A and FIG. 11, forming a consecutive chain of links, and forming a retractable cover 108 that is bendable and able to translate along curvilinear track 129. Retractable cover 108 may be fabricated from any material or combination of materials known by a person of ordinary skill in the art as being suitable for retractable, bendable covers as may be known in the mechanical arts.

Figure 17:
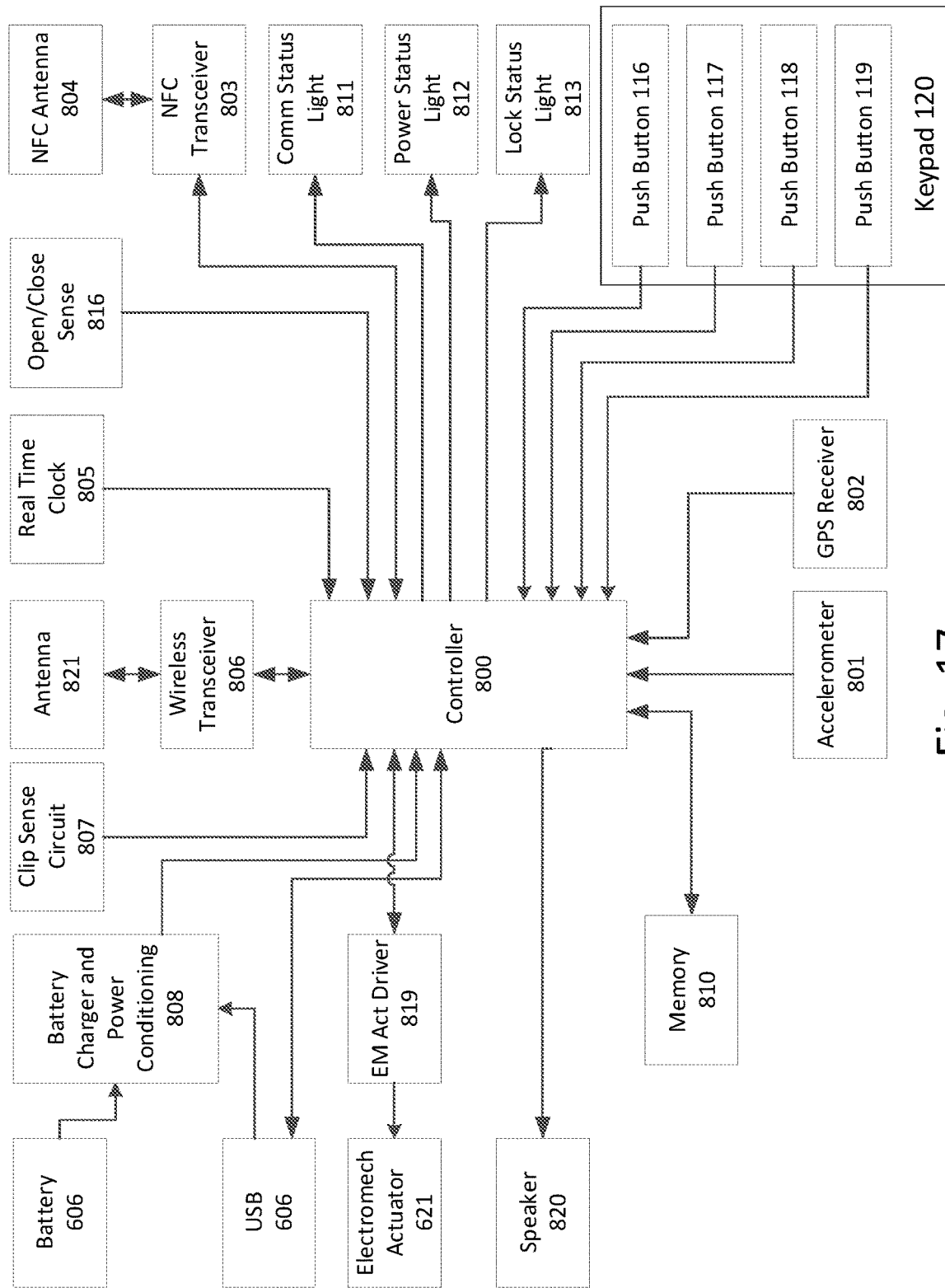
FIG. 17 depicts a block diagram of an embodiment of the securable container of the invention.

As described in more detail below, in embodiments, the invention may comprise optional electrical components as shown in FIG. 17 which may be present, in any combination, to carry out the steps and features described herein. These electrical components may be mounted onto a printed circuit card or other electrical connection substrate or electrically connected via discrete wiring such that they are in electrical communication with one another. The electrical components of the system may comprise a controller 800 in electrical communication with a physical storage media such as an electronic memory for storing computer readable and executable non-transitory. Controller (or processor) 800 is capable of executing computer readable computer executable non-transitory instructions. The invention may further comprise a geopositioning radiofrequency receiver such as a GPS receiver for receiving geo-location signals from satellites or other transmitters, the geopositioning receiver being in electrical communication with controller 800. Furthermore, the invention may comprise at least one wireless interface transceiver such as an optical transceiver, a wireless radiofrequency transceiver, and RFID tag, near field communication transceiver, or any other wireless transceiver known in the art, all of which may be an electrical communication with the controller. The transceivers of the invention may also be in communication with antennas, or in the case of the optical transceiver light emitting diodes, PIN diodes, or other receivers and transmitters of light energy. The invention may comprise one or a plurality of printed circuit boards upon which these electrical components may be mounted and the printed circuit boards may be in electrical communication with one another by electrically conductive wiring. The invention may further comprise a battery in electrical communication with the components described herein for providing electric power. The battery may be replaceable rechargeable and may be chargeable through wireless inductive charging means. The computer readable memory may contain computer readable and executable non-transitory instructions for carrying out the steps and features of the invention when these instructions are executed by the controller. Controller 800 may be any controller, microprocessor, firmware controller, or any other combination of electrical components capable of reading and executing computer readable and executable non-transitory instructions.

In an embodiment of the invention, electrical sensors such as switches may be employed in electrical communication with controller 800 so that electrical signals are generated and communicated to controller 800 indicating that a firearm has been inserted into the container; that retractable cover 108 is in a retracted position placing container 001 in an open state; or that retractable cover 108 is in a non-retracted position placing container 001 in a closed state. When a user causes retractable cover 108 to be motivated into the retracted position, controller 800 may execute computer readable instructions causing an optical or radiofrequency signal to be generated and transmitted to a remote monitoring station via, for example, Bluetooth, Wi-Fi, cell phone connection, or other radiofrequency communication. Furthermore, when a user causes retractable cover 108 to be motivated into the retracted position such that container 001 is in an open state such that a firearm may be withdrawn from container 001, a signal may be generated by controller 800 and transmitted to a camera in proximity to the user, triggering the camera to begin recording video data or to begin taking a series of still images. The video data or still images may be transmitted to a remote monitor. Likewise a signal may be generated by controller 800 and transmitted to a microphone and recording device in proximity to the user, triggering the microphone and audio recording device to begin recording audio data or transmitting audio data to a remote monitor, or both. In a typical use of the invention, a user may cause the retractable cover 108 of the invention to be motivated into a retracted position by pressing button 112, causing a firearm 005 contained within the enclosed interior volume 131 of the container to be motivated into an extended position, through opening 006, such that it is readily available to a user. When the retractable cover 108 is motivated into the retracted position, the retracted position status, or open state status, may be communicated to controller 800 by a sensor, which may be a switch which is closed when the retractable cover is motivated into the retracted position. The signal thus communicated to controller 800 may be used as an input by controller 800 to execute a series of executable instructions causing the transmission of a signal by either wireless or wired means to a remote camera such as a body camera worn by a law enforcement officer, a camera mounted in a law enforcement officer's vehicle, or any other camera, to begin recording; and likewise audio recording may be commanded. It can thus be seen that the invention may be utilized by law enforcement to automatically operate video, audio, or other surveillance and recording means when they draw their firearm from the container.

Likewise, the controller of the invention may be utilized to transmit geolocation information received from GPS satellite signals, cellular towers, or other RF or optical means, to a remote monitoring station. In this use, it is possible for a remote monitoring station to ascertain geolocation information regarding the location of container 001 by communicating with the container through a wireless communication link such as Bluetooth, any wireless RF link such as WiFi or a cellular phone link, a wired USB link or any other communication link.

In yet a further embodiment, container 800 may comprise accelerometers in electrical communication with the controller that are used to produce signals when the container is moved. The signals may be used as inputs by controller 800, which then executes computer readable instructions to transmit a signal to a remote user indicating that the container has been moved.

In yet a further embodiment of the invention, the container may comprise temperature sensors in electrical communication with the controller that are used to produce signals communicating the temperature of the interior enclosed volume of the container. The signals may be used as inputs by the controller, which then executes non transitory computer readable instructions to transmit a signal to a remote user by any of the means described herein, indicating that a predetermined temperature limit has been exceeded, or providing the temperature within the enclosed interior volume of the container.

In yet a further embodiment of the invention the container may comprise an electromechanical actuator 621 preventing the retraction of retractable cover 108. Electromechanical actuator 621 may be in electrical communication with controller 800. Controller 800 may execute instructions for operating the electromechanical latch 621. A user may transmit signals wirelessly to the container by optical or radiofrequency ("RF") means, which signals are received by the optical and/or radiofrequency receivers comprising the invention. These signals may be utilized as inputs by the controller for commanding electromechanical latch so that retractable cover 108 may be locked into a unretracted position, placing container 001 in a locked state, or unlocked so that retractable cover 108 may be motivated into a retracted position, placing the container in an unlocked state. Securable container 001 may therefore be remotely locked or unlocked. A typical use scenario for this feature occurs when the user has stored a firearm in the interior enclosed volume of container 001 as hereinbefore described and retractable cover 108 is in an unretracted position, placing container 001 in a closed state. The container may be useful, for transporting firearms in a vehicle. Thus, a user may utilize container 001 to securely transport firearms in a vehicle. If, for example, the user exits the vehicle leaving container 001 in the vehicle, the user may utilize a mobile device, tablet, cell phone, personal computer or other electronic device to remotely communicate with container 001 to command the container to a locked state, safely securing the firearm within the vehicle and preventing unauthorized access. Container 001 may be remotely locked or unlocked in this matter, enabling a multitude of use scenarios in which a firearm may be placed in the container and securely locked remotely, Referring now to FIG. 17, a block diagram of an optional electronic embodiment of the container of the invention is depicted. Controller 800 may be in electrical communication with each of the other electrical components of the container of the invention as depicted in the diagram. Controller 800 may also be in electrical communication with non-transitory physical computer readable media 810. Non-transitory computer readable and executable instructions in the form of software, firmware, or other known forms of computer readable instructions capable of performing the functions described herein may be stored in a non-transitory fashion in non-transitory physical computer readable media 810. Controller 800 may access non transitory computer readable media 810 for the purpose of retrieving computer readable instructions stored thereon and executing said computer readable instructions so as to carry out any of the functions described herein, in any combination. Controller 800 may also be in electrical communication with sensor devices such as one or more accelerometers 801, temperature sensors 850, and/or other sensors as may be known in the art, in any combination. In this manner controller 800 may retrieve or otherwise receive information from one or more accelerometers 801 one or other sensors in the form of sensor signals, and may use the data from the sensor signals to perform the functions of the invention by executing computer readable instructions it has retrieved from non-transitory computer readable media 810.

Still referring to FIG. 17, controller 800 may also be in communication with one or more pushbuttons (electrical switches) or other user interface elements such as pushbutton array 116-119, forming keypad 120 for receiving control inputs from a user. User interface elements may be, for example, electrical buttons or switches located on any surface of container 001. In an embodiment, keypad 120 may be located on an upper surface of the container such as depicted in FIG. 1. Controller 800 may also be in electrical communication with a real-time clock or other internal timing device 805, and controller 800 may also be in electrical communication with interface devices such as radiofrequency or optical wireless transceiver 806 and near field communication transceiver 803. Near field communication transceiver 803 may also be in electrical communication with a near field communication antenna 804. One or more wireless transceivers 806 may also be any wireless transceiver known in the art and may be in electrical communication with a radio frequency (RF) antenna or optical sensor 821 as depicted in the diagram. Wireless transceiver(s) 806 may be any radiofrequency or optical wireless transceiver known in the art for communicating data to and from a remote system such as, by way of example and not by way of limitation, any digital or analog radio communication transceiver, any optical communication transceiver such as infrared and other optical communication transceivers, radio frequency transceivers designed to operate on the standard known as Wi-Fi, Bluetooth, or any other known standard radiofrequency data communication physical layer and protocol, cellular-based RF communication transceiver such as GSM or other transceivers capable of communicating with a cellular-based RF communications network as is known in the art, and any other radiofrequency or optical transceiver known in the art. It is reasonably anticipated that emerging wireless communication systems may replace those listed in this description and it is within the disclosure and claim of invention that future developed wireless communication systems are included within the scope of the wireless transceiver(s) 806, which may comprise a plurality of transceivers, of the container of the invention. Controller 800 may also be in electrical communication with a data port 815 for programming non transitory computer readable media 810, commanding controller 800, reading information from non-transitory computer readable media 810 or the like. Data port 815 may be any electrical data communication port, and may be serial or parallel, such as a Universal Serial Bus (USB) data port.

Still referring to FIG. 17, the remote user data interface of a container of the invention may comprise any one or any combination of radiofrequency or optical wireless transceivers 806, near field communication transceiver 803, and/or data port 815, in any number and in any combination. Controller 800 may also be in electrical communication with a geolocation receiver 802, which, in embodiments, may be a Global Position System (GPS) receiver, that is capable of receiving geo-locating signals from, for example, remote transmitters such as, but not limited to, GPS or other geo-positioning satellites, processing said geo-locating signals, and transmitting a signal comprising geolocation or time information, or both, for processing or retransmission to a remote user by controller 800 executing non-transitory computer executable instructions stored in computer readable media 810 autonomously or when commanded by a local or remote user through wireless transceiver 806 or communication port 606.

Still referring to FIG. 17, controller 800 may also be in electrical communication with a electromechanical actuator driver circuit 819 which is in electrical communication with a electromechanical actuator, such as a solenoid, server motor or stepper motor, 621, for the purpose of receiving commands from controller 800 for commanding motor 621 to dispose the electromechanical lock of the invention in a locked state or an unlocked state. Electromechanical latch 621 may be configured so as to engage or disengage an electromechanical lock mechanism as described elsewhere herein upon command from controller 800. Thus, as an example, if a remote user desires to lock or unlock the container of the invention from a remote location, a command may be transmitted from the remote user by wireless means, for instance RF communication means such as GSM cellular transmission, which is received by the RF antenna container of the invention. Alternatively, a local user may input, or enter, a code into keypad 120 instructing controller 802 command container 001 into a locked state or unlocked state. The wireless antenna 821 may be in electrical communication with wireless transceiver 806 which may receive a signal transmitted from the remote user and received by the RF antenna, whereupon the received signal may be communicated to controller 800. Controller 800 may then interpret the signal sent by the remote user by the execution of computer readable instructions as read from non-transitory computer readable media 810, were upon controller 800 may command motor driver 819 to operate electromechanical latch 621 to motivate the electromechanical lock of the invention into a locked, or unlocked, state as commanded by the remote user. In this manner a remote user may command the container of the invention into a locked state or an unlocked state.

Alternatively, a local user may input, or enter, a code into keypad 120 instructing controller 802 command container 001 into a locked state or unlocked state.

Still referring to FIG. 17, controller 800 may be in direct or indirect communication with speaker 820. An audio amplifier may be in electrical communication with, and in line between, controller 800 and speaker 820 for the purpose of amplifying the audio signal or converting a digital signal to an analog audio signal for the purpose of driving speaker 820. In this manner, controller 800 may, upon execution of computer readable instructions stored in non-transitory computer readable media 810, cause certain sounds or audible signals to be emitted from speaker 820 as may be desired by the user and as described herein. In this manner alarm beeps or other audible signals may be utilized to indicate that the container of the invention has been commanded into a locked state, an unlocked state, or any other state. Also in this manner, an audible alarm may be sounded if the accelerometer 801 senses that the container of the invention has been moved, or if the optional geolocation receiver 802 receives GPS information indicating that the container of the invention has been moved to a new geographic location outside limits set by the user. This use of GPS location information to trigger an alarm may be termed "geo-fencing". A user may predetermine certain geographic limitations such that an audible alarm is sounded or an alarm signal is transmitted to a remote user through the wireless transceiver interface if the container of the invention has been moved outside, or moved into, predetermined geographic areas.

Still referring to FIG. 17, controller 800 may be directly or indirectly in electrical communication with one or more pushbuttons 116-119 forming array, or keypad, 120 for the purpose of allowing a user to interface with the electronics, and specifically with controller 800, of container 001 in order to command container 001 to perform certain functions, to enter certain states, or to enter personal identification information such as a Personal Identification Number (PIN) or other identifying indicia. For example, one or more pushbuttons of keypad 120 may be utilized to command the container into a powered on or powered off condition; to request status of the container, such as for example, status of the battery charge of the container; or to provide and/or unlock commands to controller 800.

Still referring to FIG. 17, an exterior surface of the container of the invention may also comprise lighting elements of any color, or that may be commanded to illuminate in one of a variety of colors that may be red, green, blue, yellow, orange or other colors as desired by a user, that are in electrical communication with controller 800 such that controller 800 is capable of commanding the lighting elements to individually be in an on state, an off state, a blinking state, or any other state, so as to provide visual indication of the status of the invention to a user. For example, controller 800 may be in electrical communication with lighting elements such as communication status lighting element 811, power status lighting element 812, or lock status lighting element 813 or any combination thereof. The lighting elements of the container are preferably, but not necessarily, light emitting diodes (LEDs), and may each have the capability to illuminate one color selected from a number of colors such as red, green, blue, yellow, orange, white or other colors, as commanded by controller 800 executing non-transitory computer readable instructions, and wherein specific lighting elements may be commanded to illuminate specific colors in certain situations, as commended by controller 800.

Still referring to FIG. 17, controller 800 may also be in electrical communication with at least one sensor for sensing the status of container 001. In an embodiment, the at least one sensor may comprise a plurality of sensors, such as, for example, lock state sensor 814 which produces a signal containing information indicating whether the latch of the invention is in an unlatched state or latched state, or safe open/close sensor 816 which produces a signal containing information indicating whether enclosure 001 is disposed in an open state or a closed state all of which may be in electrical communication with controller 800.

Still referring to FIG. 17, battery 606 may be charged through an electrical port providing electrical connectivity to a battery charging source, the port being located on, in or through an exterior surface of the invention, and which may be USB port 815. Battery 606 may be in electrical communication with battery charger and power conditioning circuit 808, and may be in communication with, and provide power to, all the electrical and electronic components of the container directly, or through battery charger and power conditioning circuit 808.

Still referring to FIG. 17, controller 800 may be any electrical device or combination of electrical devices capable of executing computer readable instructions such a controller, microcontroller, microprocessor, programmable logic array, embedded firmware, virtual machine, combinational logic or any other electrical or electronic device or combination of devices known in the electrical arts as capable of executing computer readable instructions.

Figure 18:
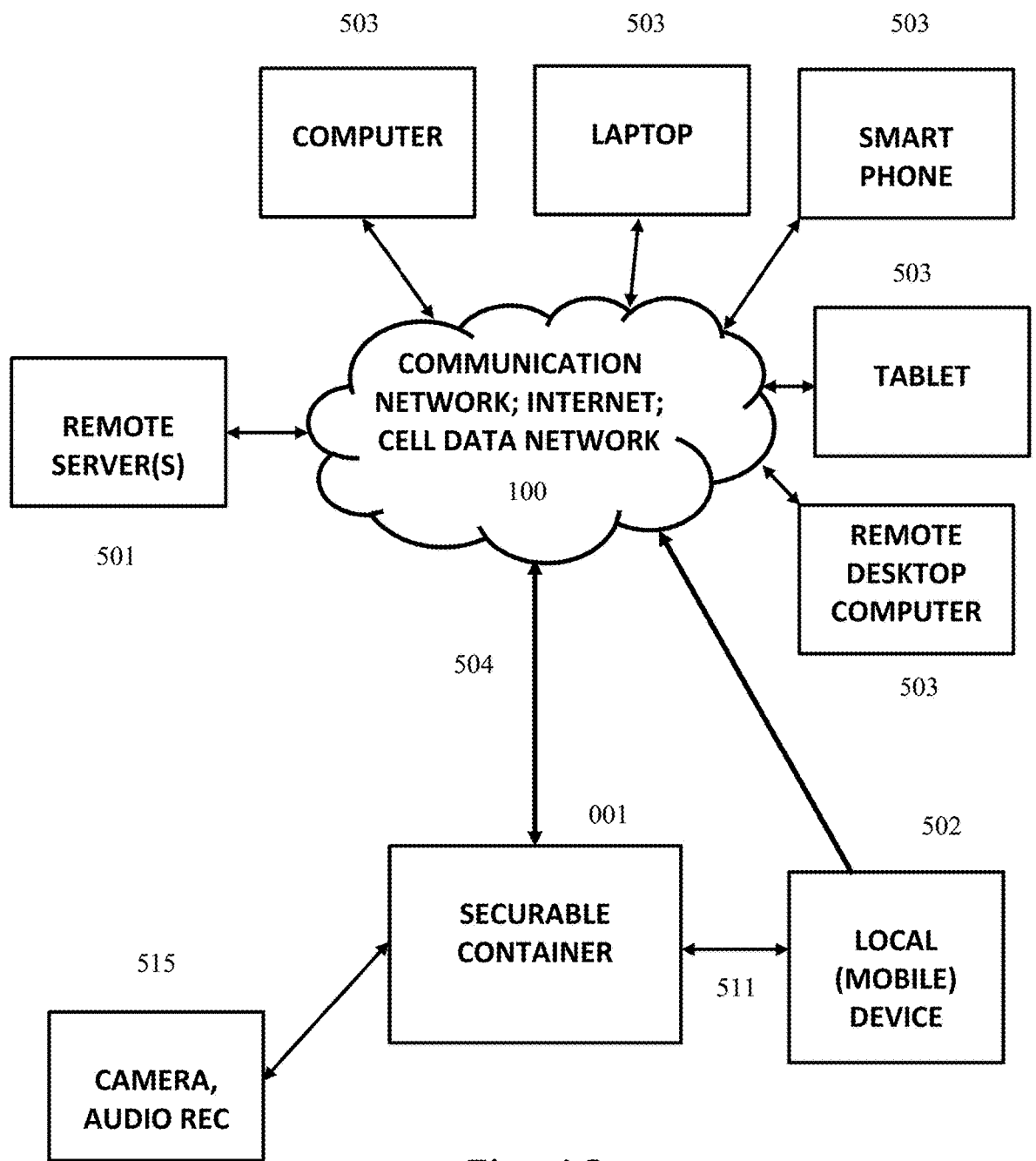
FIG. 18 depicts a system diagram of an embodiment of a container of the invention in wireless connectivity to a remote server, a remote user device such as a computer, laptop, cell phone, smartphone, tablet, remote desktop, or any other remote smart or computing device running securable container application software; and also showing the securable container of the invention and wireless or wired communication with a local device which may be a computer, laptop, cell phone, smartphone, tablet, key fob or any other smart computing device. The figure also depicts the wireless connection to a key fob.

Referring now to FIG. 18, a container of the invention 1 may be in wireless or wired communication 504 with local and/or remote computing devices 502 and/or 503, respectively, as described herein. The container 001 may be in communication with one or more local devices 502, which may be any electronic device, such as a key fob, smart phone, tablet, computer, or other device capable of running container application software and storing user authentication indicia. The container may be in communication with local device 502 wirelessly through any known wireless communication link 511, including but not limited to Wi-Fi, Bluetooth, RFID, NFC, or any RF communication link, or infrared optical communication links. The securable container 001 may also be in wired communication with one or more local devices 502 via a USB port or any other electrical connection. The local device 502 may comprise a controller for executing instructions in communication with a transceiver for communicating with processor 800 of a container of the invention, and may comprise non-volatile computer readable instructions in non-volatile computer readable media for storing instructions such that the local device processor may execute securable container application software to communicate with the securable container 001 and to command the securable container to carry out the functions described herein. Likewise, container 001 may also be in communication with one or more remote devices 503 which may be any number or combination of computers, smart phones, tablet computers, laptop computers, desktop computers, smart phones or any other device capable of running and executing securable container application software and storing user authentication indicia. Such devices may be used as remote monitors. Communication between the container 001 and the remote devices 503 may be wired or wireless through the remote user data interface. In the case of wireless communication the remote devices and container may communicate via GSM, CDMA or other cellular radio based communication links, RF analog radio data links, the Internet, IEEE 802.11 wireless LAN, other wireless LANS or any other communication network, and in any combination thereof. In this manner the container of the invention 001 may be controlled, monitored or tracked geographically remotely as described herein, and remote users may command the securable container into locked or unlocked states, may receive alerts and alarm information as described herein and may receive other status information as desired by the remote user. Container 001 may also be in wireless communication with a remote server computer 501 via the world wide web 100 as shown in the figure. In a preferred embodiment all securable container configuration information, status inquiries, and notifications may be communicated via the world wide web to a remote server computer 501, where it may be made available to a user via, for example, a web site via the World Wide Web or application running on a remote device such as a cell phone software application in communication with remote server computer 501.

Still referring to FIG. 18, in an embodiment, local device 502 may be a key fob. Such a key fob 502 may be carried by a user, for example on a key chain or in a user's pocket. The key fob 502 may comprise wireless communication components such as Radio Frequency Identification (RFID) components, Bluetooth, or other RF, optical, or other wireless communication means as described herein. In the key fob embodiment, container communicates 001 wirelessly and preferably automatically with a user when the user comes into proximity of the container 001 such that the electromechanical actuator 621 is commanded by controller 800 to lock the container when the key fob is not in proximity to container 001, and to unlock container 001 when the key fob 502 is in proximity to container 001. "Proximity" may be any distance desired by a user and within the communication capability of the wireless communication components comprising the key fob and the container. In embodiments, the distance defining proximity may be defined by a user through a mobile device or computer software application, or via a web site, which is then communicated to container 001 through any of the interfaces to controller 800. In a key fob embodiment utilizing RF components in both the key fob and the container in wireless communication, the operational distance may be predetermined by selecting the type of RF communication link, such as for example RFID, Bluetooth or other link; selection of either passive or active RFID tags within the key fob; type of antennas employed; receiver sensitivity; transmit power and operating frequency. These components may be selected, for example, to provide communication when the key fob is within three feet, five feet, ten feet, twenty feet or greater. The user may be presented with a means for programming the transmit power, for example by inputting data into keypad 120, such that a desired operating range is achieved, or by inputting such information into a mobile devise or computer application that in turn is in communication with container 001. In an example in which the container is carried in a vehicle, for example between a front seat and vehicle console, a user may desire that the container be unlocked automatically via key fob communication when the key fob is within close proximity to the vehicle, for example an operating distance of ten feet or less. The key fob may comprise a switch for enabling or disabling communication with container 001. A flow diagram for a key fob embodiment of the invention is depicted in FIG. 18, described below.

Still referring to FIG. 18, the invention may comprise securable container application software, which may include non-volatile computer readable instructions, and which may be downloaded to a mobile computing device 502 or a remote computing device 503 from a remote server 501 through, for example the world wide web 500, from online application stores, or from or through any other source, and may reside in a mobile computing device 502 or remote computing device 503 non transitory computer readable media. The container application software may be operable to provide a user interface, such a Graphical User Interface (GUI) for the entering and the transmitting of commands to a container of the invention 001 via a remote user data interface, and may contain instructions allowing a user to establish, store and execute schedules for events such as scheduling locking and unlocking of securable container 001, GPS tracking and geolocation information storage, monitoring container battery status, and the like. The container application software may contain instructions for carrying out the methods and steps described and taught herein.

Still referring to FIG. 18, the container 001 may further comprise an external camera or audio recording or transmitting device 515 in wireless communication with transceiver 806. When the open/close sensor 816, which is in electrical communication with controller 800, determines that retractable cover 108 has been retracted placing container 001 into an open position, controller 800 may execute non-transitory computer executable instructions to command camera or audio recording or transmitting devices 515 to an "on", or recording, state. In this manner, local video or audio information, or both, may be automatically recorded and transmitted to a remote location when retractable cover 108 is retracted.

Figure 19:
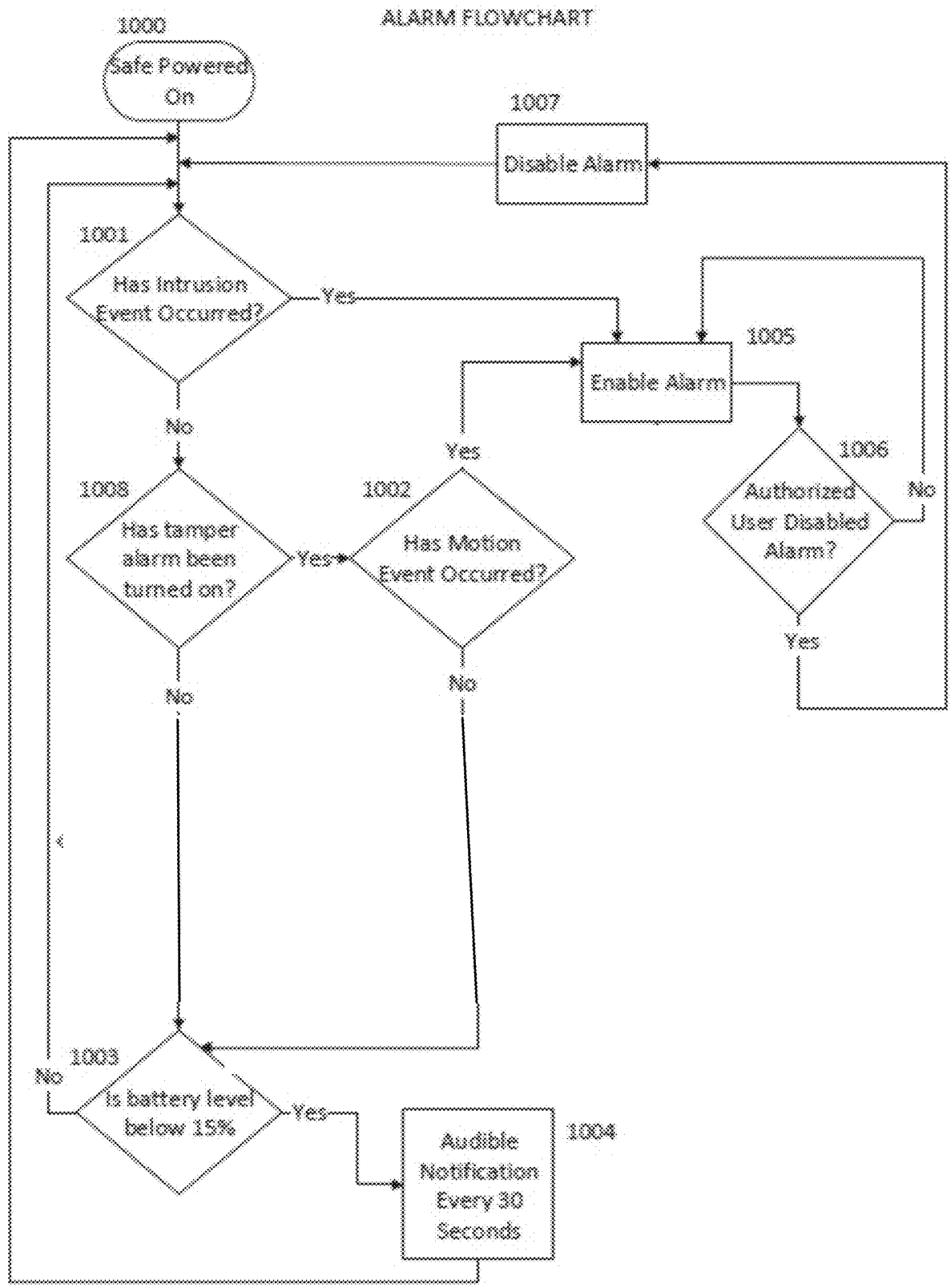
FIG. 19 depicts a flow diagram of one embodiment of an alarm function of an electronic embodiment of the container of the invention.

Referring now to FIG. 19, a flow diagram of one embodiment of an alarm function of an electronic embodiment of the container of the invention is depicted. In a first step 1000, the container 001 of the invention may be in a constant ON state, or may be placed into a powered-on condition by operation of a manual pushbutton such as any pushbutton of keypad 120 (depicted in FIG. 17). Once powered on, controller 800 may monitor the state of sensors placed within container 001 to determine whether an intrusion event, such as, for example, unauthorized opening of the container which may be defined, for example, as opening of container 001 without a proper PIN code having been received by controller 800, has occurred in step 1001. If it is determined that an intrusion event has occurred an alarm may be operated, step 1005. The alarm may be an audible alarm such as playing sound through speaker 820 (depicted in FIG. 17), a visible alarm in the form of lighting lights such as LED lights 811-813 (depicted in FIG. 17) which may be placed on any surface of the container of the invention, the transmission of a signal to a remote entity through the remote user data interface of the container, or any combination of these alarms. The transmission of a signal containing alarm information to a remote user through the remote user data interface may be in the form of a cellular text message sent to a predetermined cellular telephone number or other entity capable of receiving a cellular text message. Once the alarm has been operated in step 1005, the securable container may monitor whether the alarm has been disabled 1005. An authorized user may disable the alarm 1007 by inputting, or entering, a PIN code on keypad 120, causing container 001 to be placed into a no-alarm state, whereupon it will return to monitoring whether an intrusion has occurred 1001. If an authorized user has not disabled the alarm, the alarm will continue to operate.

Still referring to FIG. 19, if no intrusion event has occurred 1001, container 001 may sense whether the tamper alarm has been turned on, step 1008. The tamper alarm may be turned on remotely by receiving signals through wireless interface 806 (depicted in FIG. 17) or may be set by a user by manual operation of keypad 120. If the tamper alarm has been turned on 1008, the securable container may interrogate or receive signals from the one or more accelerometers 801 (depicted in FIG. 8). If the one or more accelerometer signals indicate that a motion event has occurred 1002, such as the at least one accelerometers sensing that the securable container has been rotated beyond a predetermined limit, or the accelerometers sensing that the securable container has been moved continuously for programmable minimum period of time such as, for example, five seconds, the alarm of the invention may be enabled 1005 and will remain enabled until an authorized user disables the alarm as above described.

Still referring to FIG. 19 the level of charge of battery 606 is ascertained by controller 800 reading signals from the battery charger and power conditioning circuit 808 (depicted in FIG. 8) to determine if the battery charge level is below a predetermined low-charge threshold, such as, for example, 15% of full charge. If the battery level is below a predetermined low-charge threshold an audible notification will be commanded by controller 800 through speaker 820 (depicted in FIG. 17), for example an audible signal made every 30 seconds such as a beep, until the battery level is returned to a level that is greater than a predetermined low-charge threshold as determined by battery charger and power conditioning circuit 808. A predetermined low-charge threshold and a pre-determined medium-charge threshold may each be stored in non-transitory computer readable media 810 and may therefore be readable by controller 800.

Figure 20:
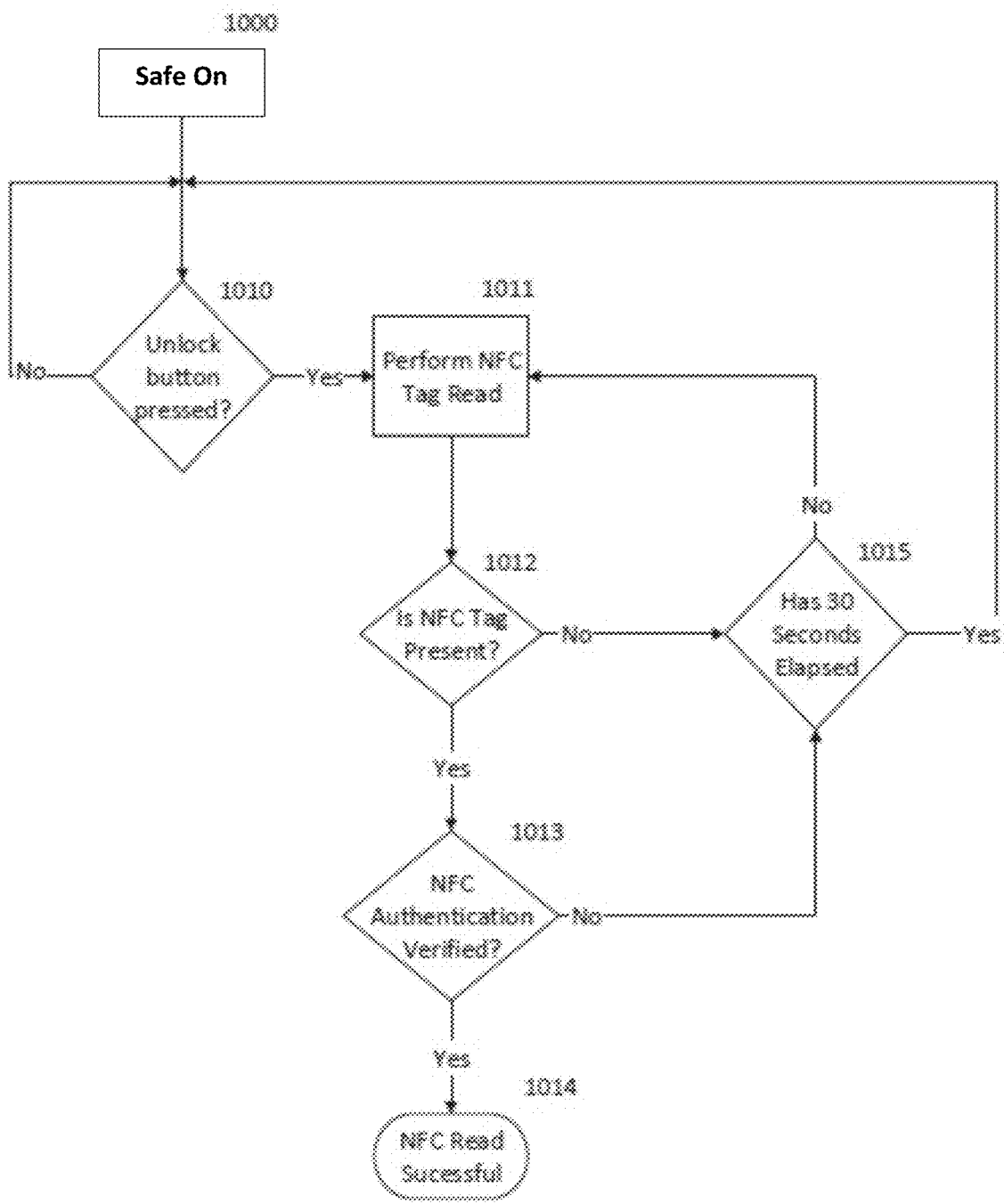
FIG. 20 depicts a flow diagram of one embodiment of a Near Field Communication (NFC) read function of an electronic embodiment of the container of the invention.

Referring now to FIG. 20, a flow diagram of an alternate embodiment of the securable container of the invention which utilizes an optional Near Field Communication (NFC) read function of an electronic embodiment of the container of the invention is described. In this embodiment, a user's possession of a device having an authorized near field communication tag takes the place of the inputting of a PIN code into keypad 120 for identifying the user as an authorized user and unlocking container 001. In a first step 1000, container 001 may be placed into a powered-on condition as above described. Once having powered on, controller 800 or other circuitry may monitor the state of a push button of keypad 120 (depicted in FIG. 17) to determine whether a user has commanded the container to an unlocked state, step 1010. If a user has commanded unlock through a push button of keypad 120, controller 800 monitors a near field communication transceiver 804 in communication with controller 800 in order to ascertain whether a near field communication tag has been read 1011. If it is determined that a near field communication tag is present 1012, controller 800 executes computer readable instructions to determine whether the near field communication tag is an authenticated tag of an authorized user, step 1013. An authenticated near field communication tag is one that has been predetermined as belonging to an authorized user of the container of the invention, and for which a code has been stored in non-transitory computer readable media 810. If it is determined by controller 800 reading non transitory computer readable media 810 and executing computer readable instructions that the near field communications tag is that of an authorized user, the controller generates and stores in non-transitory computer readable media 810 a near field communication read successful message 1014, and commands container 001 into an unlocked state. If it is determined by controller 800 executing computer readable instructions that near field communications tag is not that of an authorized user 1013, it determines whether a predetermined, programmable period of time, such as 30 seconds, has elapsed since the near field communication tag read by the near field communication transceiver in step 1015. If the predetermined, programmable period of time has not elapsed, controller 800 returns to step 1011 and performs another near field communication tag read. If the predetermined, programmable period of time has elapsed, controller 800 commands the container of the invention to return to a state wherein it reads whether a push button of keypad 120 has been pressed to command unlock, step 1010. It is within the scope of the invention that this same step-wise process also applied to devices communicating by Bluetooth or other wireless means which comprise the use of a user-specific code for identification.

Figure 21:
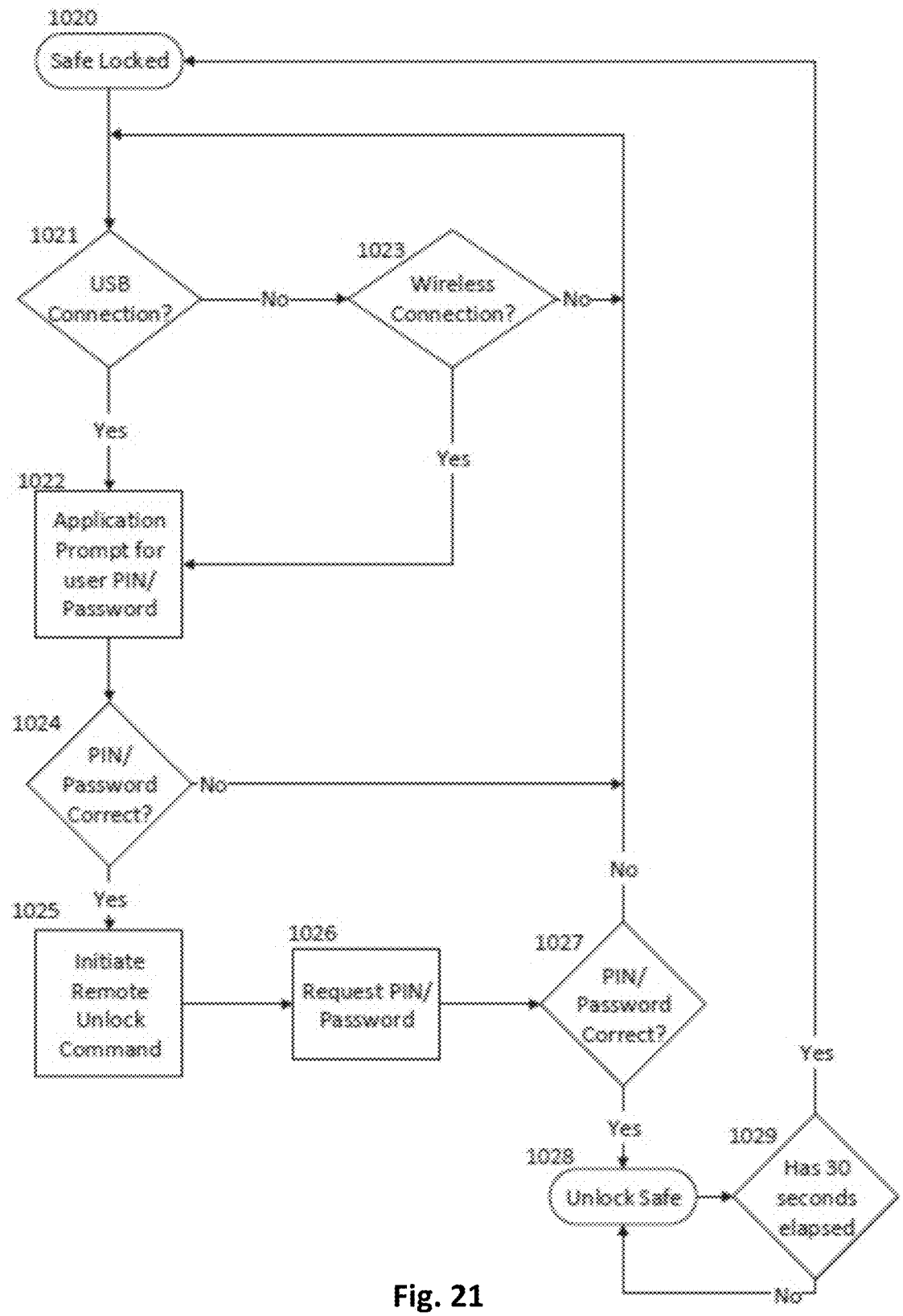
FIG. 21 depicts a flow diagram of one embodiment of a remote unlock function of an electronic embodiment of the container of the invention.

Referring now to FIG. 21, a flow diagram of one embodiment of a remote unlock function of an electronic embodiment of container 001 is depicted. In an initial state 1020, the electromechanical lock of container 001 is in a locked state. In a next step 1021, controller 800 reads the state of Universal Serial Bus (USB) port 815 (depicted in FIG. 8) to determine whether there is an active USB connection to a remote device. If there is no active USB connection to a remote device, controller 800 may execute non-transitory computer readable instructions to determine in step 1023 whether there is an active wireless connection through wireless transceiver 806 (depicted in FIG. 17) to a remote device such as a laptop computer, smart phone, tablet or tablet computer, smart watch, Internet connection or other wireless connection to a remote device. If it is determined that there is an active USB connection or a wireless connection to a remote device, controller 800 may execute computer readable instructions in to communicate with the connected device and to thereby receive a remote device signal, whether the remote device is connected via USB or wirelessly, whereupon a user using the connected device may be prompted to enter a personal identification number, or PIN, password, or other identifying indicia which may be operative to identify the user and to allow controller 800 to execute instructions in order to determine whether the user is an authorized user. The user may have already provided identifying indicia such as a personal identification number (PIN), password or the like that has been stored in non-transitory computer readable media 810 to facilitate controller 800's execution of instructions to identify whether the user is an authorized user 1024. If the user is determined to be an authorized user by the entry of a correct PIN or password 1024, controller 800 may execute instructions to initiate the remote unlock command 1025 and may again require the remote user to enter a personal identification number, password, or other identifying indicia 1026. If the user again enters correct authenticating identifying indicia (i.e. for the second time) 1027, controller 800 will execute instructions unlocking the electromechanical lock mechanism of container 001 as hereinbefore described 1028, thus placing the container of the invention in an unlocked condition so that a user may manipulate button 112 as hereinbefore described to place container 001 in an open state 1028. Requiring a user to enter authenticating identifying indicia twice is an optional safety feature that is intended to prevent accidental unlocking of the container by the user. This could happen, for instance, if a user accidentally swipes an "unlock" command on their cell phone touch screen while the container software application is running on the cell phone and the cell phone is in wireless communication with container 001 through the remote user data interface. The securable container will remain unlocked 1028 for a predetermined, programmable period of time, such as, for example, thirty seconds, and then will return to the locked condition 1029. If the identifying indicia such as personal information number or password are not correct, step 1027, the container of the invention will remain in the locked condition and the process will start again 1021. Thus a remote user may remotely unlock the securable container for a predetermined, programmable period of time, such as, for example, thirty seconds.

Figure 22:
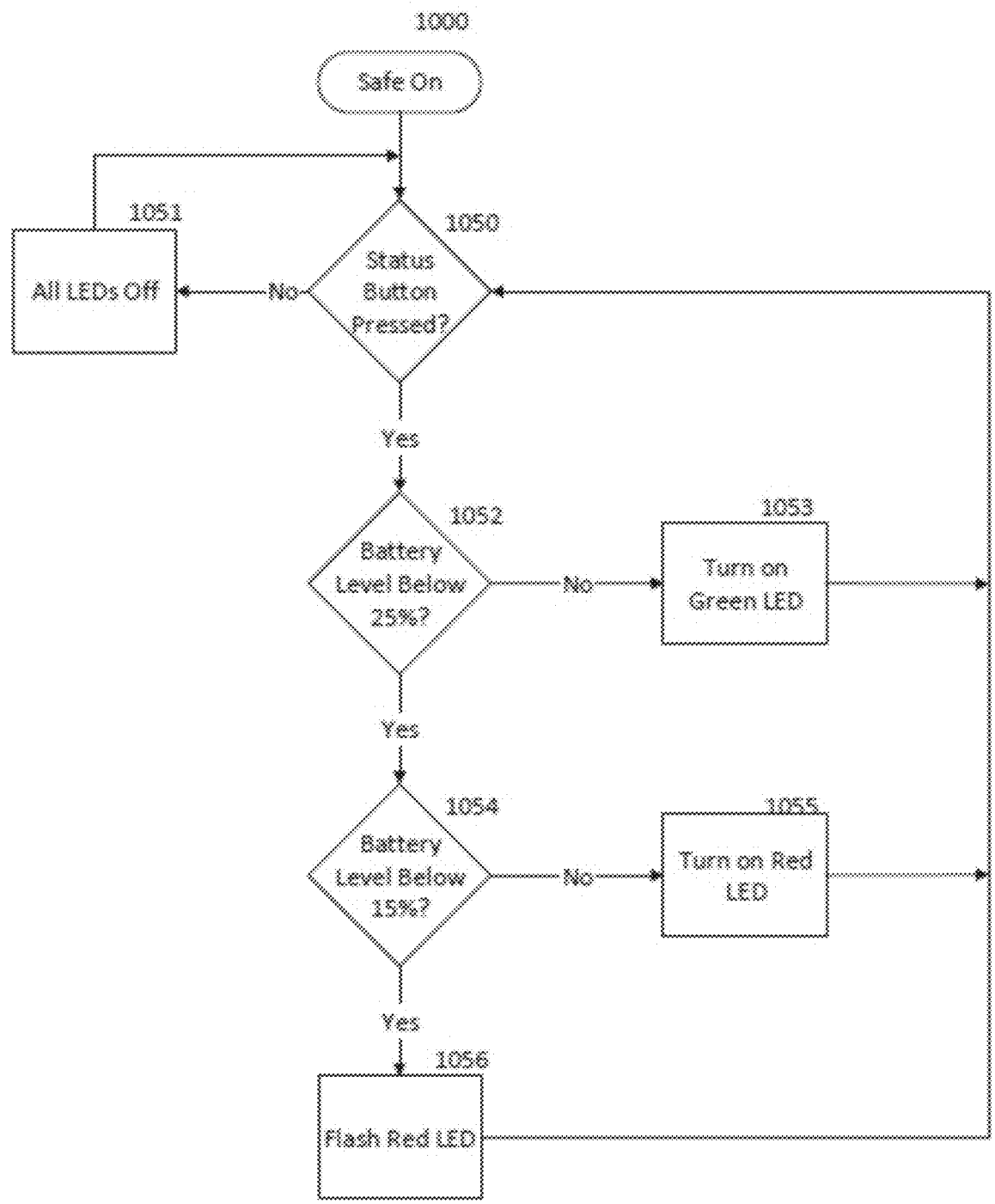
FIG. 22 depicts a flow diagram of one embodiment of a battery charge level indicator function of an electronic embodiment of the container of the invention.

Referring now to FIG. 22, a flow diagram of an embodiment of a battery charge indicator function of an electronic embodiment of the container of the invention is depicted. In an initial step 1000, container 001 is powered on. Controller 800 may execute computer readable instructions to make a determination whether a status button, which may be, for example a pushbutton keypad 120, has been pressed by a user. If a status button has not been pressed, controller 800 will execute instructions to cause power status indicator light 812 to remain in an off, non-illuminated, state in step 1051 and controller 800 will continue to monitor the state of pushbutton array 42 in order to ascertain whether a status button has been pressed. If a status button has been pressed by the user 1050, controller 800 will execute instructions to receive a signal containing battery charge level information from battery charger and power conditioning circuitry 808 and to make a determination whether the battery charge level of battery 606 is below a predetermined medium-charge threshold, for example, 25% of full charge in step 1052. If, in step 1052, it is determined by controller 800 that the battery level is below a predetermined medium-charge threshold, controller 800 will then execute instructions to make a determination as to whether the battery level is below a predetermined low-charge threshold, step 1054. If the battery level is below a predetermined low-charge threshold, controller 800 may execute instructions to illuminate a red light, such as power status indicator light 812 operating in red mode, for example to flash, in step 1055, indicating that a low battery level condition exists. If, in step 1052, it is determined that the battery level is not below a predetermined medium-charge threshold, controller 800 will execute instructions to illuminate a green light, such as power status indicator light 812 operating in green mode, in step 1053. If, in step 1054 it is determined that the battery level is below a predetermined low-charge threshold, controller 800 may execute instructions turning on a red light. The lights referred to in this series of steps regarding battery indication are preferably visible on an exterior surface of container 001, or may transmit light through a transparent window allowing a user to view the indicated status without needing to open the container or to unlock the container. In an embodiment, controller 800 will only illuminate the lighting elements of the invention if a user has depressed one or more pushbuttons of keypad 120, and such illumination may be for a predetermined length of time programmable by storing a time value in computer readable media 810 which is read by controller 800 and used to determine the length of time for which it is desired that the lighting elements be illuminated, indicating status of the container. In this manner the container may be operated discretely because the lighting elements will only illuminate upon command by a user, and may only illuminate for a predetermined length of time.

Figure 23:
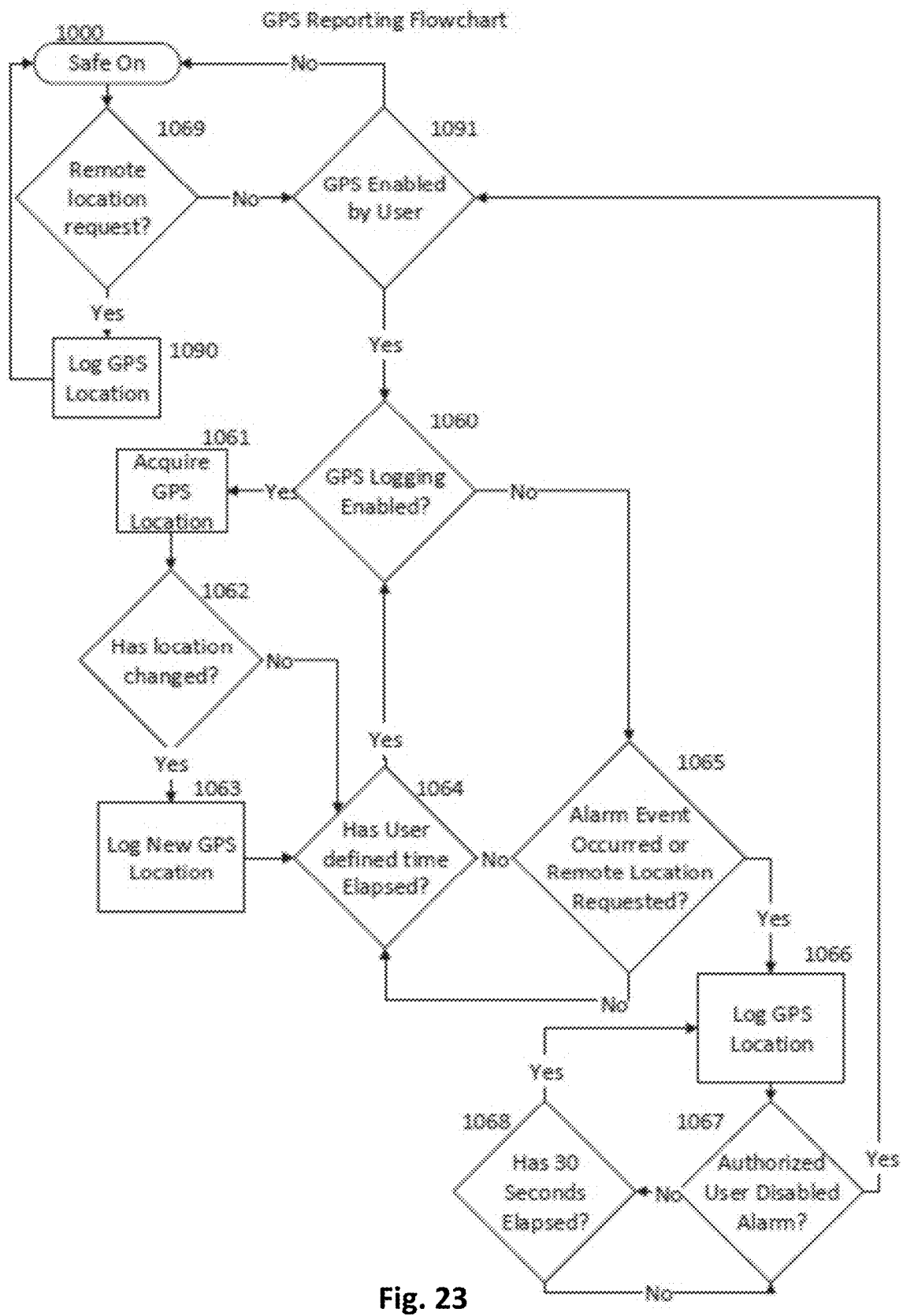
FIG. 23 depicts a flow diagram of one embodiment of a geolocation function of an electronic embodiment of the container of the invention.

Referring now to FIG. 23, a flow diagram of one embodiment of a GPS geo-locating and location logging function of an electronic embodiment of the container of the invention is depicted. In an initial step 1000 the container of the invention is in an on condition. Controller 800 may execute instructions 1069 to determine whether a remote user has requested container geolocation information 1069 through, by way of example, container application software running on a mobile device or remote computer, transmitted to controller 800 through any of the data interfaces of container 001, such as wireless transceiver 806. If a remote user has requested geolocation information, controller 800 may execute instruction to read geolocation information from GPS receiver 802 and store the geolocation information in memory 1090 such as non-transitory computer readable media 810. If a remote user has not requested geolocation information 1069, controller 800 determines whether GPS has been enabled by a user 1091. If it has, controller 800 then may determine whether GPS logging has been enabled 1060. If GPS has not been enabled by a user 1091, controller 800 continues to monitor for a remote location request 1069.

Still referring to FIG. 23, if GPS has been enabled by a user 1091, and if GPS logging has been enabled by a user 1060, the GPS receiver 802 will acquire GPS location information 1061. If the location of the container has changed 1062, for example beyond a predetermined limit, the new geolocation information is logged into non transitory computer readable media 1063. If a user defined time limit has elapsed 1064, controller 800 checks to see if GPS logging is enabled 1060 and the process repeats if it has. If GPS logging has not been enabled 1060, and if an alarm event has not occurred or if no remote location request has been received 1065, controller 800 checks to see if a user defined time limit has elapsed 1064.

Still referring to FIG. 23, if GPS logging has been enabled by a user 1060, GPS transceiver 802 (depicted in FIG. 17) will acquire GPS satellite communication and will provide a signal corresponding to the geographic location of the container, 1061. Controller 800 will store the geographic location information from the signal corresponding to the geographic location of the container in non-transitory computer readable non transitory computer readable media 810 and may compare the geolocation information to previously stored geolocation information in step 1062 so as to make a determination as to whether the container of the invention has been moved to a new location 1063. A user may, through the container wireless interface(s), or USB interface, and by using an external device such as a laptop, tablet, cell phone, smart watch or any other device running container application software, program geographic limitations or boundaries into the container for storage in non-transitory computer readable media 810 so that the user may define custom geographic territorial limits which would result in a notification, which could be audible, visual, or message such as email, instant message, SMS text message or the like in those instances in which the container has been moved beyond a predetermined geographic limits. If the geographic location of container 001 has changed, for example beyond a predetermined geographic limit, step 1062, the new GPS geolocation information is received by controller 800 and stored in a non-transitory computer readable media 810. If the geolocation of container 001 has not changed, for example beyond a predetermined geographic limit, step 1062, controller 800 executes instructions to determine whether a predetermined time, for example 30 minutes, has elapsed since the last geolocation reading, step 1064. If the predetermined time or more has elapsed, the cycle starts again and if GPS tracking remains enabled 1060, a new GPS geolocation signal is acquired step 1061. If the predetermined time has not elapsed since the last GPS geolocation reading, step 1064, the controller 800 executes instructions to determine whether any alarm event has occurred or whether a remote user has requested geolocation information, for instance, through the RF wireless transceiver or optical transceiver 806, step 1065. If no alarm event has occurred and if no remote location request has been made by a remote user, the system continues to monitor whether the predetermined time has elapsed since the last geolocation reading. If an alarm event has occurred or if a remote user has requested location information, step 1065, GPS location information of the container is received by controller 800 and stored in non-transitory computer readable media 810. Next, controller 800 executes instructions to determine whether an authorized user has disabled the alarm, step 1067. If an authorized user has not disabled the alarm, controller 800 determines whether 30 seconds has elapsed 1068. If more than 30 seconds has elapsed the system logs GPS location data in step 1066 by causing controller 800 to execute instructions storing the GPS location data in non-transitory computer readable media 810. If 30 seconds has not elapsed, controller 800 continues to monitor whether an authorized user has disabled the alarm 1067. If, in step 1067, an authorized user has disabled the alarm, the system remains in the on state and controller 800 continues to monitor whether GPS tracking has been enabled and the method returns to step 1060. Any of the times described herein, such as the 30 second time above, may be programmable by a user.

Figure 24:
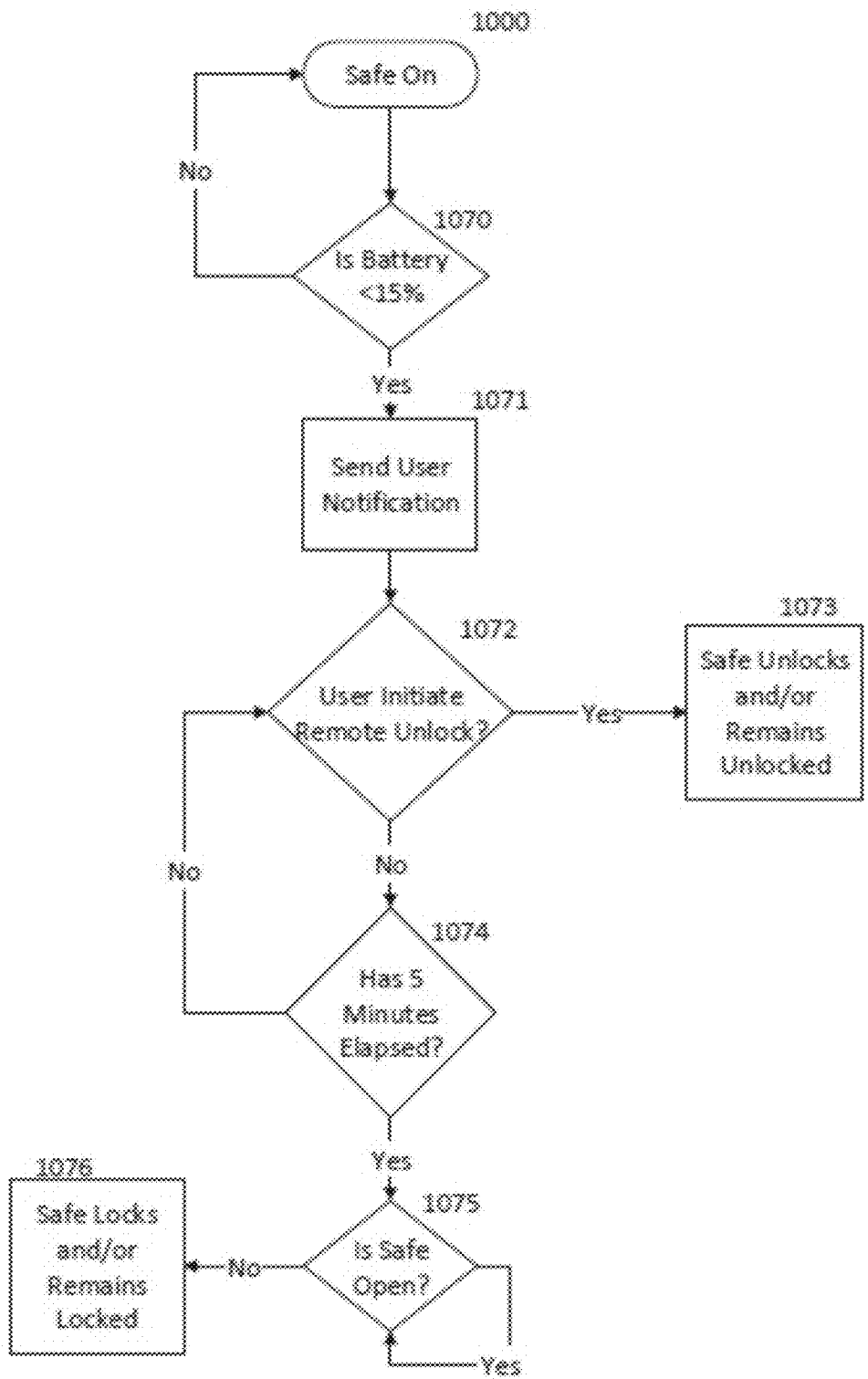
FIG. 24 depicts an electrical block diagram of a low battery charge level alert function of an electronic embodiment of the container of the invention.

Referring now to FIG. 24, in an embodiment, starting from a powered-on condition 1000, controller 800 may execute instructions to receive a signal from battery charger and power conditioning circuitry 808 and to make a determination whether the battery charge level of battery 606 is below a predetermined low-charge threshold, which may be for example 15% of full charge, in step 1070. If the battery charge level is below the predetermined low-charge threshold, a BATTERY CHARGE LOW or equivalent message will be transmitted to a remote user through wireless transceiver 806, step 1071. If a remote user has initiated a remote unlock command to container 001 through wireless transceiver 806 or through USB interface 815 in step 1072, controller 800 will command the electromechanical lock into an unlocked state and the securable container will remain unlocked 1073. If a remote user has not initiated a remote unlock command 1072, controller 800 will, for a programmable period of time, for example five minutes, continue to monitor for a Remote Unlock command 1072. If, after the programmable period of time, no Remote Unlock command has been received, controller 800 will command the electromechanical lock into an locked state if the securable container is closed, causing the securable container to be in a locked condition.

Figure 25:
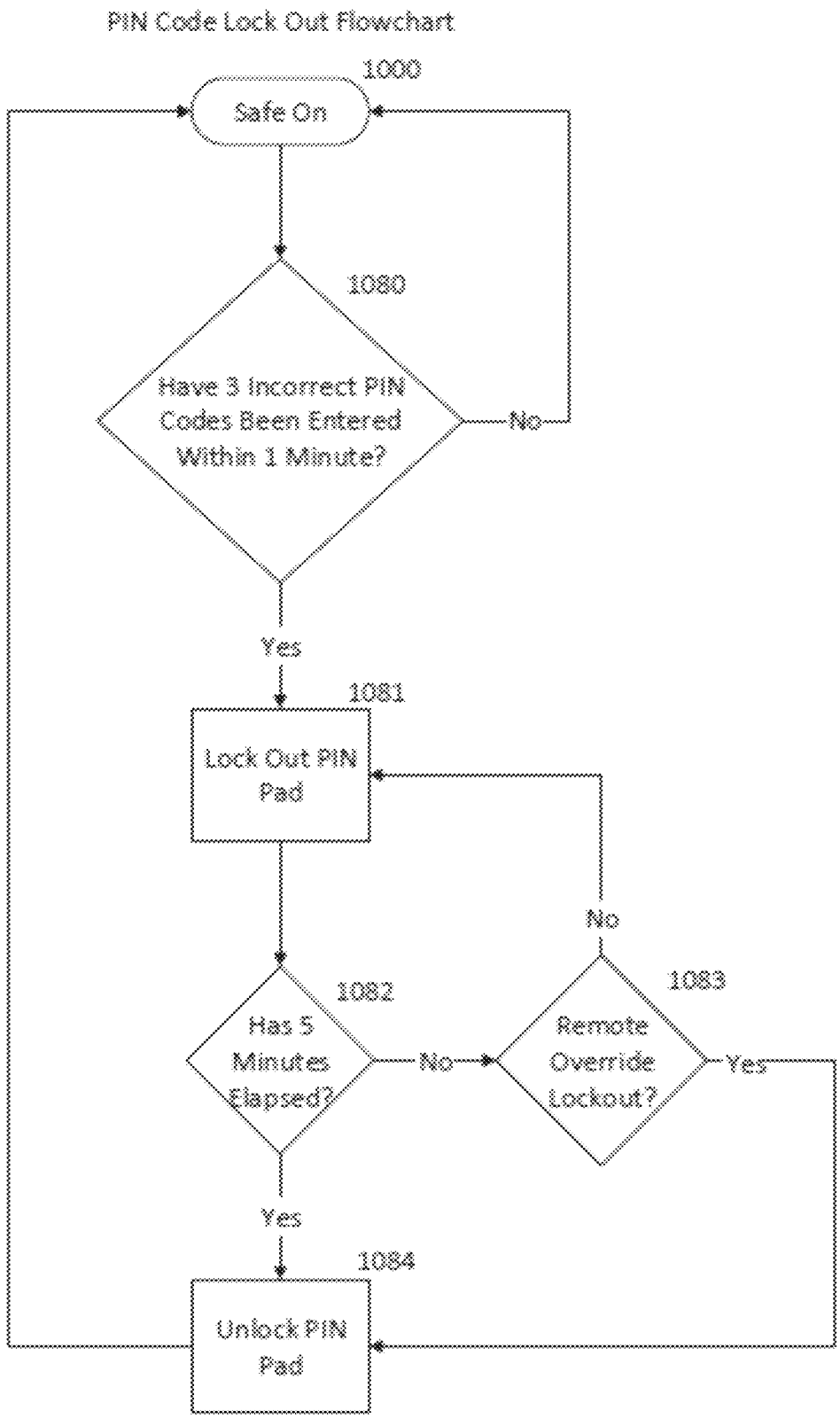
FIG. 25 depicts a flow diagram of one embodiment of a PIN code lockout function of an electronic embodiment of the container of the invention.

Referring now to FIG. 25, a PIN code lockout flow diagram is presented. In an initial step the container is power to an on state 1000. Once a user begins inputting PIN codes into keypad 120 or by any other means, such as remotely, controller 800 monitors to check if three incorrect PIN codes have been imputted within a programmable period of time, for example one minute, step 1080. If they have, the PIN pad will be disabled 1081 and will not accept entry of PIN codes for a programmable PIN code lockout period 1082 which may be, for example, five minutes. A remote user may remotely, through wireless transceiver 806, transmit commands causing the lockout period to be terminated 1083 and unlocking, or re-enabling, PIN pad 1084 and returning the container to a state in which a local user may again attempt to enter a PIN code through the PIN pad.

In any step of the invention described herein, the functions described may be carried out by controller 800 executing non-transitory computer readable and executable instructions stored in computer readable media 810. Such instructions may also be carried out by the various circuit elements that comprise electronics assembly 610 or any circuit elements connected thereto. Thus these functions are not limited to being carried out by controller 800, and the claims of the patent should be thus interpreted. The steps described are optional, and need not be present in embodiments of the invention. In those embodiments in which two or more of the functions described here are present, such functions may be present in any combination.

Figure 26:
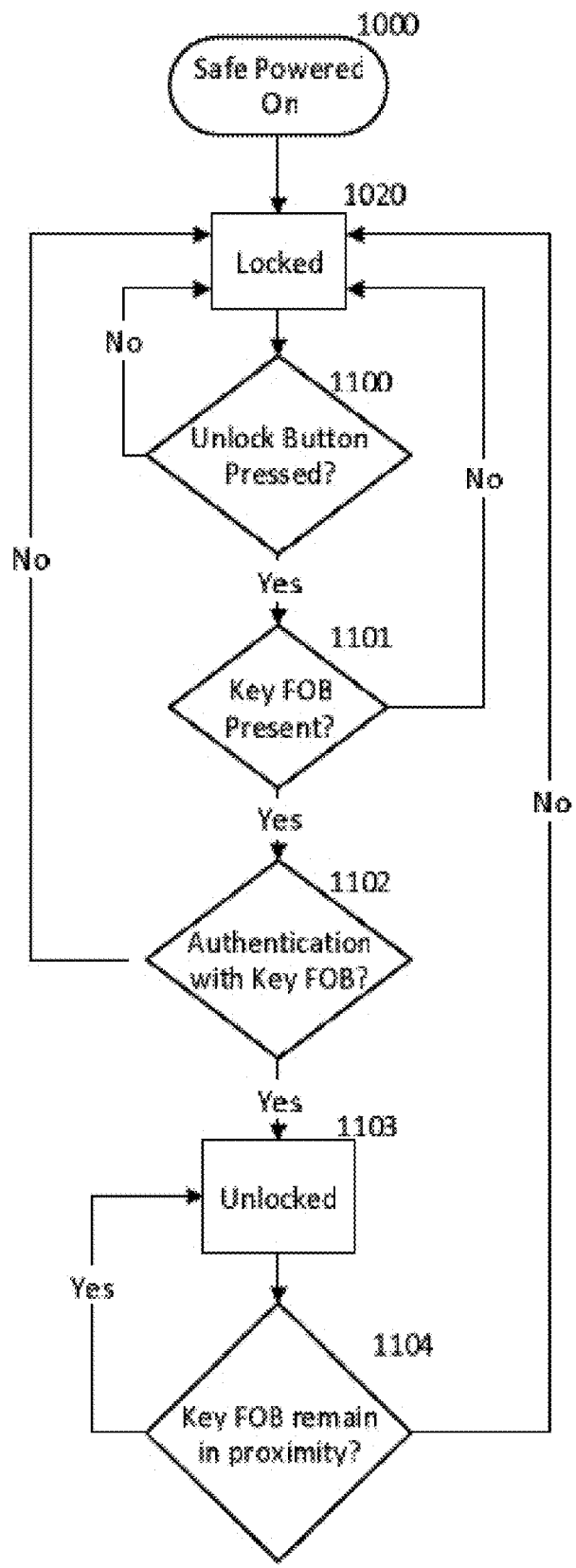
FIG. 26 depicts a flow diagram for a key fob embodiment of the invention.

Referring now to FIG. 26, a flow diagram for a key fob embodiment of the invention is depicted. Initially, container 001 may be powered on in step 1000, and may persist in a locked state 1020 upon power up. A key fob may comprise a processor in communication with an RF transmitter such as a Bluetooth or other transmitter, or may comprise an RFID tag. The key fob RF transmitter or RFID tag may be in communication with the RF transceiver of the container, such that the processor 800 of the container may set a register or store to non-volatile computer readable media 810 a KEY FOB PRESENT code to indicate that the key fob is present. When it is desired to unlock the container, an unlock pushbutton of keypad 120 on container 001 may be depressed, step 1100. If the key fob is determined to be present as set forth above, step 1101, a code received from the key fob RF link or RFID tag is received by the container RF receiver and compared with the authentic PIN code stored in non-volatile computer readable media 810 in step 1102. If the code is authenticated, container 001 is unlocked by controller 800 commanding electromechanical actuator 621 into an unlocked state, step 1103. The processor 800 may then instruct the electromechanical actuator 621 to remain in an unlocked position for as long as the key fob remains in proximity 1104. However, when the key fob is physically separated by a distance such that the RF link between the key fob and RF transceiver 806 is broken, or when the RFID tag in the key fob no longer is able to communicate with RF transceiver, the KEY FOB PRESENT code set by processor 800 is changed by processor 800 to indicate that the key fob is no longer present, and processor 800 commands the electromechanical actuator 621 to lock the container so that it cannot be manually opened by operation of button 112.

In any of the embodiments, the functions, features, and modes of operation of securable container 001 are optional functions, and may be, but are not necessarily, present in any embodiment, in any combination.

The present invention is useful for securing a firearm or other object from view. The present invention further allows local or remote control over locking the container such that access is denied to individuals who are not authorized to access the contents of the container, and for reporting the geographic location of the container and the open or closed status of the container to a remote monitoring station. The container may trigger the operation of certain safety or information-gathering devices such as cameras or microphones when the firearm is removed from the holster. The container of the invention is useful for any purpose in which it is desired to track, control access, or assess the status of a valuable or dangerous item. As an example, law enforcement organizations are able to use the container of the invention to receive a signal when a container of the invention has been opened so that additional resources may immediately be deployed. As another example, the removal of weapon from a container of the invention may automatically trigger the operation of a body camera for remote monitoring, or for recording purposes. As another example, the container of the invention may be remotely locked in situations in which it is desired to prevent access to a firearm, such as in an occurrence in which a law enforcement officer's container, containing a weapon, has been acquired by an individual who is not authorized to possess or use the weapon.

What is claimed is:

1. A securable container with lockable mount system, comprising:
 a container comprising:
  a container having an opening and an enclosed interior volume, said container having a closed state and an open state;
  wherein said open state allows access to said enclosed interior volume through said opening, and wherein said closed state prevents access to said enclosed interior volume, and wherein, in said closed state, said enclosed interior volume is able to completely enclose a firearm;
  a retractable cover disposed in said container, said retractable cover operable to be motivated along a track formed in at least one interior surface of said enclosed interior volume, wherein when said retractable cover is not retracted the container is in said closed state wherein said retractable cover at least partially occludes said opening, and when said retractable cover is retracted the container is in said open state;
  wherein said retractable cover comprises a flexible structure and is subjected to an opening force tending to motivate said retractable cover along said track into said open state;
  a cover latch operable to latch said retractable cover in said closed state;
  a button for unlatching said latch, allowing said retractable cover to be motivated into said open state by said opening force;
  wherein said retractable cover is able to be returned to said closed state and latched there;

a receiving structure for receiving the barrel of a firearm, said receiving structure disposed within said enclosed interior volume; said receiving structure subjected to an expanding force between said receiving structure and an interior surface of said enclosed interior volume, said expanding force directed towards said container opening;

a receiving structure latch having a latched and an unlatched state, said receiving structure latch preventing motivation of said receiving structure towards said opening when disposed in said latched state, and allowing motivation of said receiving structure towards said opening when disposed in said unlatched state, said receiving structure latch biased into said latched state by a biasing force, and said receiving structure latch further comprising a striking surface;

wherein when said receiving structure latch is motivated against said biasing force such that said receiving structure latch transitions to said unlatched state when said retractable cover operates on said striking surface as said retractable cover is motivated into said open position by operation of said opening force, allowing said receiving structure to be motivated toward said opening by said expanding force so that a handle of a handgun disposed on said receiving structure protrudes at least partially through said opening.

2. The securable container of claim 1, wherein said opening force is a tension force between a first end of said retractable cover and an interior surface of said enclosed interior volume.

3. The securable container of claim 1, wherein said receiving structure further comprises a barrel pin operable to engage a firearm barrel in a sliding engagement.

4. The securable container of claim 1, further comprising a key lock operable to prevent retraction of the retractable cover when said key lock is in a locked state.

5. The securable container of claim 1, further comprising:
a controller for executing non-transitory computer executable instructions;
a computer readable media in communication with said controller, said memory containing non-transitory computer readable instructions;
an electromechanical lock comprising an electromechanical actuator in communication with said controller;
wherein said electromechanical actuator is able to be commanded by said controller so that said electromechanical lock prevents said button from being depressed and releasing said cover, placing said container in a locked state and preventing said cover from retracting into said open state; and
wherein said electromechanical actuator is able to be commanded by said controller so that said electromechanical lock allows said button to be depressed, placing said container in an unlocked state, allowing said cover to retract into said open state when said button is depressed.

6. The securable container of claim 5, further comprising:
a keypad in communication with said controller, said keypad operable to receive a code input by a user;
wherein said non-transitory computer executable instructions comprise instructions for receiving said code and commanding said electromechanical actuator to an unlocked state or said locked state when a predetermined code is entered.

7. The securable container of claim 5, further comprising:
a wireless transceiver in communication with said controller;
wherein said electromechanical actuator is able to be commanded by said controller when a lock command is received by said transceiver from a remote user so that said electromechanical latch is controlled into said locked state; and
wherein said electromechanical actuator is able to be commanded by said controller when an unlock command is received by said transceiver from a remote user so that said electromechanical latch is controlled into said unlocked state.

8. The securable container of claim 5, further comprising:
a geolocation radio frequency receiver for receiving geolocation signals and processing said geolocation signals to produce a geolocation information signal representing the geographic location of said container, said geolocation radio frequency receiver in communication with said controller; and
a wireless transceiver in communication with said controller;
wherein said wireless transceiver is adapted to receive commands wirelessly for commanding said controller to execute instructions for transmitting said geolocation signal wirelessly to a remote user.

9. The securable container of claim 5, further comprising a wireless transceiver, wherein said non-transitory computer executable instructions further comprise instructions for commanding said transceiver to search for a predetermined signal from a key fob, and to command said electromechanical latch into a locked state when said predetermined signal is not found.

10. The securable container of claim 5, further comprising:
a wireless transceiver in communication with said controller; and
an accelerometer in communication with said controller;
said accelerometer producing a signal when said container has been physically moved; wherein said non-transitory computer executable instructions executed by said controller further comprise instructions for receiving said accelerometer signal and transmitting a signal to a remote user through said transceiver that said container has been moved.

11. The securable container of claim 5, further comprising:
a wireless transceiver in communication with said controller; and
an external camera in wireless communication with said transceiver, and further comprising a sensor for determining when said retractable cover has been retracted into an open position;
wherein said computer executable instructions further comprise instructions for commanding said camera to an on state.

12. A securable container with lockable mount system, comprising:
a container comprising:
a container having an opening and an enclosed interior volume, said container having a closed state and an open state;
wherein said open state allows access to said enclosed interior volume through said opening, and wherein said closed state prevents access to said enclosed interior volume, and wherein, in said closed state, said enclosed interior volume is able to completely enclose a firearm;

a retractable cover disposed in said container, said retractable cover operable to be motivated along a track formed in at least one interior surface of said enclosed interior volume, wherein when said retractable cover is not retracted the container is in said closed state wherein said retractable cover at least partially occludes said opening, and when said retractable cover is retracted the container is in said open state;

wherein said retractable cover is subjected to an opening force tending to motivate said retractable cover along said track into said open state;

a cover latch operable to latch said retractable cover in said closed state;

a button for unlatching said latch, allowing said retractable cover to be motivated into said open state by said opening force;

wherein said retractable cover is able to be returned to said closed state and latched there;

a receiving structure for receiving the barrel of a firearm, said receiving structure disposed within said enclosed interior volume; said receiving structure subjected to an expanding force between said receiving structure and an interior surface of said enclosed interior volume, said expanding force directed towards said container opening;

a receiving structure latch having a latched and an unlatched state, said receiving structure latch preventing motivation of said receiving structure towards said opening when disposed in said latched state, and allowing motivation of said receiving structure towards said opening when disposed in said unlatched state, said receiving structure latch biased into said latched state by a biasing force, and said receiving structure latch further comprising a striking surface;

wherein when said receiving structure latch is motivated against said biasing force such that said receiving structure latch transitions to said unlatched state when said retractable cover operates on said striking surface as retractable cover is motivated into said open position by operation of said opening force, allowing said receiving structure to be motivated toward said opening by said expanding force so that a handle of a handgun disposed on said receiving structure protrudes at least partially through said opening; and a mount for attaching said container to a surface, said mount comprising an opening for receiving a portion of said container, said mount adapted to be attached to a surface;

a retaining pin having a void, said retaining pin passing through openings in said mount and said container, securing said mount to said container; and a locking pin having portions of greater and lesser diameter, said locking pin subject to a biasing force acting in a direction along its axis;

wherein said retaining pin void interlocks with a greater diameter portion of said locking pin such that said retaining pin cannot be removed from said mount when said locking pin is biased by said biasing force; and wherein said retaining pin is able to be removed, releasing said mount from said container, when said locking pin is motivated against said biasing force such that void aligns with a lesser diameter portion of said locking pin.

13. The securable container of claim 12, wherein said opening force is a tension force between a first end of said retractable cover and an interior surface of said enclosed interior volume.

14. The securable container of claim 12, wherein said receiving structure further comprises a barrel pin operable to engage a firearm barrel in a sliding engagement.

15. The securable container of claim 12, further comprising a key lock operable to prevent retraction of the retractable cover when said key lock is in a locked state.

16. The securable container of claim 12, further comprising:
a controller for executing non-transitory computer executable instructions;
a computer readable media in communication with said controller, said memory containing non-transitory computer readable instructions;
an electromechanical lock comprising an electromechanical actuator in communication with said controller;
wherein said electromechanical actuator is able to be commanded by said controller so that said electromechanical lock prevents said button from being depressed and releasing said cover, placing said container in a locked state and preventing said cover from retracting into said open state; and
wherein said electromechanical actuator is able to be commanded by said controller so that said electromechanical lock allows said button to be depressed, placing said container in an unlocked state, allowing said cover to retract into said open state when said button is depressed.

17. The securable container of claim 16, further comprising:
a keypad in communication with said controller, said keypad operable to receive a code input by a user;
wherein said non-transitory computer executable instructions comprise instructions for receiving said code and commanding said electromechanical actuator to an unlocked state or said locked state when a predetermined code is entered.

18. The securable container of claim 16, further comprising:
a wireless transceiver in communication with said controller;
wherein said electromechanical actuator is able to be commanded by said controller when a lock command is received by said transceiver from a remote user so that said electromechanical latch is controlled into said locked state; and
wherein said electromechanical actuator is able to be commanded by said controller when an unlock command is received by said transceiver from a remote user so that said electromechanical latch is controlled into said unlocked state.

19. The securable container of claim 16, further comprising:
a geolocation radio frequency receiver for receiving geolocation signals and processing said geolocation signals to produce a geolocation information signal representing the geographic location of said container, said geolocation radio frequency receiver in communication with said controller; and
a wireless transceiver in communication with said controller;
wherein said wireless transceiver is adapted to receive commands wirelessly for commanding said controller to execute instructions for transmitting said geolocation signal wirelessly to a remote user.

20. The securable container of claim 16, further comprising a wireless transceiver, wherein said non-transitory computer executable instructions further comprise instructions for commanding said transceiver to search for a predetermined signal from a key fob, and to command said electromechanical latch into a locked state when said predetermined signal is not found.

21. The securable container of claim 16, further comprising:
- a wireless transceiver in communication with said controller; and
- an accelerometer in communication with said controller;
- said accelerometer producing a signal when said container has been physically moved; wherein said non-transitory computer executable instructions executed by said controller further comprise instructions for receiving said accelerometer signal and transmitting a signal to a remote user through said transceiver that said container has been moved.

22. The securable container of claim 16, further comprising:
- a wireless transceiver in communication with said controller; and
- an external camera in wireless communication with said transceiver, and further comprising a sensor for determining when said retractable cover has been retracted into an open position;
- wherein said computer executable instructions further comprise instructions for commanding said camera to an on state.

23. A securable container with lockable mount system, comprising:
- a container comprising:
  - a container having an opening and an enclosed interior volume, said container having a closed state and an open state;
  - wherein said open state allows access to said enclosed interior volume through said opening, and wherein said closed state prevents access to said enclosed interior volume through said opening;
  - a retractable cover disposed in said container, wherein when said retractable cover is not retracted the container is in said closed state wherein said retractable cover at least partially occludes said opening, and when said retractable cover is retracted the container is in said open state; and
- a mount for attaching said container to a surface, said mount comprising an opening for receiving a portion of said container, said mount adapted to be attached to a surface;
- a retaining pin having a void, said retaining pin passing through openings in said mount and said container, securing said mount to said container; and
- a locking pin having portions of greater and lesser diameter, said locking pin subject to a biasing force acting in a direction along an axis of said locking pin;
- wherein said retaining pin void interlocks with a greater diameter portion of said locking pin such that said retaining pin cannot be removed from said mount when said locking pin is biased by said biasing force; and
- wherein said retaining pin is able to be removed when said locking pin is motivated against said biasing force such that said void aligns with a lesser diameter portion of said locking pin, releasing said mount from said container.

\* \* \* \* \*